United States Patent
Faber et al.

(10) Patent No.: US 10,073,184 B2
(45) Date of Patent: Sep. 11, 2018

(54) SENSOR SYSTEM OF BURIED SEISMIC ARRAY

(71) Applicant: ION Geophysical Corporation, Houston, TX (US)

(72) Inventors: Kees Faber, Voorhout (NL); Rick Laroo, Lisse (NL)

(73) Assignee: ION Geophysical Corporation, Houston, TX (US)

( * ) Notice: Subject to any disclaimer, the term of this patent is extended or adjusted under 35 U.S.C. 154(b) by 569 days.

(21) Appl. No.: 13/795,598

(22) Filed: Mar. 12, 2013

(65) Prior Publication Data

US 2013/0265851 A1 Oct. 10, 2013

Related U.S. Application Data

(63) Continuation-in-part of application No. 13/759,986, filed on Feb. 5, 2013.

(60) Provisional application No. 61/595,510, filed on Feb. 6, 2012.

(51) Int. Cl.
| | |
|---|---|
| *G01V 1/06* | (2006.01) |
| *G01V 1/42* | (2006.01) |
| *G01V 1/28* | (2006.01) |
| *G01V 1/40* | (2006.01) |

(52) U.S. Cl.
CPC .............. *G01V 1/42* (2013.01); *G01V 1/288* (2013.01); *G01V 1/40* (2013.01); *G01V 2210/1234* (2013.01)

(58) Field of Classification Search
USPC ..... 367/65, 66, 81; 340/853.9, 854.9, 855.9, 340/855.7
See application file for complete search history.

(56) References Cited

U.S. PATENT DOCUMENTS

| | | | | |
|---|---|---|---|---|
| 4,058,790 | A | * | 11/1977 | Silverman et al. ............. 367/80 |
| 4,320,470 | A | * | 3/1982 | Angehrn ......................... 367/34 |
| 5,282,133 | A | * | 1/1994 | Watson .................... G01V 5/12 702/11 |
| 5,291,137 | A | * | 3/1994 | Freedman ................ G01V 3/32 324/303 |

(Continued)

FOREIGN PATENT DOCUMENTS

| | | |
|---|---|---|
| WO | 97/42525 A1 | 11/1997 |
| WO | 2013/012610 A2 | 1/2013 |

OTHER PUBLICATIONS

International Search Report and Written Opinion regarding corresponding PCT Application No. PCT/US2013/024830, dated Apr. 24, 2014.

(Continued)

*Primary Examiner* — James R Hulka
(74) *Attorney, Agent, or Firm* — Blank Rome LLP

(57) ABSTRACT

Microseismic mapping using buried arrays with the integration of passive and active seismic surveys provides enhanced microseismic mapping results. The system is initially set up by recording seismic data with the buried array installation while shooting a significant portion of the 3D surface seismic survey. The 3D surface seismic survey provides the following data: shallow 3D VSP data from the buried arrays; P-wave and converted wave data for the area covered by the buried array that benefits from the planned data integration processing effort; and microseismic data and associated analysis.

26 Claims, 28 Drawing Sheets

(56) References Cited

U.S. PATENT DOCUMENTS

| | | | |
|---|---|---|---|
| 5,359,324 A * | 10/1994 | Clark et al. | 340/854.3 |
| 5,917,160 A * | 6/1999 | Bailey | 181/112 |
| 5,969,638 A * | 10/1999 | Chin | G01V 1/364 |
| | | | 166/65.1 |
| 5,996,726 A | 12/1999 | Sorrells et al. | |
| 6,088,294 A * | 7/2000 | Leggett, III | E21B 44/00 |
| | | | 175/45 |
| 6,552,665 B1 * | 4/2003 | Miyamae et al. | 340/854.9 |
| 6,657,551 B2 * | 12/2003 | Huckaba | G01V 11/002 |
| | | | 340/853.2 |
| 6,898,149 B2 * | 5/2005 | Hill et al. | 367/82 |
| 7,348,894 B2 * | 3/2008 | Bailey et al. | 340/854.3 |
| 7,518,954 B2 * | 4/2009 | Hagedoorn | 367/185 |
| 7,663,970 B2 | 2/2010 | Duncan et al. | |
| 7,978,563 B2 | 7/2011 | Thornton et al. | |
| 7,986,587 B2 | 7/2011 | Duncan et al. | |
| 8,064,288 B2 | 11/2011 | Liang et al. | |
| 8,902,700 B2 * | 12/2014 | Muyzert et al. | 367/25 |
| 2002/0101359 A1 * | 8/2002 | Huckaba | G01V 11/002 |
| | | | 340/854.9 |
| 2002/0163441 A1 * | 11/2002 | Hill et al. | 340/855.4 |
| 2002/0180613 A1 * | 12/2002 | Shi et al. | 340/853.1 |
| 2003/0011490 A1 * | 1/2003 | Bailey et al. | 340/853.3 |
| 2005/0270172 A1 * | 12/2005 | Bailey et al. | 340/854.3 |
| 2007/0263488 A1 * | 11/2007 | Clark | 367/87 |
| 2008/0001597 A1 * | 1/2008 | Hagedoorn | 324/207.13 |
| 2008/0080308 A1 | 4/2008 | Hornby | |
| 2008/0159075 A1 | 7/2008 | Underhill et al. | |
| 2008/0259727 A1 | 10/2008 | Drew | |
| 2008/0316860 A1 * | 12/2008 | Muyzert et al. | 367/25 |
| 2009/0010104 A1 | 1/2009 | Leaney | |
| 2009/0185448 A1 | 7/2009 | Duncan et al. | |
| 2009/0296525 A1 | 12/2009 | Eisner et al. | |
| 2011/0042080 A1 * | 2/2011 | Birchwood et al. | 166/254.2 |
| 2011/0242934 A1 | 10/2011 | Thornton et al. | |
| 2011/0286306 A1 | 11/2011 | Eisner et al. | |
| 2013/0215716 A1 * | 8/2013 | Hofland et al. | 367/38 |
| 2013/0215717 A1 * | 8/2013 | Hofland et al. | 367/59 |

OTHER PUBLICATIONS

First Office Action in counterpart Canadian Appl. 2,905,892, dated Oct. 11, 2016, 4-pgs.

* cited by examiner

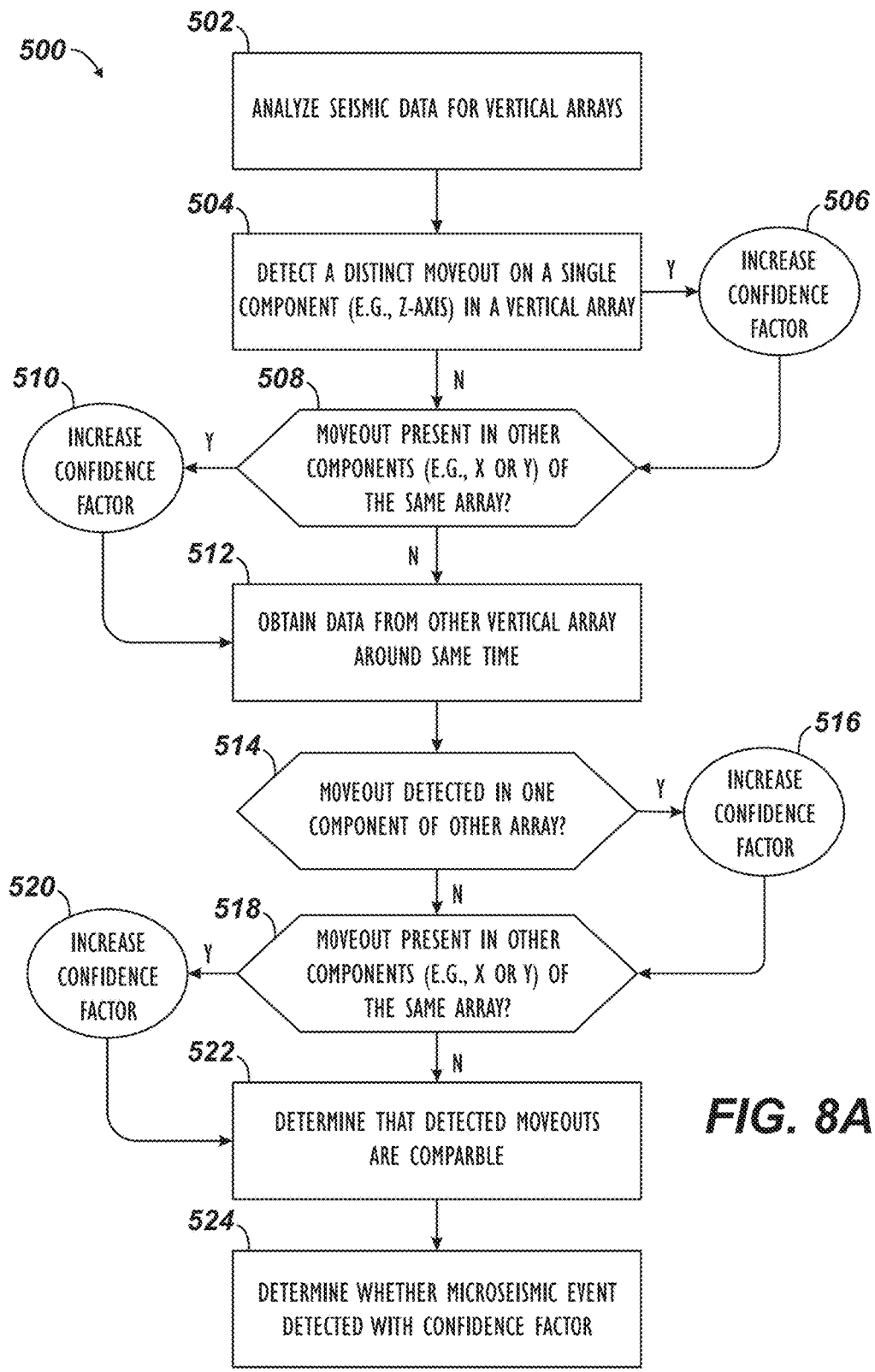

SENSOR SYSTEM OF BURIED SEISMIC ARRAY

CROSS-REFERENCE TO RELATED APPLICATIONS

This is a continuation-in-part of U.S. application Ser. No. 13/759,986, filed 5 Feb. 2013, which is incorporated herein by reference in its entirety and which claims the benefit of U.S. Provisional Appl. 61/595,510, filed 6 Feb. 2012, which is also incorporated herein by reference in its entirety.

BACKGROUND OF THE DISCLOSURE

Land-based seismic surveying uses an array of seismic sensors deployed on the earth's surface in an area of interest. One or more seismic sources (e.g., vibrators, dynamite shots, etc.) generate seismic source signals that travel through the earth, reflect at discontinuities and other features of subsurface formations, and travel back toward the earth's surface. The seismic sensors coupled to the earth at the surface then detect the reflected source signals, and a recording unit records the detected signals. Processing of the recorded signals can then be used to image the subsurface for analysis.

Land-based seismic surveys usually do not record extraneous information to assist in the characterization of a shallow earth model. At most, uphole information is usually recorded at shallow shot/dynamite holes, and that information is then used to improve the shallow "statics" model. Overall, this approach is less than ideal and can be improved.

Microseismic monitoring uses an array of seismic sensors deployed in a wellbore or on the Earth's surface to detect seismic energy emanating from various seismic events occurring within the subsurface. Processed signals from the sensors can identify the position of the event in the subsurface and the time the event took place. In turn, this information can be used in a number of applications to determine movement along faults in rock layers or formations, movement of fluid in a reservoir, monitoring hydraulic fracturing operations, etc. In the end, analysis of the information can be used in well completion and production operations.

A typical form of microseismic monitoring uses an array of sensors (i.e., geophones) deployed downhole in an observation well, which is preferably located close to a well being monitored. For example, FIG. 1 shows a system for determining the distribution and orientation of natural fractures in a target well 12. A source 11 pumps fluid for a hydraulic fracturing operation or the like in the target well 12, which extends below the earth's surface 13 into a fluid or hydrocarbon reservoir 14. The applied pressure from the pumped fluid causes movement along natural fractures in the well 12, producing a microseismic event 17. Seismic waves 18 radiate outwardly from the fracture toward an observation well 21 located within several thousand feet of the target well 12.

Multiple sensors (i.e., geophones) 22 deployed in a vertical array in the observation well 21 detect the waves 18 from the event 17, and a data recording device 24 records the detected signals. Using various algorithms, a signal processor 25 then processes the recorded signals and determines the arrival times of compressional (P) and shear (S) phases of the seismic event 17 to the sensors 22 so the event's hypocenter can be located in the target well 12. See e.g., U.S. Pat. No. 5,996,726. As expected, drilling an observation well can be costly, and the availability of one or more existing wells for use as observation wells within a suitable distance—usually within 1000 m—may be unlikely in most cases.

Another approach to microseismic monitoring uses an array 10 of surface-based sensors (i.e., geophones) 12 as shown in FIG. 2. The array 10 can be arranged to monitor a hydraulic fracturing operation in a vertical wellbore 15 using a pattern of the seismic sensors 12 above the area of interest surrounding the wellbore 15. In response to microseismic events, the sensors 12 detect signals related to seismic amplitude, and a recording unit 14 records the signals for processing.

The array 10 has a hub and spoke form. The sensors 12 in the arms of the array 10 can be spaced at tens of meters from one another, and the arms can extend several thousand meters in length. Because the array 10 is arranged at the surface, there is no need for an observation well. In addition, the array 10 can be distributed over a large area of interest.

Because a microseismic event is detected at the surface, surface noise can be rather large compared to the small event downhole. To overcome the signal weakness compared to noise, the surface array 10 is beam steered so points of greatest energy in the subsurface can be identified. To do this, travel time corrections for subsurface target points are calculated, and the trace data of the surface sensors 12 is time shifted. The data for each target point is stacked so a search of the energy distributions in the subsurface can then give the locations of likely microseismic events. In essence then, this technique attempts to detect events by stacking the seismic data at an arbitrary starting time $t_0$ for the event using a velocity model and stacking. See e.g., U.S. Pat. Publication No. 2011/0286306 to Eisner et al. It should be noted that the stacking procedure using beam steering can fail to detect events because the polarity of a microseismic event may not be uniform across the seismic array 10.

Detecting and locating the microseismic event becomes less reliable as noise increases, and differentiating real events (i.e., fractures, earth shifts, etc.) from false positives becomes more difficult. In fact, the array 10 of surface sensors 12 can fail to detect microseismic events caused by perforations or fracturing operations when there is significant surface noise. Although the array 10 of sensors 12 can facilitate imaging the seismic data, the ultimate uncertainty of whether a real microseismic event has been detected makes it difficult to know that what is imaged is an actual event and not just a false positive.

An approach to passive seismic surveying is illustrated in FIGS. 3A-3B. In this approach, wellbores 10 are drilled to a selected depth of about 100 meters or less and can be drilled deeper when there is very high levels of surface noise. Vertically-arranged arrays of seismic sensors (i.e., single component or three component geophones) 12 suspended on a cable 16 are placed into each wellbore 10, which is then filled. FIG. 3B shows how the wellbores 10 are arranged in two-dimensions over the surface.

When a naturally occurring or induced microseismic event 13 occurs in the subsurface volume, the sensors 12 detect the seismic energy for recording by a recording unit 14. The signals detected by each sensor 12 are recorded for a selected period of time, and a processor processes the signals to beam steer the response of the sensors 12 to enhance signal detection and to reduce noise. For example, each array of sensors 12 in a wellbore 10 is beam steered along a predetermined direction, and the beam steered signals from each vertical array of sensors 12 are combined.

The beam steering is repeated to focus the response of the array to each point in the subsurface to be evaluated for microseismic events. From this, position and time of origin for the microseismic events can be identified.

The beam steering is performed by adding a time delay to the signal recording from each sensor 12. In this way, any event that may have occurred at a specific time at a specific location would be expected to reach the sensor 12 at that associated delay time. Therefore, the time delay applied to the signals depends on the geodetic position and depth of each sensor 12. Additionally, the time delay also depends on the spatial distribution of seismic velocity of the formations in the subsurface, which is determined beforehand by active source reflection seismic surveying and combined in some cases with acoustic measurements made from wellbores penetrating the rock formations to the target depth. See e.g., U.S. Pat. No. 7,663,970 to Duncan et al. and U.S. Pat. Publication No. 2011/0242934 to Thornton et al.

Although the above microseismic approaches may be effective, it will be appreciated that significant variability exists in a subsurface formation at all scales, and the variability directly affects what and how production can be achieved. For example, experience shows that production along a lateral section of a well is not uniform. In fact, any resulting production from a reservoir tends to come from those stages that have been fractured, which may not even include all of the hydraulic fracture stages. Being able to more fully understand and characterize the high spatial variability of a reservoir will always be an ultimate goal in the well completions industry. To that end, microseismic monitoring has the ongoing challenge of detecting and recording small signals in a high-noise environment, accurately locating microseismic events, and mapping those events over a wide area.

The related art discussed above with reference to FIG. 1 through FIG. 3B is not necessarily prior art for the purposes of patentability. The related art is merely discussed as background with respect to the subject matter of the present disclosure.

The subject matter of the present disclosure is directed to overcoming, or at least reducing the effects of, one or more of the problems set forth above.

SUMMARY OF THE DISCLOSURE

In one embodiment, a surveying method and system according to the present disclosure integrates active and passive surveying of a subsurface volume in either land-based or marine-based applications. Seismic information is gathered by two arrays of sensors during a seismic survey. Information from one of the arrays is used to augment the computation of a property (e.g., sub-surface geology, near-surface velocity model, etc.) of the subsurface volume determined with information from the other array.

In particular, first arrays of first sensors are arranged in a first arrangement relative to the subsurface volume, and second arrays of second sensors are arranged in a second arrangement relative to the subsurface volume different from the first arrangement. First seismic data is collected with the first sensors in response to first seismic energy, and second seismic data is collected with the second sensors in response to second seismic energy, which may be the same as or different from the first seismic energy. The collected first and second seismic data is combined, and at least one property of the subsurface volume is determined from the combined seismic data.

As one example, the first arrays of the first sensors can be surface arrays of surface sensors arranged in a desired area on the surface above the subsurface volume. By contrast, the second arrays of the second sensors can be buried or shallow arrays of buried sensors disposed in boreholes in the desired area of the surface or can be patch arrays of surface sensors arranged in dense arrangements in the desired area. Seismic data is collected using the surface sensors and the buried array sensors in response to seismic energy. In general, the seismic energy may be induced or generated in the subsurface volume using a seismic source, such as blast charge, vibrator, etc. However, the seismic energy may be naturally occurring seismic activity in which case the seismic data is collected passively. Either way, the collected seismic data from both the surface sensors and the buried array sensors is combined to determine the property of the subsurface volume.

In further processing, the determined property of the subsurface volume can be dynamically adjusted based on seismic information collected with buried array sensors in response to microseismic events. In general, the microseismic events can be actively induced or naturally occurring. For example, fractures may be induced in a well in the subsurface volume by operators performing a hydraulic fracturing operation. Any resulting microseismic events generated by the operation can be sensed by the buried arrays in the surrounding boreholes and used to adjust the originally determined property of the subsurface volume. Alternatively, the microseismic activity may be naturally occurring in the subsurface volume.

In another embodiment, a surveying method and system according to the present disclosure detects microseismic events using arrays of sensors arranged relative to a subsurface volume in either land-based or marine-based applications. Seismic data is collected with the sensors. A first moveout is detected in a first of the arrays by analyzing the collected seismic data in at least one direction for the first array. One or more second moveouts are detected in one or more second of the arrays by analyzing the collected seismic data in the at least one direction for the one or more second arrays. When the one or more second moveouts are determined comparable to the first moveout, an occurrence of an event in the subsurface volume is declared in response to the determination that the first and second moveouts are comparable.

For example, the array of sensors can be arranged in boreholes in the subsurface volume. The boreholes can be drilled where desired, and arrays of sensors can be affixed on tubulars, which are then disposed in the boreholes and cemented in place. This is repeated at several locations in an area of interest in any desired spacing or pattern. The sensors can be three-component sensors or can be single-component sensors possibly, but not necessarily, arranged to sense in three component directions.

During use, a given one of the buried arrays of sensors detects a specified moveout on a single component (e.g., Z-component). The moveout may be linear and may require a certain threshold to be reached before a determination of sufficient moveout is made. Analysis of the sensor response for that same buried array then confirms the presence of the moveout on other components (e.g., X- and Y-components). Again, the moveout can be linear and may need to exceed a given threshold.

If moveout is confirmed on the other components, further analysis interrogates the seismic data of one or more of the other buried arrays for a similar event. If the one or more other buried arrays exhibit sensor responses indicative of a similar event, then analysis determines that a microseismic or another type of event has occurred. Moveout can be confirmed at any of the other buried arrays even though there is no positive confirmation of moveout in the other components of the initial buried array.

Finally, the seismic data from the microseismic event can then be used for any of the various purposes disclosed herein. In essence, detecting the event involves determining that a second type of wave exists when a first type of wave is identified. For example, if a P-wave is detected, the analysis of the system and method looks for an S-wave arrival after the P-wave.

The foregoing summary is not intended to summarize each potential embodiment or every aspect of the present disclosure.

BRIEF DESCRIPTION OF THE DRAWINGS

FIG. 8A illustrates a flowchart of a seismic survey process according to the present disclosure.

DETAILED DESCRIPTION OF THE DISCLOSURE

A. Integrated Land Seismic Acquisition and Monitoring System

1. System Configuration

Figure 1:
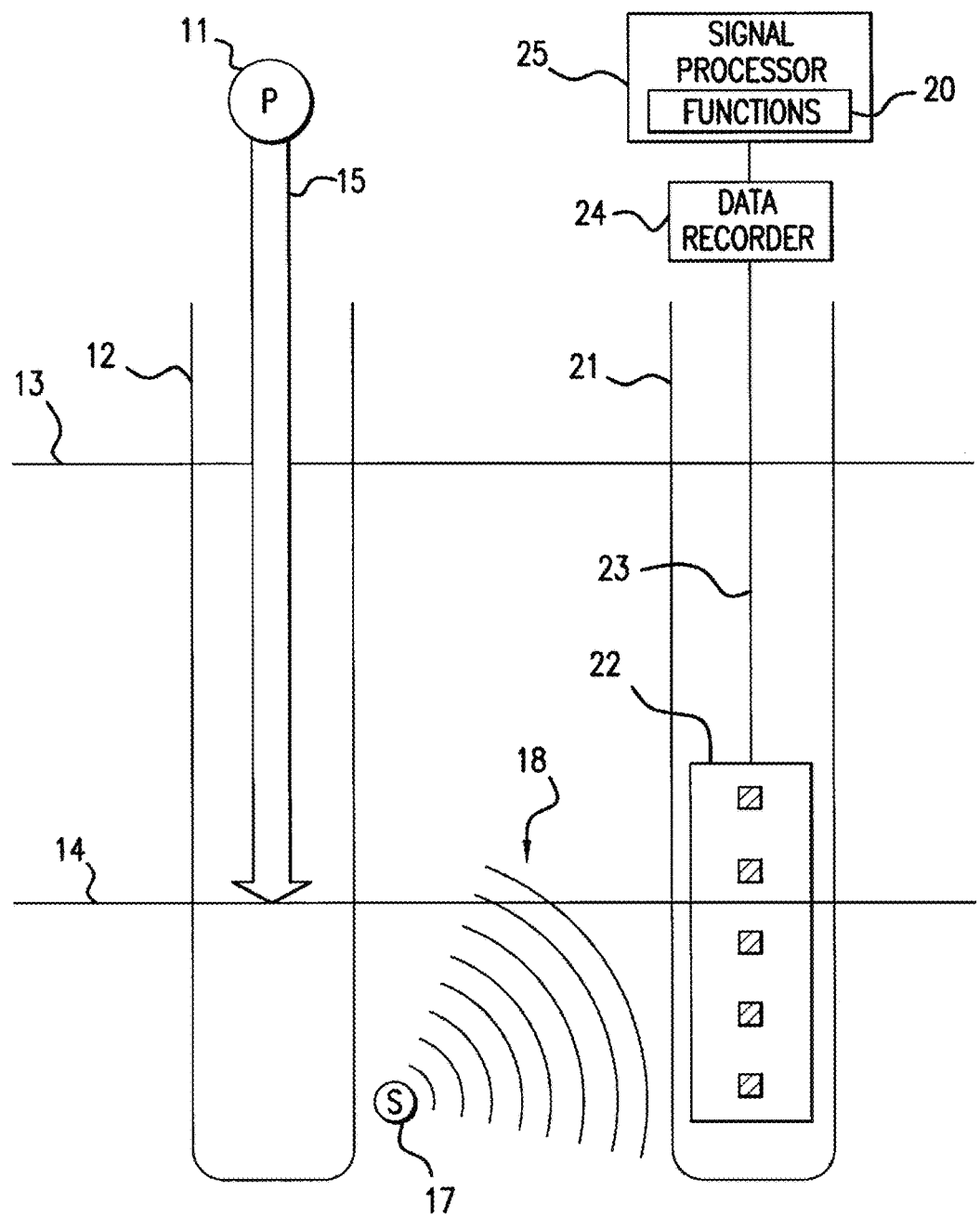
FIG. 1 illustrates a system for determining distribution and orientation of natural fractures in subterranean structures.
Figure 2:
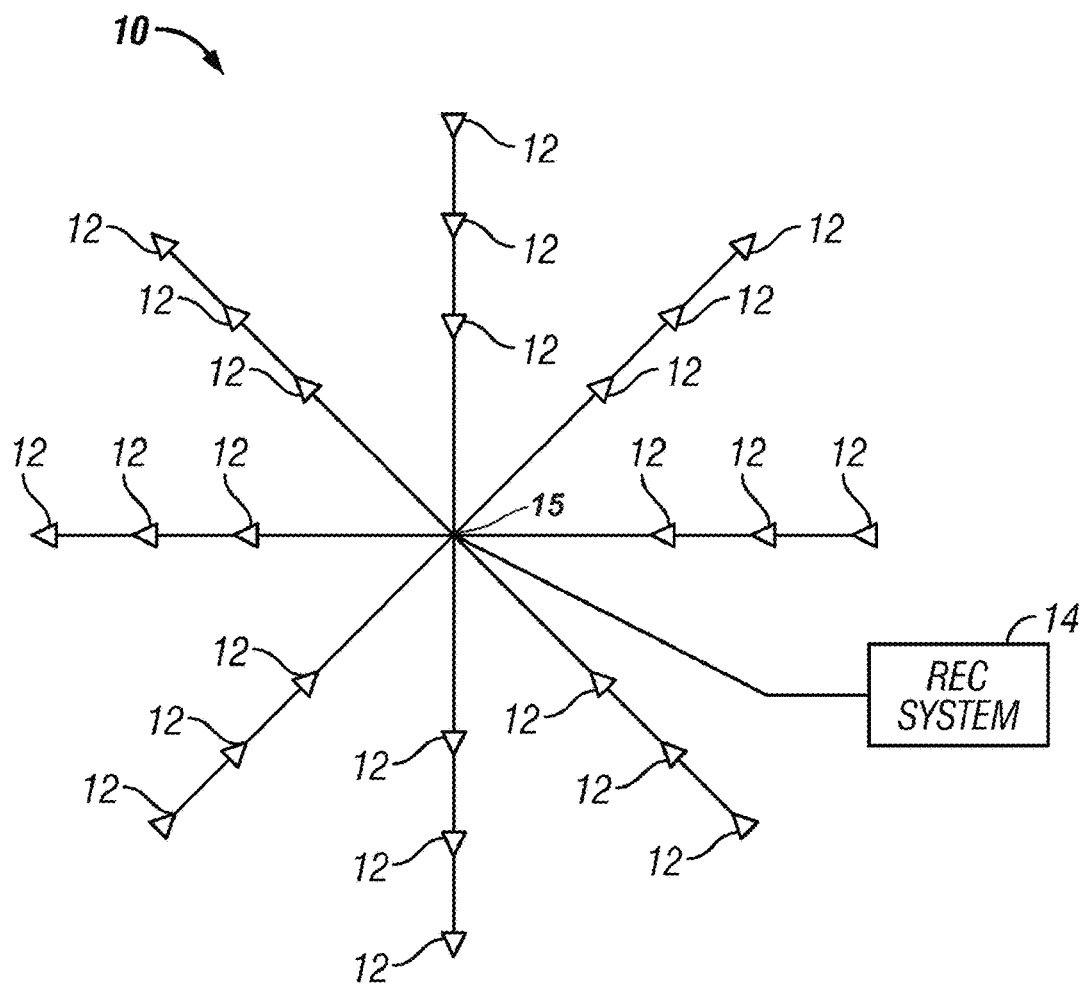
FIG. 2 illustrates seismic sensors distributed over the ground to monitor a volume of the subsurface.
Figure 3A:
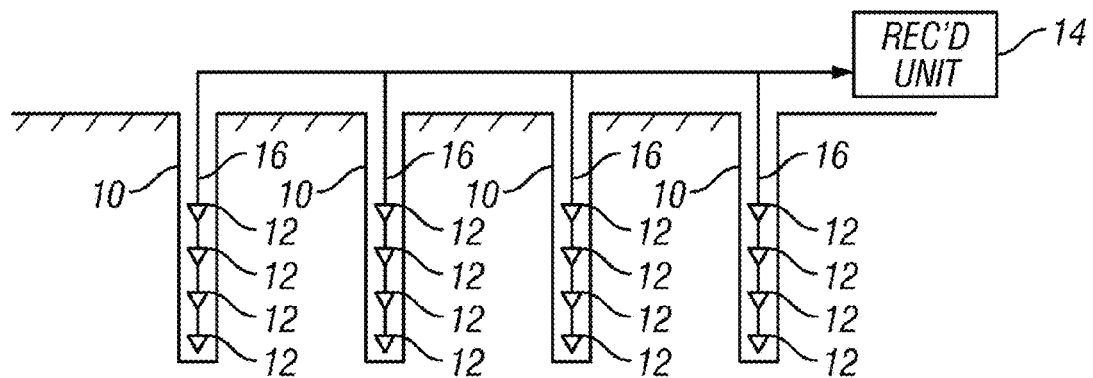
FIG. 3A illustrates sensor arrays disposed in wellbores.
Figure 3B:
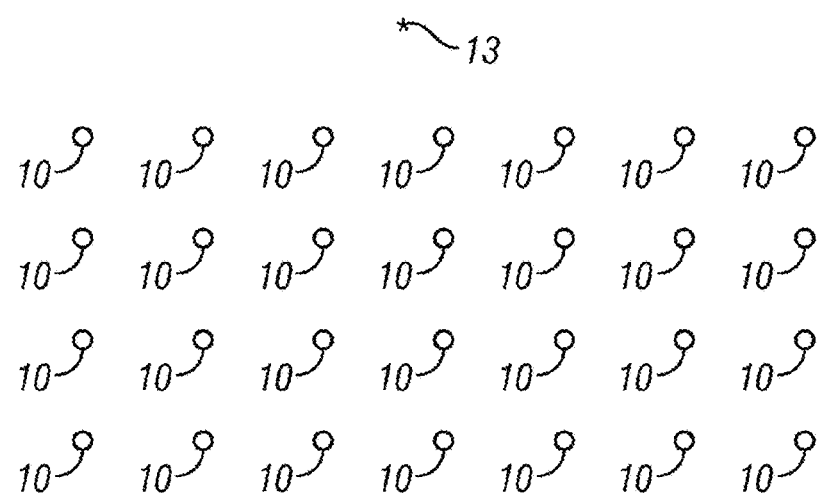
FIG. 3B illustrates a plan view of the wellbores having sensors arrays as shown in FIG. 3A.
Figure 4A:
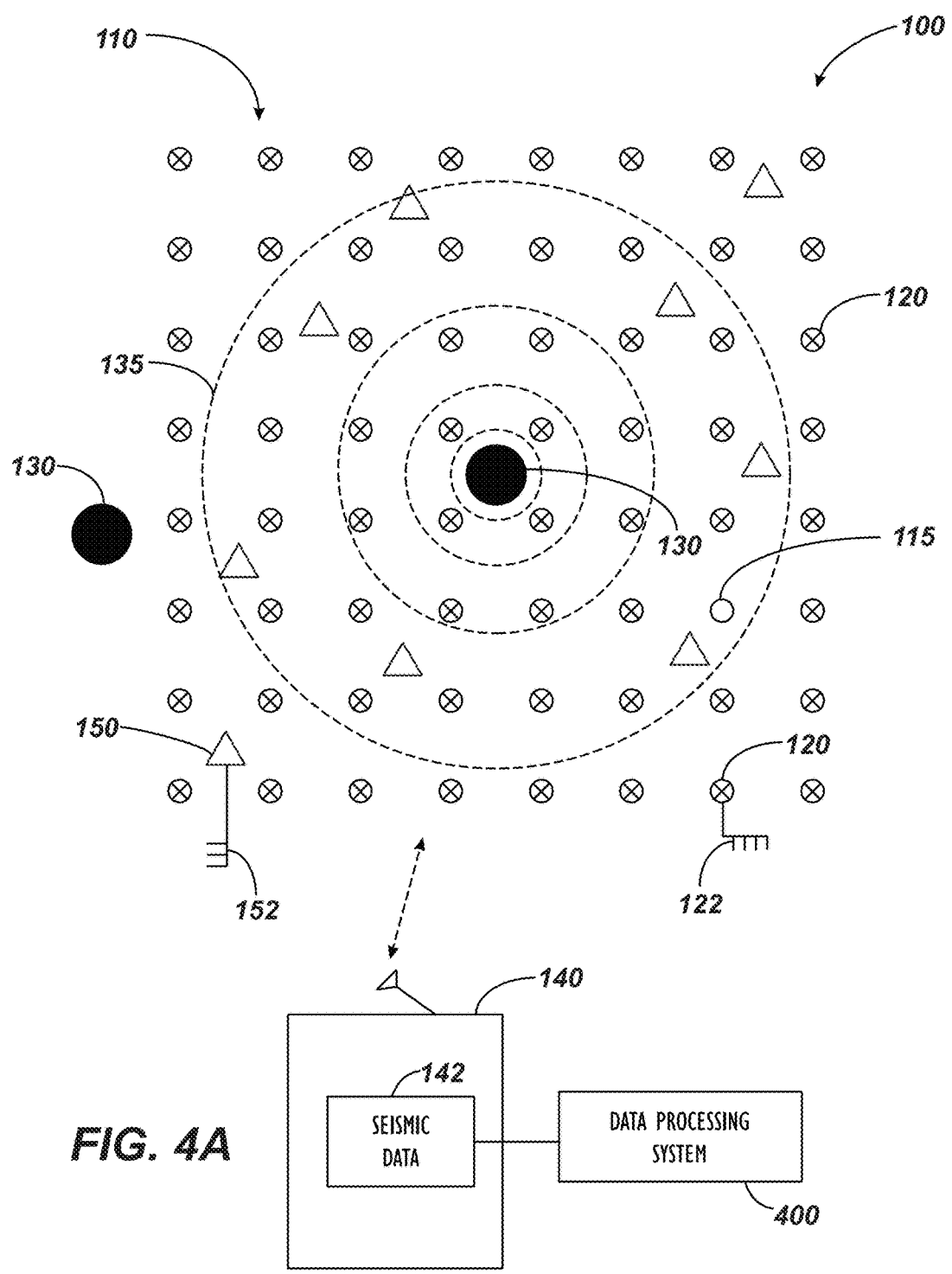
FIGS. 4A and 4B schematically illustrate plan and elevational views of an integrated seismic acquisition and monitoring system according to the present disclosure for a land-based implementation.
Figure 4B:
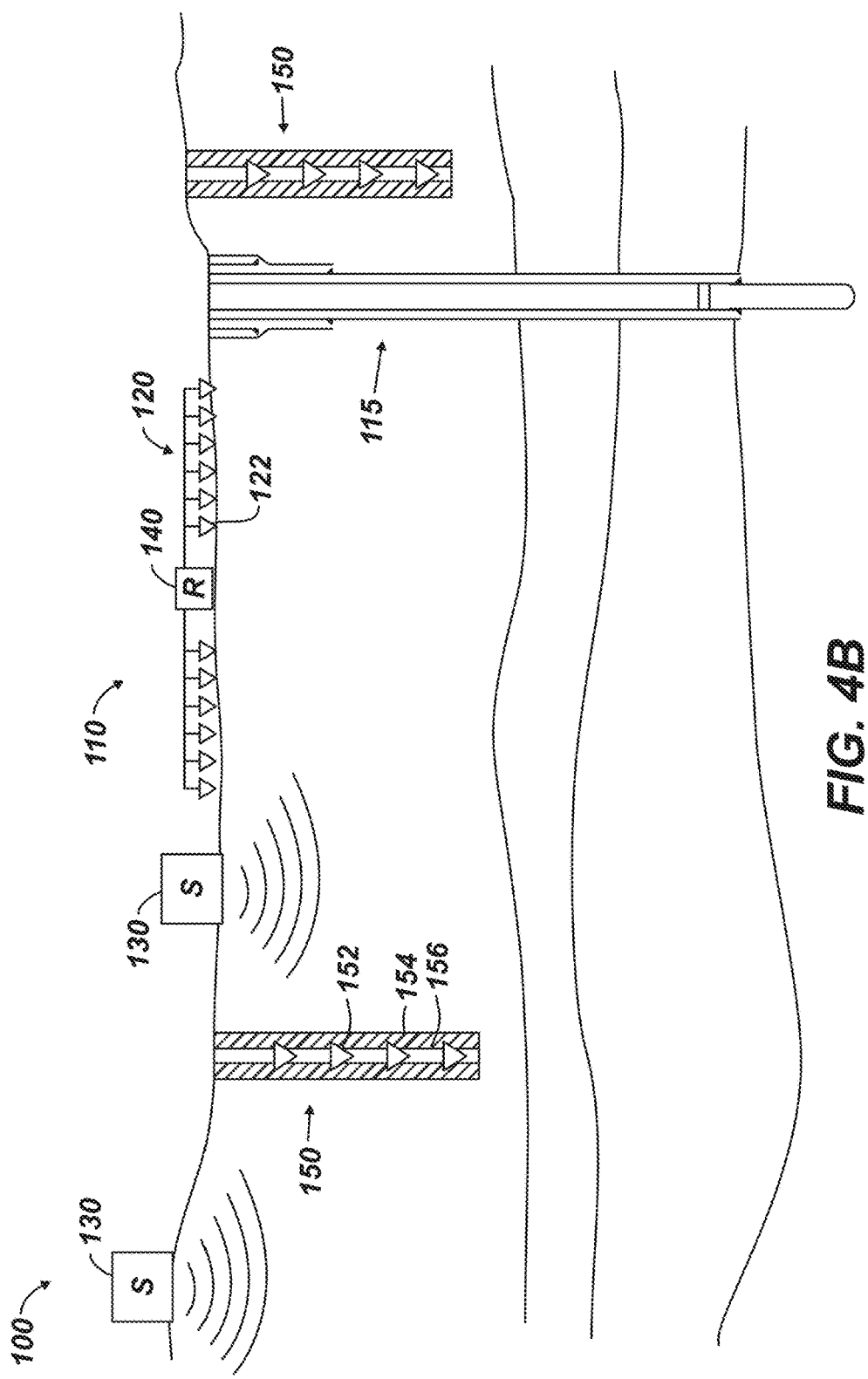

FIGS. 4A-4B schematically illustrate plan and elevational views of an integrated seismic acquisition and monitoring system 100 according to the present disclosure to generate information (e.g., geological, geomechanical, geophysical, etc.) and image earth subsurface structures of a subsurface volume or formation. Although discussed in the context of a land-based implementation, the system 100 can be used in a marine survey, as detailed later with reference to FIGS. 4E-4F.

The system 100 includes one or more sources 130, surface receivers 120 in a first arrangement relative to the formation (i.e., subsurface volume), and a recording unit 140 in communication with the surface receivers 120. In this first arrangement, the surface receivers 120 are arranged substantially horizontally in one or more arrays 110 relative to the formation (i.e., laid on the near-surface of the ground and arranged substantially parallel relative to the ground and the formation below). Any acceptable deviation (e.g., angle) from horizontal or parallel can be accommodated, as appreciated by one skilled in the art.

The surface receivers 120 can be deployed as autonomous point receivers or deployed in one or more arrays 110 with cables. Either way, the surface receivers 120 are spaced about the survey area as shown in FIG. 4A, and each surface receiver 120 can have one or more sensors 122. The spacing of the sensors 122 gives a particular resolution and can be designed for a given implementation. The sensors 122 measure geophysical information and can include single component or multiple component (i.e., 3-component) sensors for obtaining multi-dimensional energy. A given sensor 122 can include an accelerometer, a velocity geophone, a fiber optic sensor, a microphone, or the like, and the array 110 of the sensors 122 can use any combination of these.

In addition to the surface arrays 110, the system 100 has a plurality of "buried" arrays 150 located within or outside the area of the seismic survey. The buried arrays 150 consist of a plurality of buried receivers or sensors 152 in a second arrangement relative to the formation. In this second arrangement, the sensors 152 in a given array 150 are arranged substantially perpendicular relative to the formation (i.e., arranged substantially vertical relative to the ground and the formation below). Any acceptable deviation (e.g., angle) from vertical or perpendicular can be accommodated, as appreciated by one skilled in the art. Although the arrays are described as being buried, the arrays may be a "shallow array" of sensors in the near-surface. The buried or shallow array can be permanent or can be re-deployable. Each sensor 152 can have one or more single or multiple (three) component sensors. Finally, the spacing of the arrays 150 and the sensors 152 gives a particular resolution and can be designed for a given implementation.

In general, a given buried sensor 152 can use an accelerometer, a geophone, a hydrophone, a fiber optic sensor, a microphone, or other type of sensor, which can be the same as or different from the sensors 122 used with the surface receivers 120. Likewise, a given array 150 of the sensors 152 can use any combination of these types of sensors. As noted below, each of the sensors 152 may preferably use a three-component geophone having a geophone element and having a low-noise amplifier integrated therein. The buried sensors 152 are arranged vertically in each array 150 in shallow boreholes 154, which are several tens of meters in depth as described later.

The one or more seismic sources 130 impart acoustic energy into the ground. For this land-based implementation, the seismic sources 130 can be vibrators, although other types of sources can be used. The sensors 122 and 152 receive the imparted energy after reflection and refraction at boundaries in subsurface structures, and the sensor data is then communicated to the recording unit 140 using wireless technology or other communication techniques. Finally, the formation may have one or more wellbores 115 of interest either drilled or proposed to be drilled in the formation to a reservoir below.

The one or more seismic sources 130 used for the acquisition of a survey can be conventional sources, such as vibrators, dynamite shots, or the like. If more than one source 130 is used, they may generate different input energies into the formation, which can produce different types of seismic energy into the different arrays 110 and 150. For example, one source 130 for the surface arrays 110 can use a vibrator, while another source 130 for the buried arrays 120 can use a dynamite shot. In fact, the sources 130 used can be different and can produce different bandwidths, or the sources 130 used can be either the same or different, but can be used simultaneously. These and other variations can be used, as will be appreciated with the benefit of the present disclosure.

In general, the overall configuration of the system 100 (i.e., how the arrays 110 and 150 and sources 130 are arranged, spaced from one another, etc.) is determined by the target depth, the desired spatial resolution, and other factors. It is noted that the arrangement of the arrays 110 and 150 in two dimensions need not follow a regular pattern as displayed in FIG. 4A, but could also be placed in some more random arrangement; provided that the surface coordinates of the arrays 110 and 150 are known with sufficient accuracy.

During a survey, the system 100 uses the two arrangements (i.e., orientations and spacing) of the arrays 110 and 150 to offer different resolutions of the formation and to offer different perspectives or focal points of the formation relative to the same sources 130 of seismic energy. The surface arrays 110 arranged horizontal to the formation have a different orientation to the seismic energy than the buried arrays 150 arranged vertical to the formation. The different perspectives or orientations can, thereby, be used to further enhance the image of the formation and the properties determined, as disclosed herein.

During a survey, for example, the seismic sources 130 "shoot" into the buried arrays 150 and the signals are recorded. When the signals are processed by a data processing system 400, the information from these buried arrays 150 is used to determine the elastic properties of the shallow earth in the survey area. In turn, the determined elastic properties are used to optimize the processing of the information recorded in the surface receivers 120. Moreover, as discussed later, the buried arrays 150 are also used for passive monitoring of microseismic events in the subsurface formations.

As shown in FIG. 4B, a few of the buried arrays 150 used in the system 100 are schematically shown relative to some of the seismic sources 130, the surface receivers 120, and an existing or future wellbore 115. As noted previously, the buried arrays 150 have vertically-arranged receivers or sensors 152 disposed in shallow boreholes 154 in the area of interest. Each borehole 154 has a line of several sensors 152 disposed vertically therein. These boreholes 154 can be existing boreholes from surrounding wells or may be drilled for this purpose. Although the sensors 152 could be suspended within the borehole 154 in a number of ways, the sensors 152 are preferably deployed on piping or tubular 156. The boreholes 154 can be filled with a medium that couples the sensors 152 to the surrounding rock and that adequately matches the P and S impedance of the surrounding rock. In some implementations, the sensors 152 can be cemented in the borehole 154, although the sensors 152 can be hydrophones disposed in fluid filling the borehole 154.

Regardless of the coupling method, the boreholes 154 may have an appropriate depth for about four to seven sensors 152 deployed at about every 20 m. In general, the boreholes 154 can be drilled deeper when there are very high levels of surface noise, or they may be drilled shallower if surface noise is less of a problem. Of course, more or less receivers 152 may be used, and they may have any suitable spacing, preferably evenly between one another in the borehole 154.

Figure 4C:
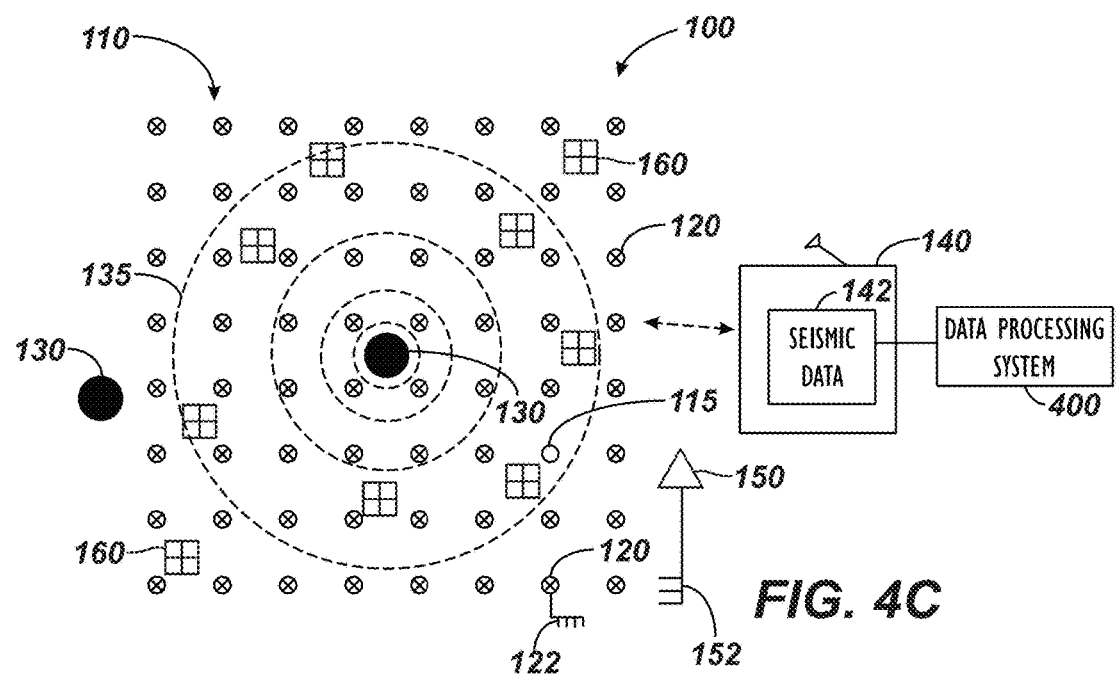
FIGS. 4C and 4D schematically illustrate plan and elevational views of another land-based system using different sensor array arrangements.
Figure 4D:
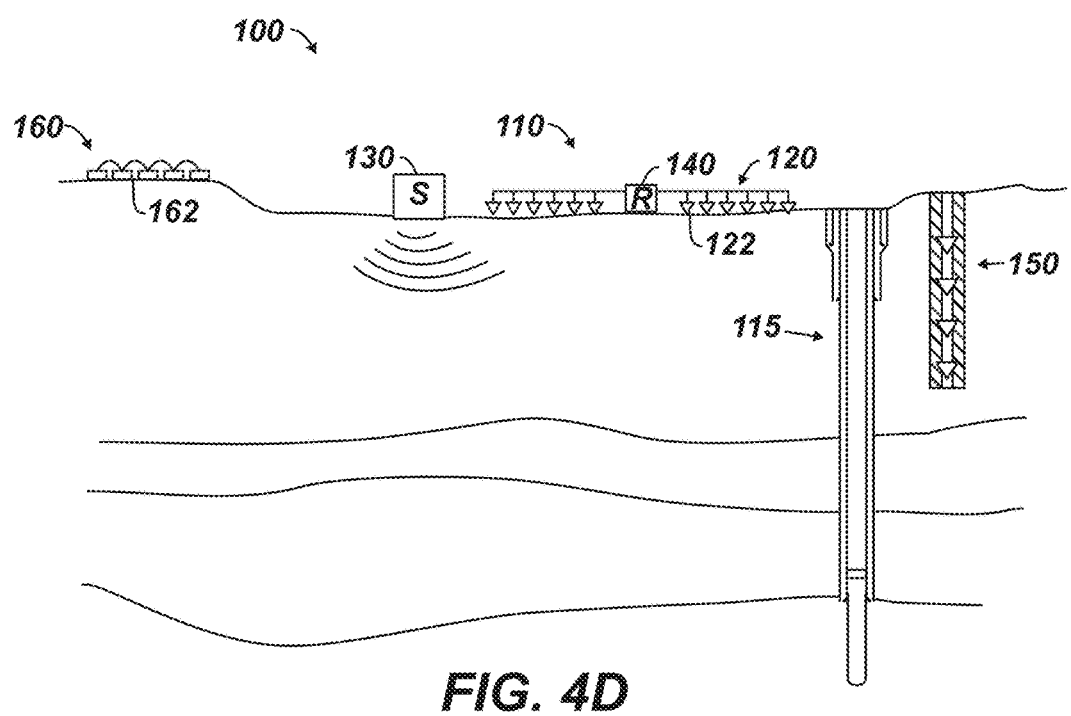

The two different arrangements of the arrays 110 and 150 in FIGS. 4A-4B relate primarily to orientation of the sensors, although the density (i.e., spatial density involving spacing between sensors and placement relative to the formation) used on the arrays 110 and 150 could be the same or different. Other types of different arrangements could be used. For example, FIGS. 4C and 4D schematically illustrate plan and elevational views of another land-based implementation of the disclosed system 100 using different sensor array arrangements. Here, the system 100 includes second arrays 160 in the form of surface patch arrays of multiple sensors 162. In one example, the patch arrays 160 may have its sensors 162 arranged in a 100-m by 100-m matrix with the sensors 162 arranged every 10-m. Other configurations can be used. In general though, the patch arrays 160 have a denser collection and configuration of the sensors 162 than the surface arrays 110 and may be placed on the ground at different locations from one another than the surface arrays. These surface patch arrays 160 can be used in addition to or instead of the buried arrays 150 to provide the second array arrangement for the disclosed system 100.

2. Survey Process

Figure 5:
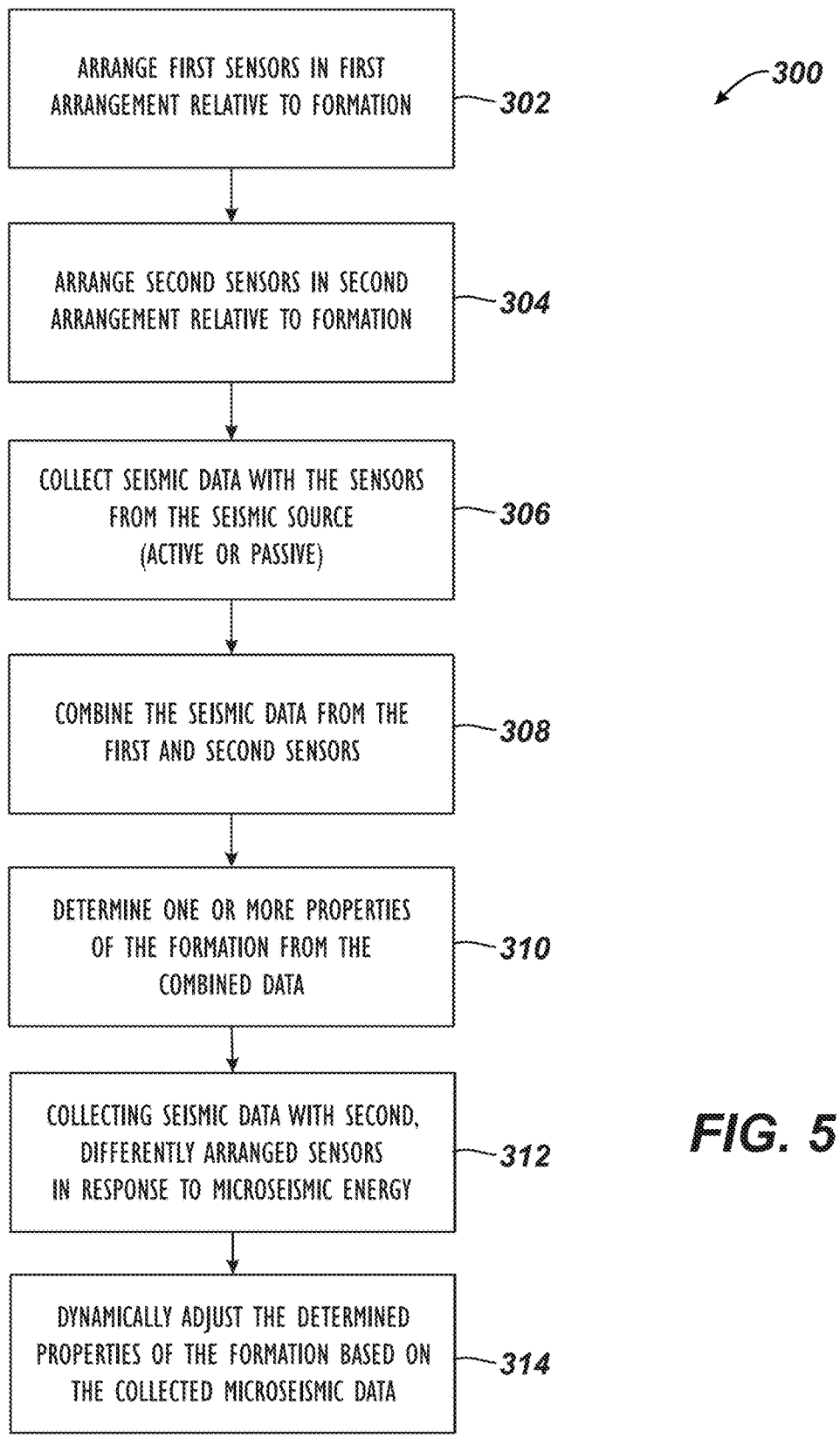
FIG. 5 illustrates a flowchart of a seismic survey process according to the present disclosure.

Having an understanding of the survey system 100, discussion now turns to a seismic survey process 300 according to the present disclosure shown in FIG. 5. The process 300 is discussed in the context of the land-based implementation of FIGS. 4A-4D, but can equally apply to any other implementations disclosed herein. Broadly, information gathered by the first arrangement of sensors 152 (and/or surface patch sensors 162) during a seismic survey augments the computation of a property (e.g., subsurface geology, near-surface velocity model, etc.) of the formation obtained with the second arrangement of sensors 122.

More specifically, to survey the formation, one or more first arrays having a plurality of first sensors are arranged in a first arrangement relative to the formation (Block 302). These include, for example, the surface sensors 122 arranged in the arrays 110 at the surface in FIGS. 4A-4D. These horizontally-arranged sensors 122 can be arranged and placed in desired areas of interest and at desired spacing.

Additionally, one or more second arrays having a plurality of second sensors are arranged in a second arrangement relative to the formation (Block 304). These second arrays can include, for example, the buried arrays 150 of sensors 152 in FIGS. 4A-4B, which can be arranged and placed in the desired area and at desired spacing using new or existing boreholes 154. Because the buried arrays 150 are vertical, they have a different arrangement (orientation) relative to the formation and the seismic energy than the surface arrays 110. Additionally, the buried arrays 150 can have different spacing and placement than the surface arrays 110.

In addition to or as an alternative to the buried arrays 150, the second arrays can include the surface patch arrays 160 of sensors 162 in FIGS. 4C-4D. Even though the surface patch arrays 160 are horizontal and have the same relative orientation as the surface arrays 110 to the formation, the surface patch arrays 160 still have a different arrangement relative to the formation than the surface arrays 110 because they have different density, spacing, and placement than the surface arrays 110.

First seismic data 142 is collected with the first sensors 122, and second seismic data 142 is collected with the second sensors 152/162 for recording at the recording unit 140 (Block 306). The collection of data is made in response to seismic energy, which can be from one or more active sources 130 (e.g., blast charge, a vibrator, an air gun, a water gun, a sparker, an impulsive source, a compressive source, and a shear wave source) or from a passive source (e.g., earthquake, a fault slippage, production from a local wellbore 115, a fracturing operation in the local wellbore 115, a breaking-up of ice, an environmental source with identifiable location). The data 142 for the two arrays 110 and 150 can be obtained at the same or different times.

The collected first and second seismic data are then combined using the data processing system 400 (Block 308), and at least one property of the formation is determined from the combined seismic data (Block 310). Any of a number of properties can be determined of the formation and can include, but are not limited to, a subsurface structure, a near-surface (compressional and shear) velocity model, anisotropy parameters of the subsurface, acoustic and shear impedance, inelastic parameter, elastic parameter, formation density, brittleness of the formation's reservoir, rigidity, fracture attribute of the reservoir, density of the reservoir, pore pressure of the formation or portion thereof, and the like.

To determine at least one property of the formation from the combined seismic data, a model can be imaged of the property by constraining the model determined with the first seismic data by a constraint determined from the second seismic data. The model used in the imaging can be a model of velocity, shear velocity, compressional velocity, anisotropic parameter, attenuation parameter, etc., and the imaging process can use Kirchhoff-based, RTM-based, or wave equation-based techniques.

In one particular embodiment, the imaging can use wave form inversion (WFI) on the first (e.g., surface) seismic data with penalty constraints from the second (e.g., buried, vertical, or denser) seismic data to construct earth model parameters, e.g., compressional velocity, shear velocity, and density, from the wave form information of the seismic data. In the WFI technique, a property of the subsurface, such as compressional velocity, is determined by minimizing a first difference between (a) the data recorded at one set of arrays (e.g., array 110 of surface receivers 120) and (b) the data as modeled at those same receivers 120 using a current estimate of the subsurface property. Here, this first difference is further minimized simultaneously with an equivalent second difference for the other set of arrays, such as the buried arrays 150 so that the joint difference is minimized between the sets of arrays 110 and 150. Alternatively, the second difference for the other arrays (e.g., the buried arrays 150) can be minimized, and the predetermined property resulting from that analysis of the buried arrays 150 can then be used as a constraint in the update of the model for minimizing the first difference of the first arrays.

In another embodiment, the imaging can generate a near-surface model of the formation by constraining a shallow surface wave inversion with the second (e.g., buried, vertical, or denser) seismic data. Then, the first (e.g., surface) seismic data is imaged using the generated near-surface model. In this instance, the second data set (i.e., from a buried array 150) provides detailed "uphole" information, which can constrain the surface wave inversion and provide a more detailed and accurate near-surface model. As will be appreciated, such a near-surface model can help produce an accurate image of the subsurface with the first data set (i.e., from the surface arrays 110). The uphole information provided by the buried arrays 150 is much richer than the conventional uphole shot times, in that the buried array information provides compressional and shear velocity information, as well as attenuation measurements. As a result, a statics correction can be avoided during processing and can be replaced by a more accurate imaging step through the surface layer.

In further processing, seismic data can be collected with the second sensors 152/162 (and optionally with the surface sensors 122 as well) in response to microseismic energy from either passive or active microseismic events (Block 312). When this further microseismic data is analyzed, the analysis can be used to dynamically adjust the previously determined property of the formation by adding an additional constraint to the property determination (Block 314).

In particular, in combining the collected seismic data from the two perspectives (surface array 110 along with the buried array 150 and/or patch arrays 160), the system 100 obtains direct information about the formation property (e.g., velocity model, attenuation, etc.) from one perspective (arrays 150/160) and refines the property with direct information from the other perspective (arrays 110). For instance, data from the second arrays 150/160 can be used to determine a formation property (the attenuation, P-wave velocity model, S-wave velocity model, anisotropy, and the like) at the near surface. This information at the near surface is then used as a constraint on the same formation property determined by the data from the surface arrays 110.

The microseismic events can be from fracturing, intervention, and production, or the events can be naturally occurring. For example, in the initial survey of Blocks 306 to 310, an initial near surface velocity model may be determined based on the readings of the surface sensors 122 and the other sensors 152/162 in response to active sources 130, such as vibrators, dynamite shots, etc. Thereafter, operators may dig local wellbores 115 in the area or may operate existing wellbores 115 for fracturing, intervention, production, etc. in the reservoir of the formation. Activities such as drilling, fracturing, intervention (i.e., fluid or steam injection), production, and other active operations can induce microseismic activity in the formation that is detected by the second sensors (152/162) (and possibly also the surface sensors 122), and analysis of the microseismic events may be used to improve the near surface velocity model. The microseismic events need not be actively induced, however. Instead, the system 100 can monitor passive events caused by micro-earthquakes, fault slippage, breaking-up of surface ice, environmental noise with identifiable location (e.g., passage of a cargo train on a local track), etc. in the area of interest.

3. Data Processing and Modeling Examples

Given an understanding of the system 100 and the overall survey process used, discussion now turns to some details on the data processing and modeling performed on the formation data.

As noted in the Background of the present disclosure, land-based seismic surveys do not use extraneous information to assist in the characterization of the shallow earth model and at most record information at shallow shot/dynamite holes to improve the shallow "statics" model. In contrast, the disclosed system 100 uses uphole information obtained at each buried array 150 (i.e., at the buried sensors 152 in that buried array 150) as additional information to characterize a shallow earth model of the area of interest.

The information obtained by the buried arrays 150 is of different types, including upcoming compressional (P) wave energy and shear (S) wave energy reflected from layers in the earth, as well as energy propagating in the near surface, which are known as surface waves. Having the plurality of buried sensors 152 within the buried arrays 150, the system 100 can obtain a detailed velocity profile of the near surface at each buried array's location. Using the multiple buried arrays 150 and seismic sources 130, the system 100 can generate and correlate the detailed velocity profile of the near surface across the area of the seismic survey and beyond. Specialty sources 130, such as shear sources or high frequency sources, can be used to maximize the near surface information obtained with these buried arrays 150. For example, with a shear source 130, shear signals can also be readily observed in the buried arrays 150, thereby forming an accurate shear velocity profile of the near surface.

Additionally, the buried arrays 150 and seismic sources 130 can be situated at a variety of azimuths in the survey area. The variation in azimuths between buried arrays 150 and seismic sources 130 can then be used to determine the variability of the shallow earth properties as a function of azimuth, which is known as anisotropy. To obtain this information, the data processing system 400 processes the recorded signals 142 from the seismic sources 130 into the sensors 122 and 152 using standard seismic techniques or by adapting interferometric techniques. The resulting, refined information acquired by this processing gives a detailed set of deliverables that are much more refined than the standard information normally available in a land-based survey.

The integration of passive microseismic with active surface seismic can also further enhance the near-surface understanding and can enhance c-wave/p-wave imaging and associated reservoir characterization deliverables. Briefly, having the sensors 152 placed in the boreholes 154 in addition to having the sensors 122 placed at the surface, the system 100 can measure energy traveling up through the earth to the surface (with its different responses due to variations in the near surface), but the system 100 can also measure near surface attenuation using the buried sensors 152. As will be appreciated, attenuation changes with respect to depth and x-y position, and the attenuation distorts the frequency of the seismic signals being detected. The system 100 in its processing uses a Fourier transform to determine the frequency content of the seismic signals and determine the attenuation (Q) and other deliverable values. In turn, these values can be interpolated three-dimensionally over the survey area and can be fed back into the surface model used by the system 100 during its processing of the seismic data. The interpolation of the surface model preferably relies on weighting to determine aspects of the near-surface attenuation in those areas of the survey in which buried sensors 152 are not present.

Using the buried sensors 152, the system 100 can also measure near-surface shear wave properties. As will be appreciated, compressional (P) waves arrive in the borehole 154 as Z-components, but the shear (S) waves arrive as X-Y components. In many instances, conventional seismic data can be incomplete because it lacks an accurate shear wave velocity, especially for the near-surface. The buried sensors 152, however, can give a measure of the shear wave velocity, which can also be interpolated three-dimensionally over the survey for those areas lacking buried sensors 152.

Finally, deliverables of the P-wave velocity can also be determined by the system 100 from the rich set of data available from the surface sensors 122 and buried sensors 152. Using all of the values of these deliverables, the data processing system 400 can process the seismic signals of the surface sensors 122 and remove or filter out those signal components, events, and the like that are undesirable or extraneous. In this way, the seismic signals provided by the buried sensors 152 enhance the normal surface acquisition with the surface sensors 122 by the system 100. These and other data processing results can be obtained with the disclosed system 100, as detailed below.

4. Marine-Based Implementation

Figure 4E:
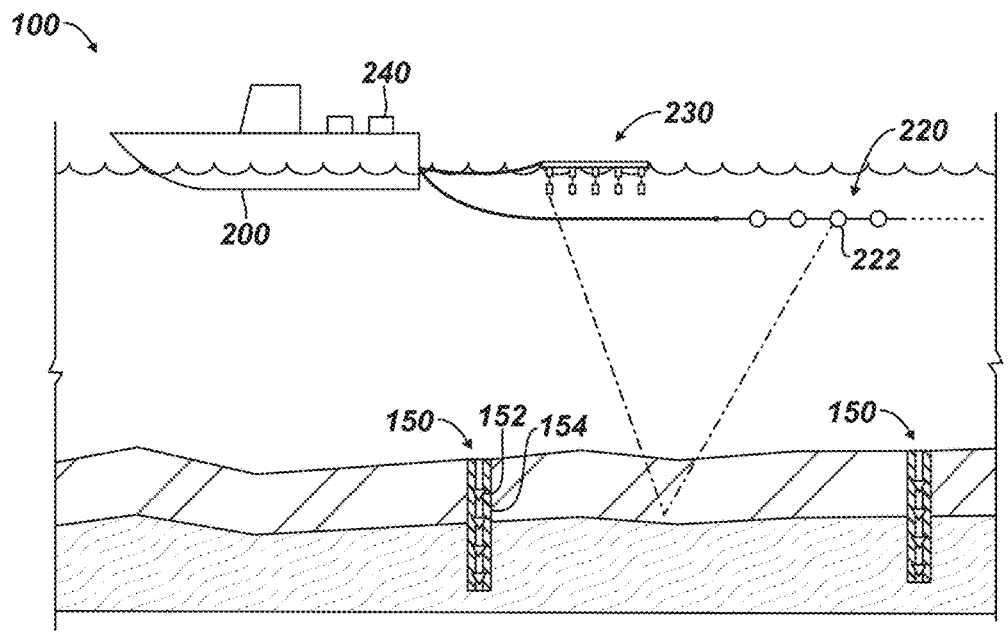
FIGS. 4E-4F schematically illustrate elevational views of integrated seismic acquisition and monitoring systems according to the present disclosure for a marine-based implementation.

Although the system 100 in FIGS. 4A-4D was directed to a land-based implementation, the benefits of the disclosed system 100 can be applied to a number of marine-based systems. For example, FIG. 4E schematically illustrates the integrated seismic acquisition and monitoring system 100 for a marine-based implementation having one or more seismic streamers 220 and a source 230 towed by a seismic vessel 200 in a body of water, such as the ocean. Used in conjunction with the streamer(s) 220 and the source 230, the system 100 has buried arrays 250 of vertically-arranged sensors 252 disposed in boreholes 254 in the seabed.

The sensors 222 on the streamers 220 can be hydrophones as conventionally used in a marine-based implementation, and the source 230 can use one or more air guns, water guns, or other typical marine-based source. As noted above, the buried arrays 250 can provide the substantially vertical seismic sensing for the disclosed system 100. For their part, the sensors 252 in the buried arrays 250 can be accelerometers, geophones, hydrophones, fiber optic sensors, microphones, or the like disposed in the boreholes 254 in a manner similar to the land-based implementation disclosed previously.

Figure 4F:
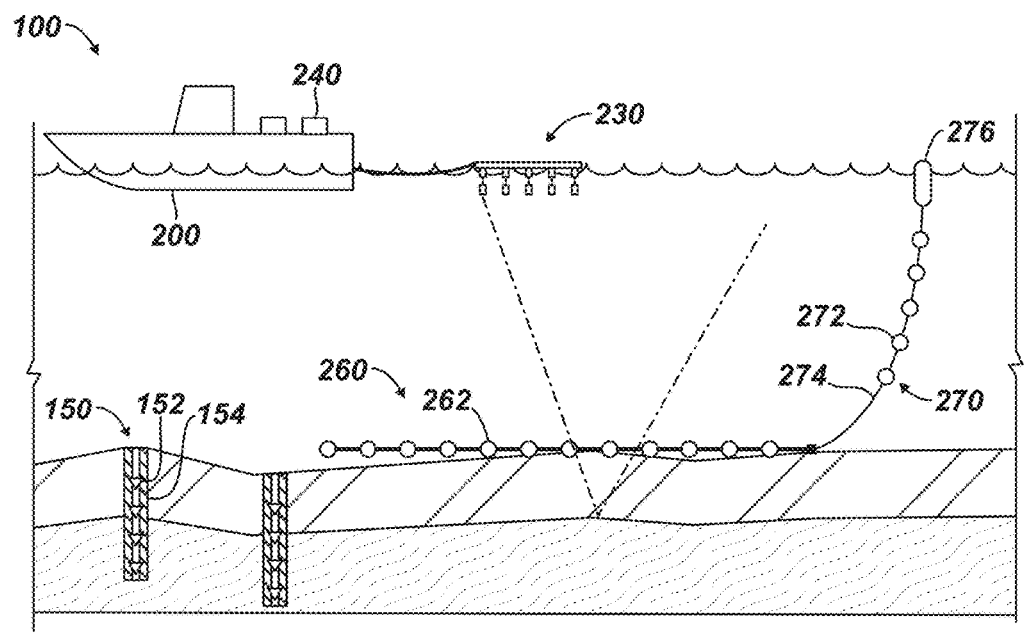

In FIG. 4F, the system 100 for the marine-based implementation again has the source 230 towed by the seismic vessel 200 in a body of water. At the seabed, the system 100 has buried arrays 250 in boreholes 254 as before, but includes ocean-bottom cables 260 with surface sensors 262 disposed on the seabed. As an addition or alternative to the buried arrays 250, the system 100 can have sensors 272 disposed on a vertically extending line 270. Although the line 270 can be any substantially vertical cable extending vertically through the water column, the line 270 shown here is actually the tether of the ocean-bottom cable 260. In this case, the line 270 extends up from the ocean-bottom cable 260 at the seabed, through the water column, and to a surface buoy 274 or to a vessel. The sensors 272 disposed on this line 270 can, therefore, provide the vertical sensing arrangement for the disclosed system 100.

The marine-based implementations of the system 100 in FIGS. 4E-4F can also include an existing or proposed well (not shown) as before. Other sources 230 of input energy for seismic surveying can be used than the air gun array depicted. In fact, the vessel 200 may be used in icy waters, where breaking up of ice by the vessel 200 or another ice breaker (not shown) at the water's surface can generate energy for seismic surveying. Marine animal activities, boat operations, etc. can act as sources for surveying. Active seismic sources can be used on the seabed, and operations in a wellbore in the seabed can produce energy for seismic surveying.

Any of the various components disclosed above with reference to FIGS. 4A-4F can be interchanged with one another to arrange first sensors 122/222/262 in a first arrangement relative to the formation and arrange second sensors 152/162/252/272 in a second arrangement relative to the formation. Thus, references to surface or horizontal sensors and to buried, vertical, or borehole sensors is merely meant to be illustrative. The two arrays of sensors can operate with their different orientations as disclosed herein and can operate in a manner similar to the other implementations disclosed herein. In general, the source 130/230 can include one or more of a blast charge, a vibrator, an air gun, a water gun, a sparker, an impulsive source, a compressive source, a shear wave source, and the like.

5. Seismic Data Processing System

Figure 6A:
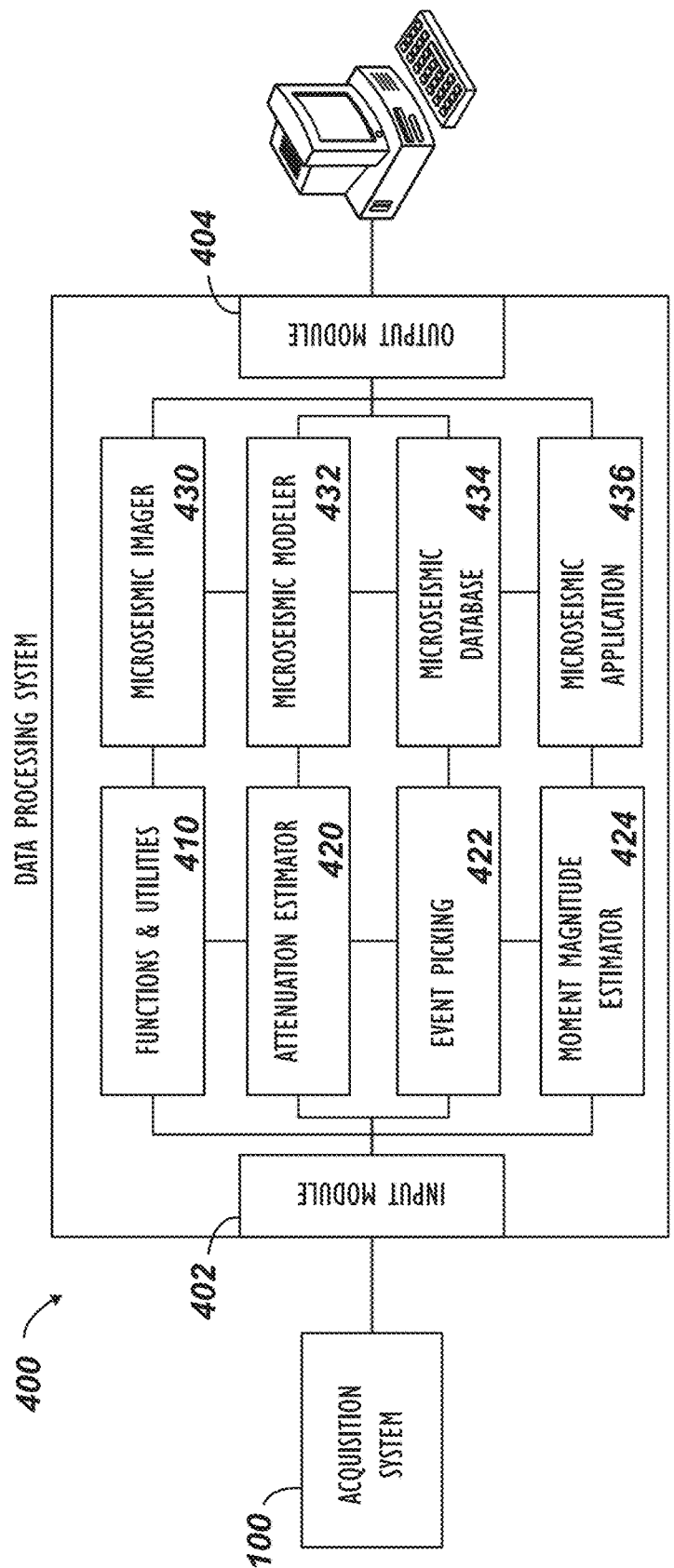
FIG. 6A schematically illustrates a seismic data processing system according to the present disclosure.

As noted previously and as schematically illustrated in FIG. 6A, a seismic data processing system 400 can be used to process seismic data according to the present disclosure. In general, the system 400 can use any suitable hardware and software available to store and process seismic data obtained with the data acquisition system 100, such as disclosed herein. As schematically shown, the seismic data processing system 400 has a data input module 403, which obtains seismic data from the acquisition system 100. The input module 403 links to various seismic processes 410 through 436 of the system 400 and ultimately links to a data output module 404. The processing system 400 may be capable of processing data from a variety of seismic data formats, such as SEGY or SEG-2, and can also convert between different formats by reading one input format and writing to a different output format.

The seismic data processing system 400 includes a number of known functions and utilities 410 for processing seismic data, such as trace merging, bandpass filter, notch filter, debiasing, despike, trace integration, trace normalization, trace rotation, scaling, sorting, stacking, trace tapers, vibroseis sweep calculations, wavelet calculation, travel time generation, and velocity modeling, among other possible functions and utilities which are not discussed in detail here.

Other than some of the conventional functions and utilities 410, the data processing system 400 can include an attenuation estimator 420. This estimator 420 delivers characteristics of attenuation of the formation by calculating an effective attenuation estimate (Q). The calculation estimates attenuation Q for two input traces by (1) correcting the traces using angular and distance corrections, (2) plotting Fourier Transforms of the two corrected traces, (3) plotting a log of the amplitude ratio between the two traces, and (4) calculating an attenuation estimate Q by calculating a linear regression of the log of the amplitude ratio. The attenuation estimate Q can also involve a two-layer attenuation estimate. Here, values for thickness, attenuation, and velocity of a layer, along with the effective attenuation Q are used to determine an attenuation value of a second layer.

Event picking algorithms 422, such as the STA/LTA or Modified Energy Ratio (MER) algorithm, can be used to identify seismic events on a seismic trace. The algorithms 422 can either return the strongest event identified on the trace (first break picking) or can return all events found on the trace, along with a numerical score that indicates the strength of the event.

The system 400 can also include a moment magnitude estimator 424 to deliver a moment magnitude estimate from a recorded seismic event on input trace data. The estimator 424 applies various correction factors to the seismic data.

The data processing system 400 can include a microseismic imager 430 that generates images of seismic data using diffraction stacking. Various options are available for dealing with normal seismic data (where the T=0 time is known), and microseismic data (where the start time of the event is unknown). The microseismic imager 430 uses travel time maps and uses velocity models defined with Z-component specified as either depth or elevation. Input data is flattened using a ray-traced travel time from a given source location to each sensor position. The flattened data is then processed using one of many amplitude conditioning steps; such as amplitude (sum all amplitude values along constant time), absolute amplitude (the sum of the absolute value of amplitudes along constant time), squared amplitude (the sum amplitude-squared values along constant time), positive squared amplitude (the sum of only positive amplitudes and squared), and negative squared amplitude (the sum of only negative amplitudes and squared).

The microseismic imager 430 generates a one-dimensional array of data for each shot location; the length of the array is equal to the record trace. The result from an amplitude conditioning step is passed to a seismic imaging step that does one of the following: computes the sum of all amplitudes, chooses the maximum value, or chooses the minimum value. In turn, this value is placed at the shot X, Y, and Z location in the output image space, and the algorithm repeats for the next shot X, Y, and Z location.

In addition to the above described imaging algorithm, the imager 430 can calculate the semblance or mean covariance to preferentially weight data that looks "flat", while de-emphasizing data that does not look "flat". This may result in significantly cleaner images than what can be accomplished using standard diffraction stacking. The data processing system 400 can include a microseismic modeler 432 that generates simulated microseismic events by ray tracing through a velocity model and convolving the ray-traced travel times with a wavelet. Any combination of surface and subsurface geometries can be generated to simulate arrivals from surface arrays (110), buried arrays (150), and monitor wellbores. If the modeler 432 calculates kinematics (travel times) and not dynamics (amplitudes), then microseismic events such as double-couples may be suitably handled by adding an amplitude modification for the desired source mechanism.

The data processing system 400 can include a microseismic database 434 that contains a collection of application entities that model various microseismic-related data objects. This design allows an application to work with these objects, while the storage and retrieval of objects is performed via a database.

Finally, the data processing system 400 can include a microseismic application 436, which can be an end-user microseismic processing software application. The application 436 includes event detection, event location, microseismic imaging, moment magnitude calculation, moment tensor inversion, and various display tools to help an end user interpret seismic data.

6. Workflow

Figure 6B:
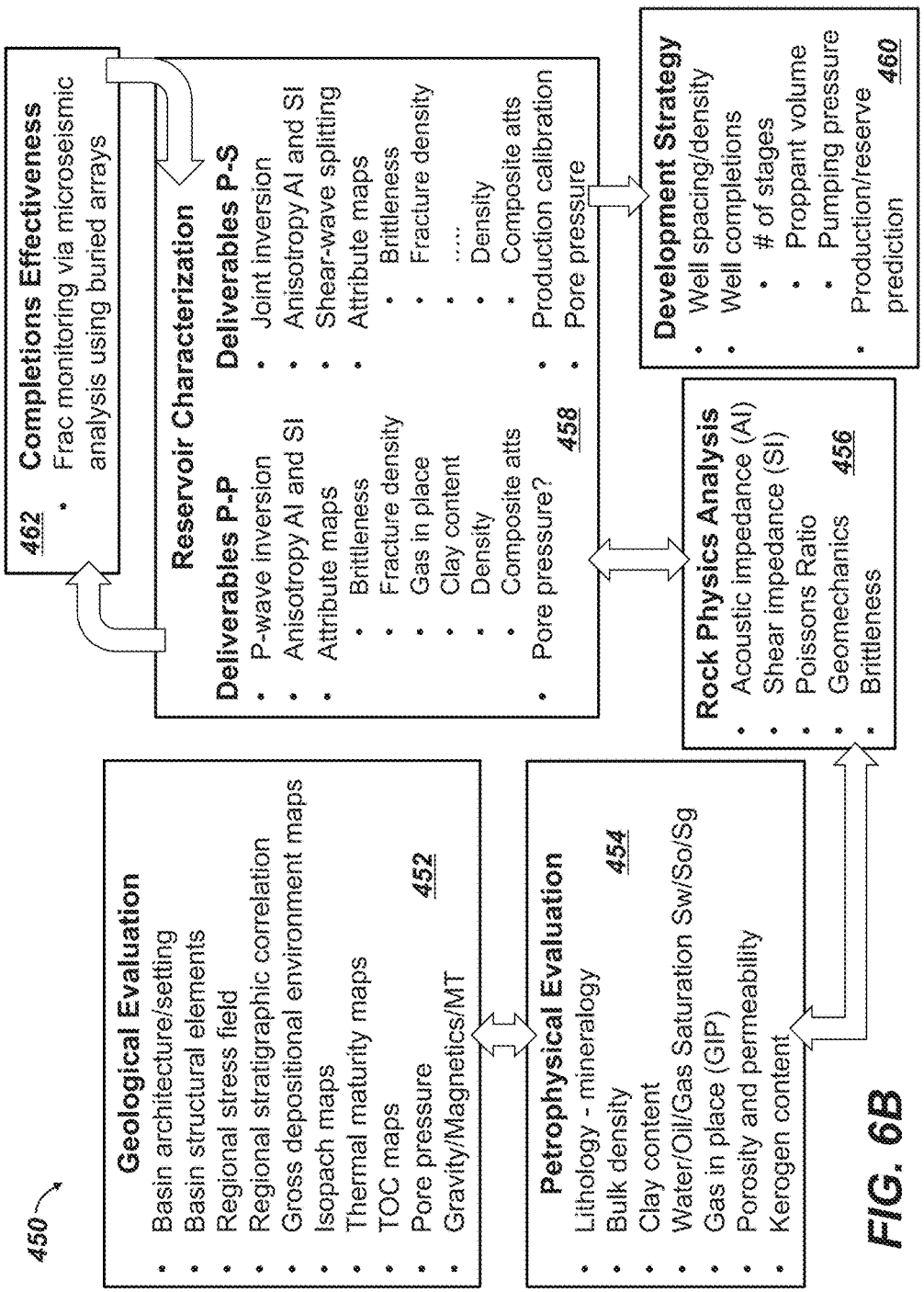
FIG. 6B illustrates a workflow according to the present disclosure.

To optimize the position of the survey, a preferred workflow 450 in FIG. 6B is used so the survey can be positioned in a promising area of a geological play, such as shale or unconventional play or even marine-based environments. The workflow 450 also describes how to extend and use the information to obtain geological, geophysical, and geomechanical properties from the integrated acquisition and monitoring system 100.

As shown in FIG. 6B, conventional geological evaluation 452 and petrophysical evaluation 454 can be done to define and characterize a geological play in which the integrated acquisition and monitoring system 100 can be used. These can be used to analyze rock physics attributes 456, such as acoustic impedance, shear impedance, Poisson's ratio, geomechanics, brittleness, etc.

Once the integrated acquisition and monitoring system 100 is used to characterize the reservoir, the system 100 can provide a number of deliverables 458 based on processing and analysis of the seismic data, including P-wave inversion; joint inversion of P-wave and converted-wave data; shear-wave splitting; anisotropy parameters of the subsurface; acoustic and shear impedance; elastic parameters; inelastic parameters, formation density; various maps of reservoir attribute for brittleness, rigidity, fracture, and density, as well as others; attenuation; pore pressure, etc. The deliverables thereby enable operators to develop a strategy 460 for completing and producing the play. Finally, as discussed in another section of the present disclosure, the system 100 can also be used in determining the effectiveness of completions operations 462 by passive monitoring with the buried arrays 150 to measure microseismic events, as will be discussed below in Section B.

B. Passive Monitoring Using Buried Arrays

In the previous discussion of the disclosed system 100, the buried arrays 150 (and/or patch arrays 160) have been integrated with the surface arrays 110 to enhance the land-based or marine-based seismic acquisition and analysis. In addition to this approach, the arrays 150/160 in the survey area near a target wellbore 115 can be used for passive monitoring of microseismic events that are either naturally occurring or induced by fracture, perforation, intervention, or production operations in a well, as hinted to previously. Preferably, the type of array used is the vertically-arranged buried arrays 150 due to their particular orientation relative to the formation.

Figure 7A:
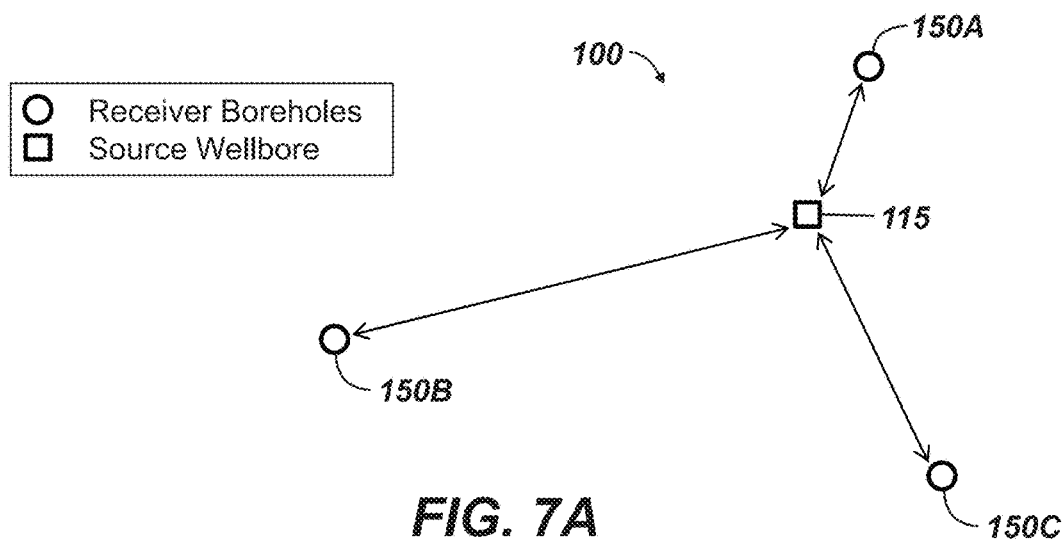
FIG. 7A-7B illustrates plan and elevational view of a portion of the integrated seismic acquisition and monitoring system relative to a target wellbore.
Figure 7B:
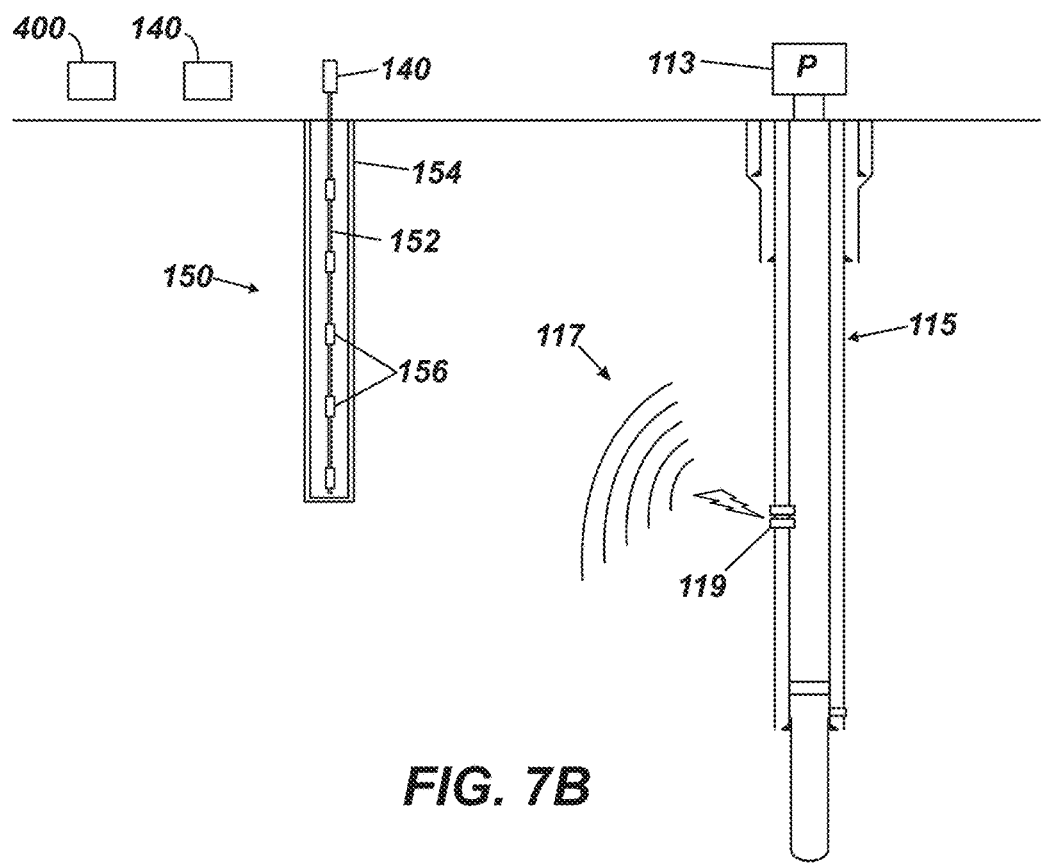

FIGS. 7A-7B show just a portion of the system 100 discussed previously, omitting the surface receivers (120) and the like. Although shown for a land-based implementation, the same discussion applies to a marine-based implementation, as in FIGS. 4E-4F. As before, the vertical or buried arrays 150 consist of a plurality of single or multi-component receivers or sensors 152 arranged vertically in shallow boreholes 154 several tens of meters in depth. The sensors 152 can be strapped or attached to a pipe 156 disposed in the borehole 154 and cemented in place. Sections of PVC pipe coupled by collars can work well for this purpose.

Rather than using seismic sources (130) at the surface as in the active acquisition discussed previously, the system 100 uses the passive source of a microseismic event 117 occurring in or near a target wellbore 115 for seismic surveying. The microseismic event 117 may be induced by a fracture, perforation, or intervention operation; by production of fluids from the formation; by injection of fluids into the well; or by some other operation.

The sensors 152 detect the seismic energy generated by the event 117, and the recording unit 140 records the sensor signals for later processing. In turn, the recorded signals from the detected event 117 are processed by the data processing system 400 to determine the properties of the microseismic event 117 that produced the signals.

The system 100 having the buried arrays 150 can be used to also record naturally occurring events, such as caused by a micro-earthquake and fault slippage, in the subsurface not related to any drilling, intervention, or production activities. Thus, the analysis described below can also be applied to these naturally occurring events, and in so doing, can establish a baseline of activities prior to drilling, intervention, and production related activities. After collecting this baseline information, a comparison with microseismic activity generated after drilling, intervention, and production activities are commenced can enhance the property determinations of the formation and can give a measure of the safety of the drilling operations, as well as a measure of the potential impact of these operations on shallow aquifers or other geological structures of interest.

The system 100 can, therefore, be used for on-demand monitoring to more accurately locate hypocenters of microseismic events 117 by using the enhanced near-surface model obtained from the integrated buried arrays 150 and surface seismic data of the previous discussion. For mapping using microseismic events 117 during a fracture treatment, for example, existing data is used to construct initial velocity, anisotropy, statics, and attenuation model(s). The integrated system 100 as discussed in the previous section is then used to record 3D data into the buried arrays 150 so the initial model of velocity, anisotropy, statics, and attenuation can be updated. Also, as disclosed earlier, the present system 100 can be used when no activity is occurring to record a baseline of microseismic activity, with the same benefit provided by the refined earth model.

Having the updated model, operators then perform the fracture treatment, perforation operation, or other intervention. For example, operators may pump treatment fluid down the wellbore 115 with a surface pump 113 and fracture a portion of the formation, or a perforation may be made in the casing of the wellbore 115. Meanwhile, the passive monitoring of the system 100 conducts continuous recording of seismic signals. The data of the seismic signals obtained with the buried arrays 150 is delivered in field to recording units 140 and eventually to the data processing system 400, where data conditioning and clean-up can be performed.

Through processing with the techniques detailed herein, the data processing system 400 detects microseismic events 117 and locates the hypocenters of those events 117. A number of calculations are then performed to display and analyze the events 117. For example, the moment magnitude and location of the hypocenter are calculated with error analysis, and the hypocenters can be displayed in a map view, cross-sectional view, 3D view, histogram, cross-plot, etc. so the hypocenters can be used for advanced imaging. Moment tensor inversion analysis is performed for the hypocenter corresponding to each event 117, and a fault fracture network can eventually be constructed from the information. Additionally, after the microseismic events 117 are located (or in conjunction with that activity), the full moment tensor of the seismic event 117 can be obtained by inverting not only the times of arrivals of the microseismic events 117 at the buried arrays 150, but by inverting the phases and polarities of the events 117 as well. This moment tensor can then be interpreted to characterize the ways in which rocks actually broke and to generate from this information networks of fractures within the earth.

When sensing microseismic events 117, a primary difficulty is determining whether an event has actually occurred. To that end, a microseismic monitoring process 500 shown in FIG. 8A can be used to analyze seismic energy and determine with a confidence factor or probability level whether a microseismic event 117 has been detected. In the seismic surveying of the formation, the arrays 150 of sensors 152 are arranged substantially vertical relative to the formation as noted previously, and data of events is collected with the sensors 152. The seismic data for the vertical arrays 150 is then analyzed (Block 502). As noted herein, the event 117 may be actively or passively induced.

A moveout at a first array (e.g., 150A; FIG. 7A) is detected by analyzing the collected data for the first array 150A (Block 504). As used herein, moveout can refer to relative arrival times of seismic energy at the sensors 152 in relation to an offset between the sensors 152 in a given component direction (e.g., Z direction). Moveout can refer to the change in frequency of the seismic energy at the sensors 152 in relation to the offset between the sensors 152 in a given component direction. Yet still, moveout can refer to the change in amplitude of the seismic energy at the sensors 152 in relation to the offset in the given direction. Thus, in addition to relative arrival times, moveout can refer to frequency change (attenuation) and/or amplitude change (decay) of the seismic energy's signal in relation to the sensor offset.

Figure 14:
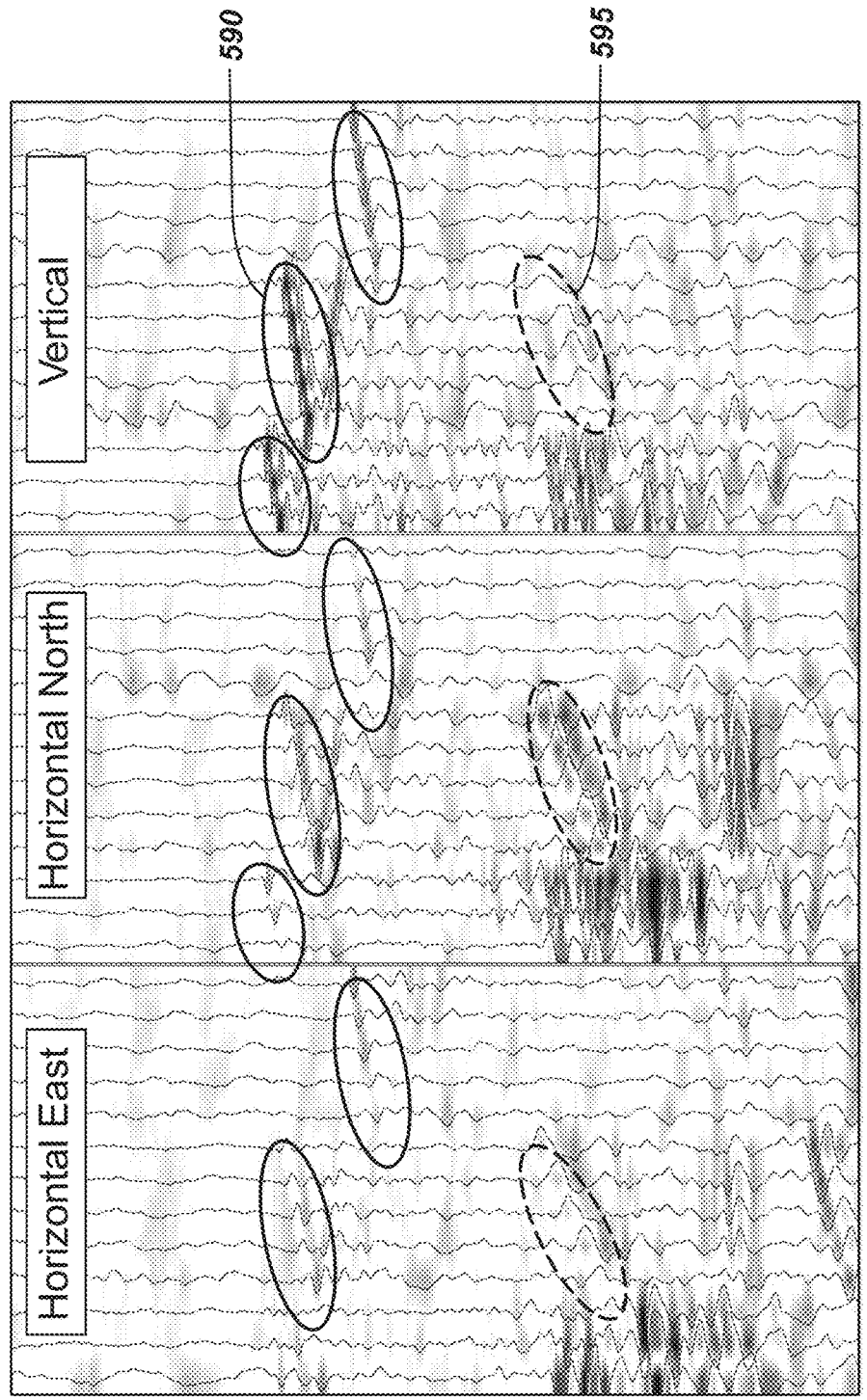
FIG. 14 illustrates detection results with the preferred sensor in a buried array.

Detection of the moveout at the array 150A looks for a particular progression of the seismic energy detected across the sensors 152 of the array 150A. For example, the moveout may exhibit a particular linear progression in accordance with how the sensors 152 are vertically arranged and how the seismic energy of a microseismic event 117 in the formation would propagate across, and be detected by, the array 150A of sensors 152. In other words, the relative time differences between sensor detections at the array 150A can be linear, although other characteristics such as a quadratic relationship of the distances may be sensed between sensors 152. Details related to the linear-style moveout at an array are shown in the traces of FIG. 14.

Either way, the moveout for the array 150A may need to have a particular character (i.e., linear slope, polarity, duration, function, etc.) and may need to exceed some desired threshold level in order to be a detected moveout of interest. When a moveout of interest is detected, a confidence factor or probability level indicating detection of a microseismic event 117 is increased (Block 506). This confidence factor can be used in later processing to determine that a microseismic event 117 has actually been detected.

As further confirmation, the seismic data of the array 150A can be analyzed to detect that a second type of wave is detected at a later or earlier point in time after a first type of wave has already been identified. For example, analysis may indicate that moveout from a P-wave is detected at the array 150A at a point in time. Further analysis can then look for the moveout from the arrival of a comparable S-wave after the identified P-wave. This analysis can be performed on the same component direction (e.g., Z) of the same array 150A or can be performed on one of the other component directions (e.g., X or Y) of the same array 150A.

Thus, after detecting the first moveout in at least one component direction of the first array 150A, the process 500 may analyze the seismic data of the other component directions of the sensors 152 in the first array 150A to detect the same moveout in the other component directions (e.g., X- and/or Y-components) (Decision 508). If the first moveout is detected in one or both of these directions, then the confidence factor can be increased (Block 510).

After detecting the first moveout at least in the first array 150A, a second moveout is detected in one or more second ones of the arrays 150B-C by analyzing the collected data for the one or more second arrays 150B-C at a comparable or expected time that the purported event 117 would be detected at the one or more second arrays 150B-C (Block 512).

Again, the second moveout can be detected in one component direction (e.g., Z-component) (Decision 514) to increase the confidence factor (Block 516) and can be detected in the other component directions (X- and/or Y-components) (Decision 520) to even further increase the confidence factor (Block 520). Details of the moveouts from the arrays 150A-C are compared to determine that the moveouts are comparable to one another (Decision 522). These steps 514-522 can be repeated for several of the vertical arrays 150A-C of the system 100.

To be comparable, two moveouts at different sensor arrays 150 occur around the same expected time and have the same characteristics. For example, the moveout detected by the sensors 152 at one array 150A may exhibit a particular linear progression in accordance with how the sensors 152 are vertically arranged and how the seismic energy of a microseismic event 117 in the formation would propagate across, and be detected by, the array 150A of sensors 152. In other words, the relative time differences between sensor detections at the array 150A can be linear, although other characteristics such as a quadratic relationship of the distances may be sensed between sensors 152. Either way, the moveout then for the second array 150B to be comparable may have the same character (i.e., linear slope, duration, function, etc.) at a comparable or expected time. The polarity of the moveouts between the arrays 150B-C, however, may be different, with one array 150A showing movement (pushing or pulling) in one direction opposite to any of the other arrays 150B or 150C.

In any event, the system 100 can declare an occurrence of a microseismic event 117 in response to the determination that the moveouts detected by separate arrays 150A-C are comparable (Block 524). For instance, the value of the confidence factor can be used in this declaration and can define a quality of the confidence of a microseismic event's occurrence and detection. Such a confidence factor can be determined at each array 150A-C and summed to make a final determination.

As can be seen above, building the confidence factor that a microseismic event 117 has been detected may or may not depend on looking at moveout on several component directions of the sensors 150A-C. Although this can increase the confidence factor, it is not strictly necessary that the same moveout be detected in the other component directions at the same vertical array 150A-C because not all seismic energy may be detectable in this manner. Instead, the process 500 can continue the analysis of other arrays 150B-C even though the process 500 does not detect the same moveout at the same array 150A in different component directions at Block 508.

Figure 8B:
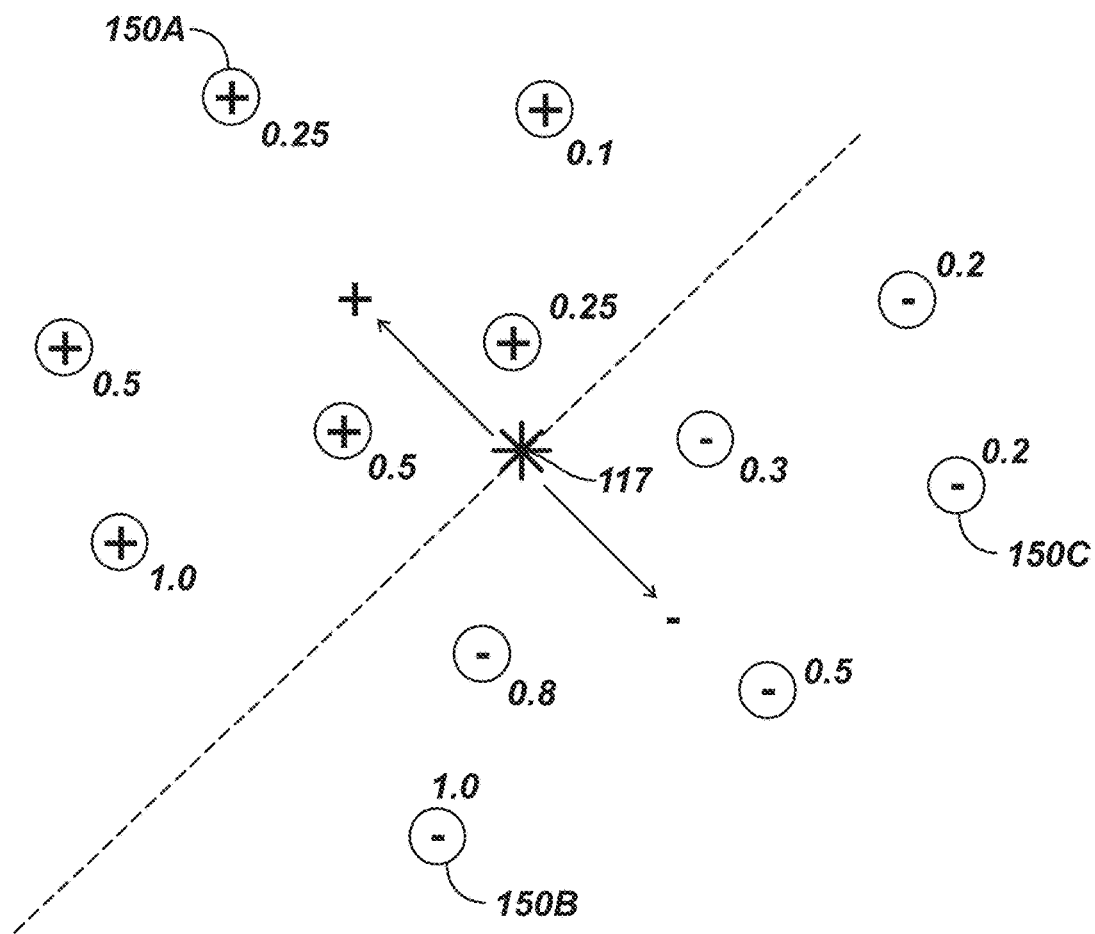
FIG. 8B illustrates a schematic plan view of a number of buried arrays showing their polarity and their confidence factors.

Over the area of interest of a formation, final confidence factors can be associated with the events 117 and the arrays 150A-C. When processing the seismic information, weights based on the confidence factors can be applied to the various events 117 at the buried arrays 150A-C when handling the information to adjust any model, property, or other aspect determined for the formation. For instance, FIG. 8B shows a schematic plan view of a number of buried arrays 150A, B, C, etc. The polarity (+ or −) of each array 150A-C is indicated along with a confidence factor that the array 150 has detected moveout from a microseismic event 117.

Although shown in very simplistic terms in FIG. 8B, the expanse of the microseismic information with its polarity and confidence levels across the underlying formation (below the arrays 150) can help further characterize the microseismic event 117, the formation below, and how the seismic information from the microseismic event 117 can be integrated or combined with the surface seismic data from the surface arrays (not shown). In a general sense, the confidence factors can be used as weighting factors when using the seismic data of the buried arrays 150 as constraints to the surface seismic data when characterizing or modeling properties of the underlying formation, as disclosed herein.

As noted above, detecting and imaging microseismic events 117 has several challenges. Primarily, there are several unknown variables associated with a microseismic event 117 that occurs naturally (e.g., micro-quakes, earth shifts, etc.) or that is even induced by fracturing or other operation in the wellbore 115. In particular, the starting time $t_o$ for the event 117 is unknown, and even the mechanism acting as the source of the event may not be known. Further, detecting microseismic events 117 has to deal with very weak seismic signals and with very high levels of noise in comparison to those weak signals. Additionally, the detection has to deal with how velocity, attenuation, anisotropy, and other properties affect the weak seismic signal. Moreover, attempts at stacking seismic signals can destroy the resulting image if details related to the source mechanism are not incorporated.

Expanding on the process of FIG. 8A, FIGS. 9A-9C show some additional details for detecting microseismic events 117 and handling the challenges involved. One of the gateway challenges involves the ability of the disclosed system 100 to initially detect a microseismic event 117 even though the source mechanism and starting time of the event 117 are not known when seismic signals are detected by the buried sensors 152. To that end, the passive monitoring of microseismic events 1147 by the disclosed system 100 follows several levels of detection 620 as outlined in FIG. 9A.

In a first level (622), each of the given buried arrays 150 detects seismic signals, and the system 100 determines that a microseismic event 117 has occurred by first looking at the detected moveout—i.e., how the event 117 has been detected by the plurality of sensors 152 for each of the given arrays 150. To do this, the system 100 takes a given array 150A for analysis. Because the sensors 152 for the given array 150A are at the same general location, there will not be polarity flips at the given array 150A. Therefore, the buried sensors 152 of the given array 150A detect the moveout of the microseismic event 117 with linear semblance (or equivalent event detection techniques, such as tau-p transform) in which the Z-component of the lower most receiver 152 detects the seismic signal, the next sensor 152 detects the signal in the Z-component a time after, and so on up the array 150A. Thus, the system 100 determines that a potential microseismic event 117 has been detected by the given array 150A if the detection of the seismic signal passes up in the Z-component along the receivers 152 of the array 150 linearly. The detection may look at the moveout as it related to frequency changes and attenuation changes along the vertically arranged sensors 160. Finally, the detection may also require a threshold signal value to eliminate detection of signals caused by various anomalies, false positives, or noise.

At the same given array 150A, the system 100 can then look for the same velocity of the detected event in the horizontal components of the buried sensors 152 of the given array 150A. The velocity of the detected event is determined by the slope of the seismic detection in the Z-component of the sensors 152. In the horizontal components, this same slope can be found in the seismic detection of the sensors 152. The slope of that detection event is very nearly the local "apparent" velocity of the compressional wave at the location of the array 150A in the subsurface.

A similar procedure can be done to find compression-type events in the horizontal components of the recorded data, with the associated slope being the local "apparent" P-wave velocity as well. Similarly, the procedure can be used for S-wave detection of events at the same buried array 150A by locating coincident events in the horizontal and vertical components, with slopes approximately equal to the apparent shear wave velocity of the subsurface at the buried array location. The event detections at the same buried array 150A are then used as a robustness indicator or confidence factor as noted above, which is associated with the detected event.

As noted above, the velocity at which the event arrives at the borehole 154 is an "apparent" velocity—not necessarily the true P- or S-wave velocity of the near-surface in the region of the borehole 154. The apparent velocity is equal to or greater than the true P- or S-wave velocity at the borehole 154. The apparent velocity can be greater than the true velocity at the borehole 154 because the event 117 can be arriving at an oblique angle to the array 150. The apparent velocity can exactly match the P- or S-wave velocity at the borehole 154 if the event is directly under the array 150.

Briefly as an example, FIG. 14 shows in the vertical component column, the traces of an array (150) of buried sensors (152) detecting a compressional wave moveout 590. A comparable shear wave is then expected to follow detection of the compressional wave 590 so that analysis looks for a moveout from the shear wave on the same vertical component that has a similar slope and arrives at the array after an expected delay based on the existing velocity model. In fact, FIG. 14 shows detection of a comparable shear wave moveout 595 in the vertical direction by the sensors in the array after such an appropriate time.

Additionally, the horizontal (North) component of the buried array's sensors (152) detects a moveout at a same time comparable to the compressional wave moveout 590 and detects another moveout at a same time comparable to the shear wave moveout 595. Thus, detection of one type of wave in one or more component directions of the array (150) can be used to track and locate possible detection of other types of waves in other component directions. This can also be repeated between the various arrays (150) of the system 100 by accounting for relative differences in velocity and position.

Returning to FIG. 9A, if detection of a potential microseismic event 117 has been triggered at the given array 150A, the system 100 proceeds to a second detection level (624). Here, the system 100 determines whether there is any coincident detection of the event 117 at the buried arrays 150B-C at different surface locations. Finding coincident detection in other arrays 150B-C uses a particular time window based on the physical arrangement of buried arrays 150A-C and the ground model.

Performing this detection level, the system 100 can determine whether two or more buried arrays 150A-C have detected the microseismic event 117 under the first level (622) of detection. If not, then the detection by the one given array 150 can be regarded as noise or false positive. Otherwise, the detected seismic signals at the two or more arrays 150A-C gives further indication that the signals result from a microseismic event 117. The polarity or phase of the event 117 need not be the same at each of the buried arrays 150A-C. Therefore, the polarity of the event 117 at each buried array 150A-C is detected and recorded for future determination of the moment tensor. This feature of the system 100 can eliminate some of the difficulties noted for the related art discussed in the Background.

At the third level (624), the system 100 determines coincident detected signals for the microseismic event 117 in both P- and S-waves at each buried array location, as well as the polarity and phase of the event 117, and then determines the coincidence across the plurality of buried arrays 150A-C. If both coincident P-waves and S-waves have been detected by multiple buried arrays 150A-C, the system 100 can have some certainty that the event 117 detected is a microseismic event in the seismic data. If only coincident P-waves or S-waves have been detected, the system 100 can have less certainty about the detection. This level of certainty is translated in the present system 100 as a robustness indicator or confidence factor for the detected event 117.

Once the event 117 is detected and determined to be a microseismic event, the system 100 uses any variety of beam steering algorithms and methods (e.g., Kirchhoff methods or wave-equation methods, such as Reverse Time Migration (RTM) techniques) to find the hypocenter of the microseismic event. In the final level (628), the system 100 uses various equations disclosed herein to determine properties of the microseismic event 117 for analysis. Processing of at least some of the detected signals discussed herein can be handled in real-time. Otherwise, post-processing activity using recorded data can be performed as will be appreciated.

Also, the system 100 images the event 117 from the seismic signals obtained with the buried sensors 152. The detection scheme (620) does not have to deal with polarity variations with azimuths depending on the source mechanism. In fact, by using the plurality of seismic signals of the buried arrays 150A-C locating the event 117, the source mechanism can be reconstructed.

Figure 9A:
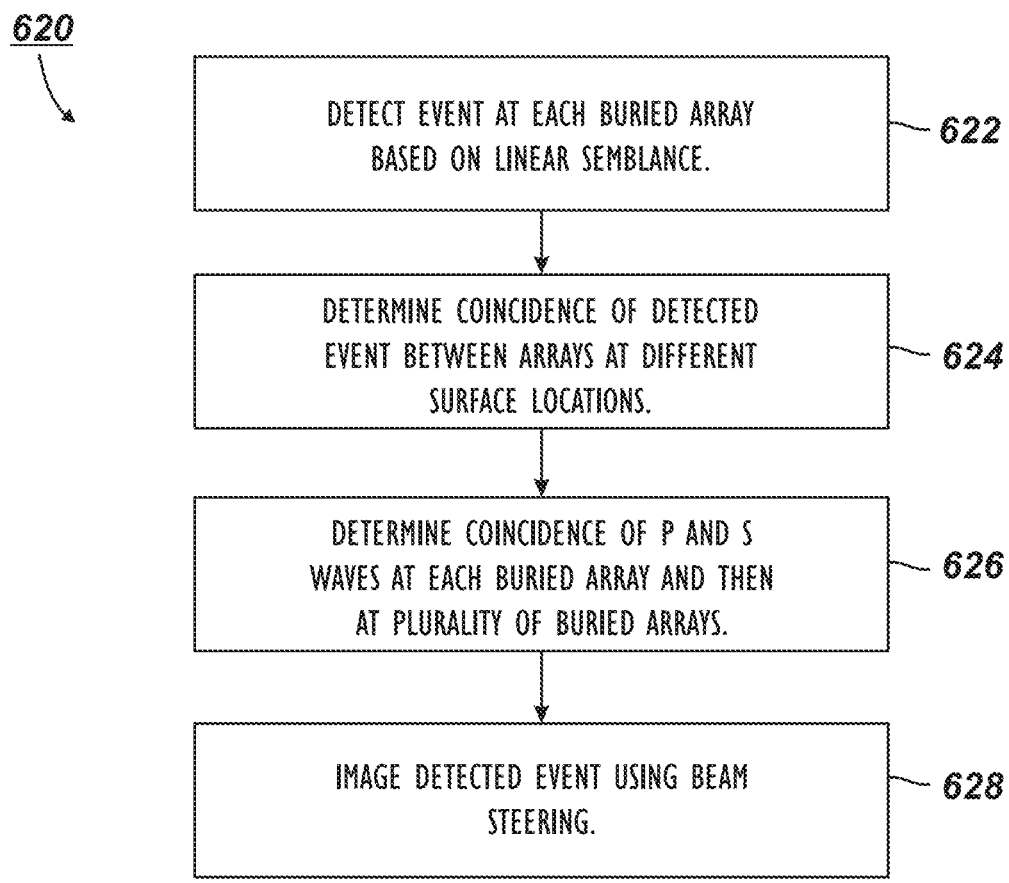
FIG. 9A shows a detection process using the disclosed system.
Figure 9B:
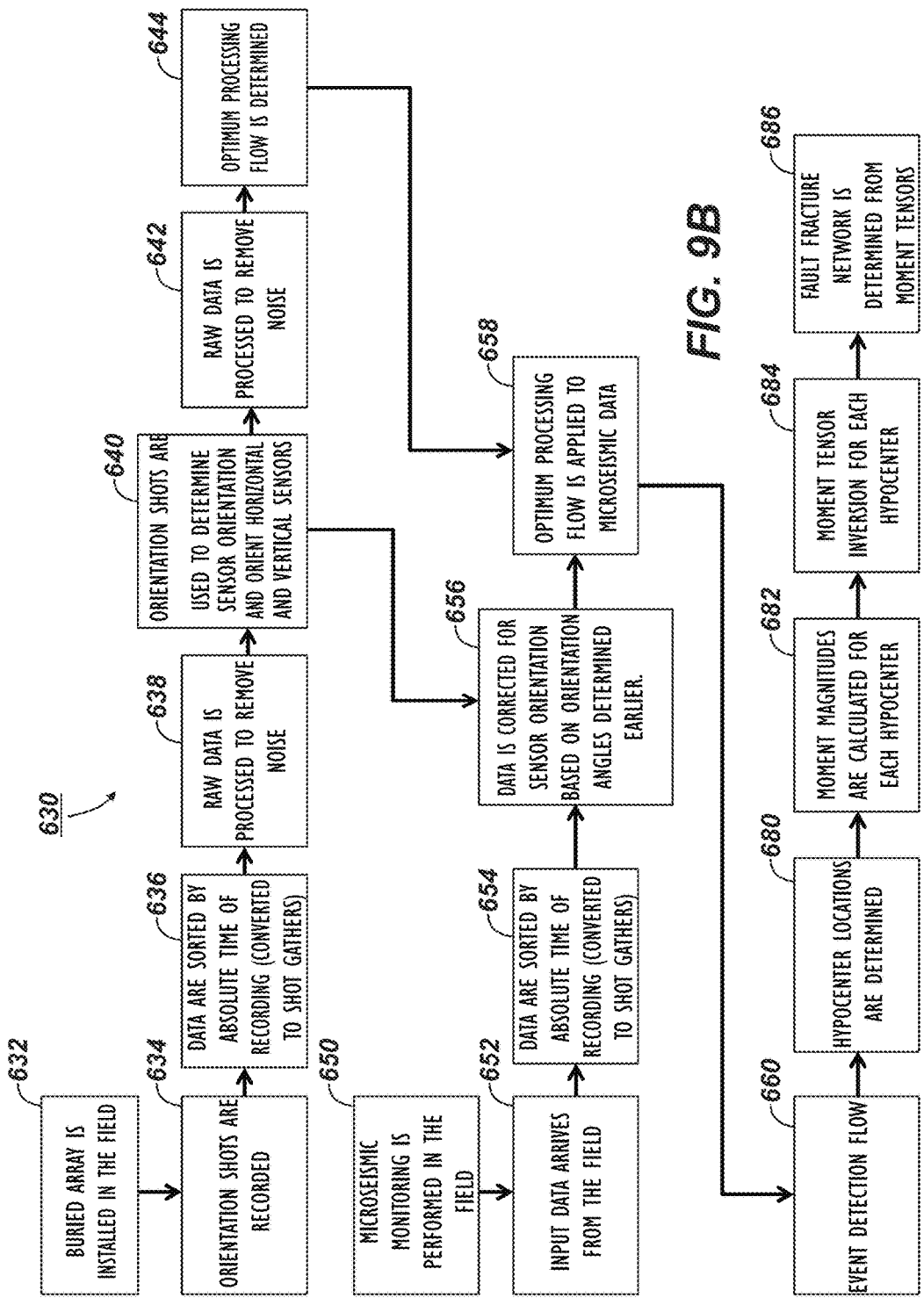
FIGS. 9B-9C show flowcharts for microseismic event identification using the disclosed system.

FIG. 9B shows a scheme (630) for monitoring microseismic events 117 in the field. The system 100 is set up by having the buried arrays 150A-C installed in the field (632) and orientation shots are recorded (634). Seismic data from the orientation shots is sorted by absolute time of recording (i.e., converted to shot gathers) (636), and the raw data is processed to remove noise (638). The orientation shots are used to determine the sensor orientations and to orient horizontal and vertical sensors 152 of the buried arrays 150A-C (640). Raw data is processed to remove noise (642), and an optimum processing flow is determined (644) for handling event data as discussed below.

With the initial setup completed, the microseismic monitoring is performed in the field (650). As the input data arrives from the field during a fracture operation or the like (652), the seismic data is sorted by absolute time of recording (i.e., converted to shot gathers) (654). Based on orientation angles determined earlier in stage (640), the collected data is corrected for sensor orientations (656), and the previously-determined optimum processing flow is applied to the microseismic data (658).

Figure 11A:
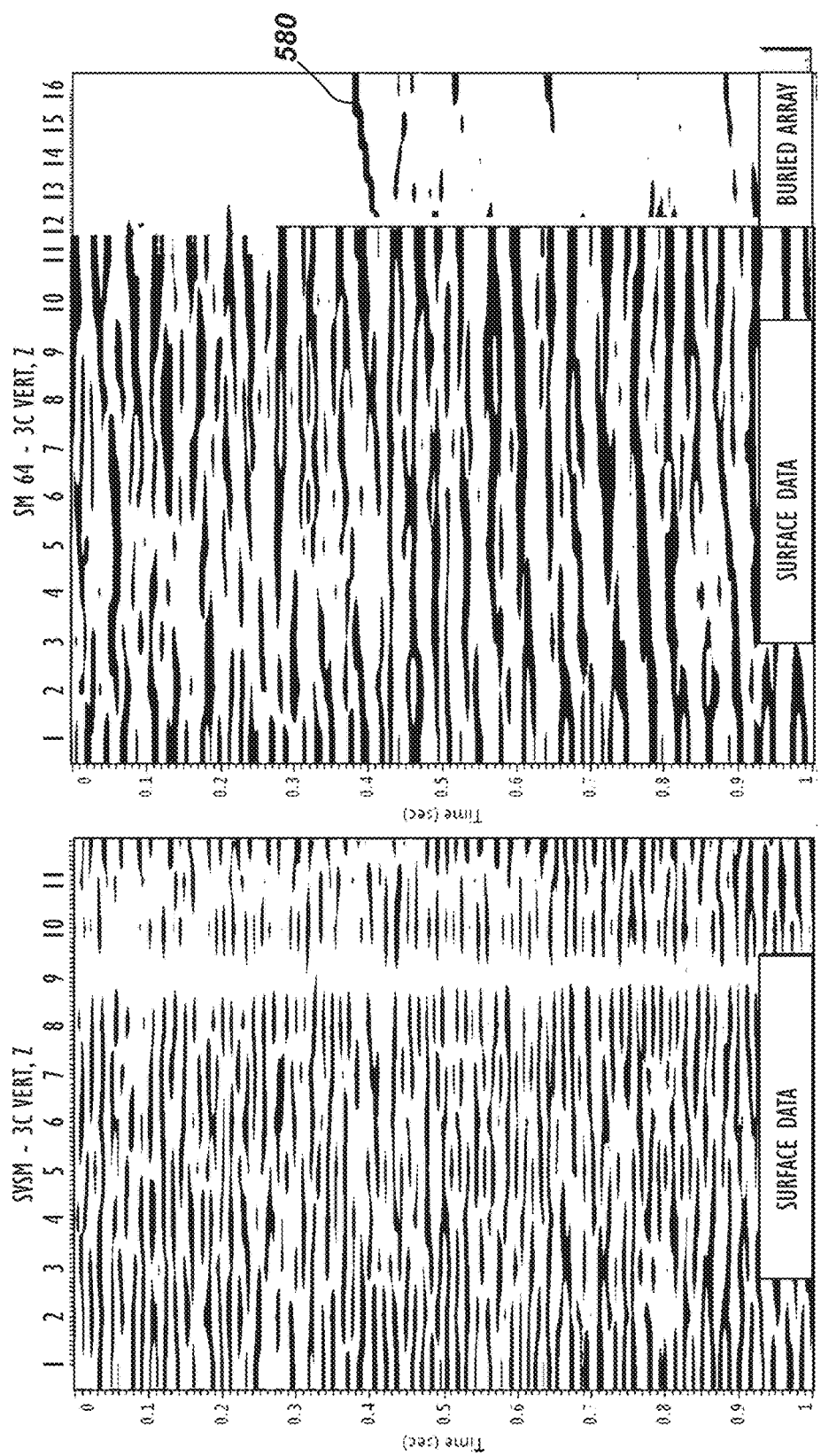
FIG. 11A compares surface data to buried array data.
Figure 11B:
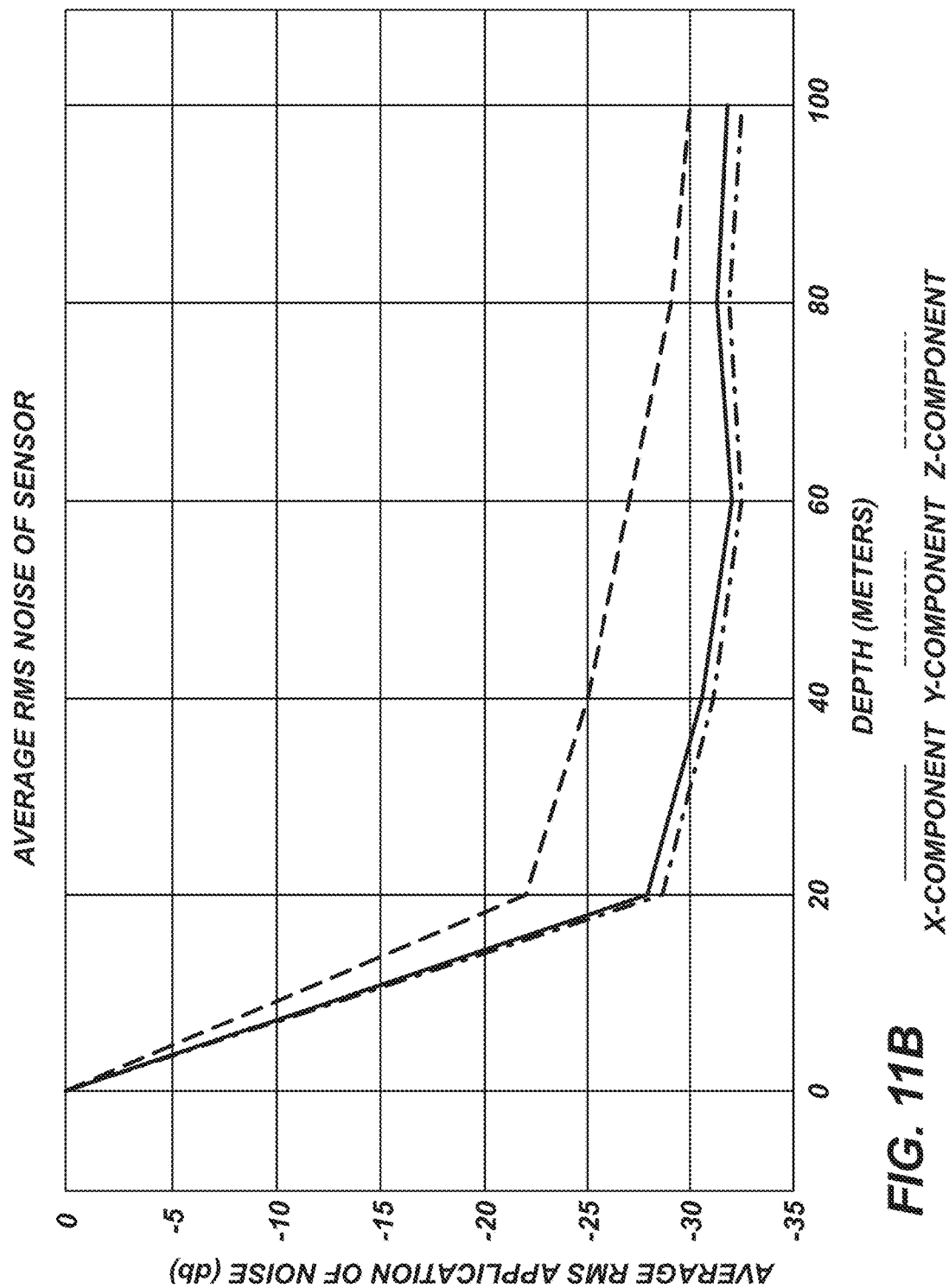
FIG. 11B shows noise attenuation with depth.

From the corrected seismic data, the system 100 performs event detection (660) (see FIG. 11B). After detecting the microseismic events 117, the system 100 determines the hypocenters for the detected microseismic events 117 (680) and calculates moment magnitudes for each hypocenter (682). The system 100 can use any variety of beam steering algorithms and methods, e.g., Kirchhoff methods or wave-equation methods, to find the hypocenter of the microseismic event. Depending on the source mechanism of the event, the amplitudes may be peaks on some boreholes and troughs on other boreholes. Beam steering based on simply summing the event amplitudes together may result in a weak and inaccurate image. Modifying the imager to correct for amplitude variations related to the sources mechanism can provide significantly improved images.

Knowing the hypocenters and moment magnitudes, the system 10 performs moment tensor inversion for each hypocenter (684) and determines the fault fracture network from the moment tensors (686). Algorithms and methods disclosed herein are used for these calculations and determinations.

Figure 9C:
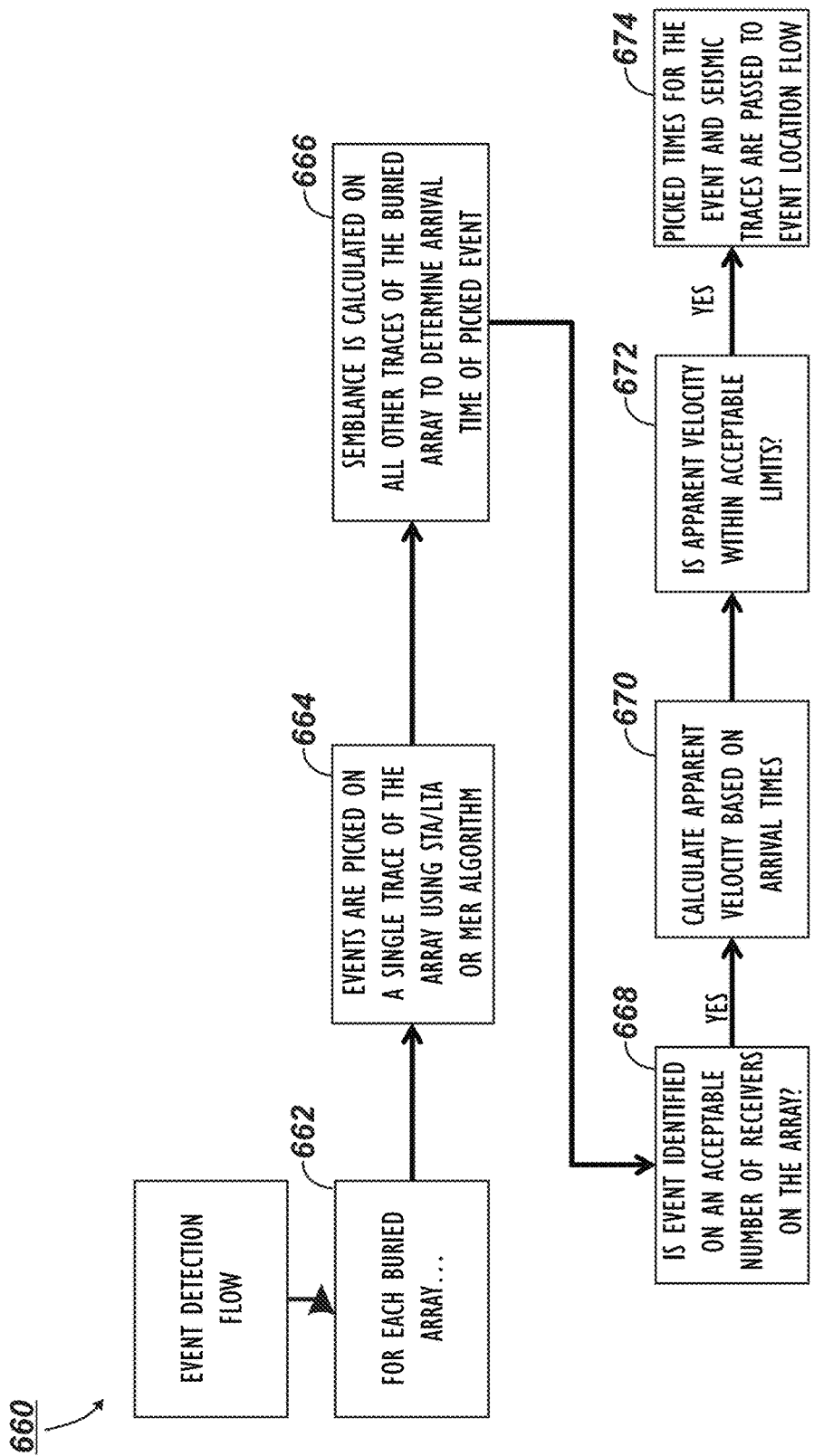

FIG. 9C shows further details of the event detection (660). For each buried array 150A-C (662), prospective events can be picked on a single trace of the buried array 150A-C using a Short Term Averaging/Long Term Averaging (STA/LTA) algorithm (664), which is a standard method for identifying valid events and picking arrival times in microseisms caused by hydraulic fracturing. Prospective events can also be picked on a single trace of the buried array 150A-C using a Modified Energy Ratio (MER) algorithm, which can give consistent first-arrival times on noisy microseismic traces, or by using any other appropriate technique. Preferably, the event detection uses more than one trace or an entire set of traces of a buried array to determine the moveout of the event, as discussed herein, for example, with reference to FIG. 14.

Semblance is calculated on all traces of the buried array 150A-C to determine the apparent velocity of arriving events (666). A determination may be made whether a prospective event has been identified on an acceptable number of receivers 152 on the arrays 150A-C (668) so the system 100 may calculate the apparent velocity of the event based on arrival times (670). A determination is then made whether the apparent velocity is within acceptable limits (672). If so, the system 100 passes the picked times for the event and the seismic traces to the event location (674), which is detailed in stage (680) of FIG. 9C. This event detection flow (660) can be performed on either vertical or horizontal components and can be used to search for either P- or S-wave events.

As noted previously, confidence factors and polarity can be determined for the event 117. When a number of events have been detected, they can be imaged by converting polarity of the events 117 to the same polarity. For example, all events 117 can be converted to the same polarity by converting + polarity to + and converting − polarity to +. With the polarities the same, each of the converted events 117 is then weighted with its corresponding confidence factor determined during analysis. The weighted events 117 are then summed together when imaging the events 117. In addition to weighting, the events 117 can be scaled or exponentiated. As noted above, the confidence factor used for the weighting can be based on semblance, covariance, coherence, or other similarity measure of the moveouts of a given event 117 detected at a given array 150.

Imaging the events can use compressional waves only, shear waves only, or both compressional and shear waves simultaneously. When compressional and shear waves are imaged, any mismatch in the imaging of the events 117 between the two wave types can be used to update the property of the formation used in the imaging process. This updating can use either iterative techniques or waveform inversion algorithms.

Various imaging techniques can be used to image the events. For example, imaging the events 117 can use waveform inversion in which components of an objective function of the wave form inversion are weighted based on the previously determined confidence factor. Additionally, imaging the events can use elastic imaging in a RTM sense.

Figure 10A:
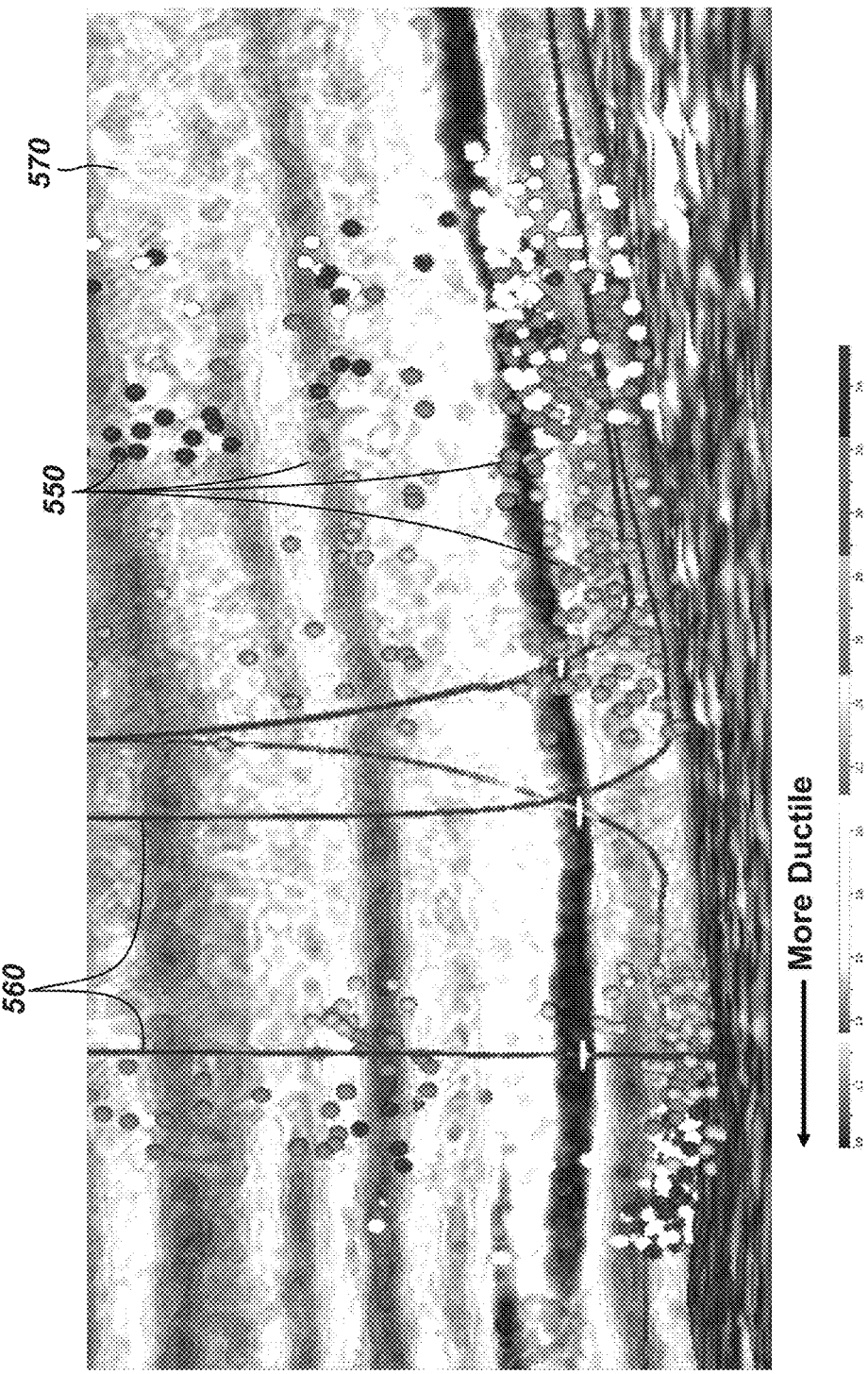
FIG. 10A illustrates interplay of rock properties and fracture treatment.

FIG. 10A conceptually shows some results from the passive monitoring of microseismic events. Plots of microseismic event hypocenters 550 are shown having the determined ductile property of the rock; the latter is determined by inversion of surface seismic data for surface sensors processed with or without the benefit of the buried information. These hypocenters 550 are plotted in relation to the wellbores 560 and the seismic map 570 in the background. As will be appreciated, the information provided by the microseismic events can reveal details of the interplay of rock properties and fracture treatment. Additionally, the microseismic events can be used to update the velocity model, especially in the near vicinity of the microseismic event location. This updated velocity model can in turn be used to improve surface seismic imaging or improve positioning of other near-by microseismic events.

Figure 10B:
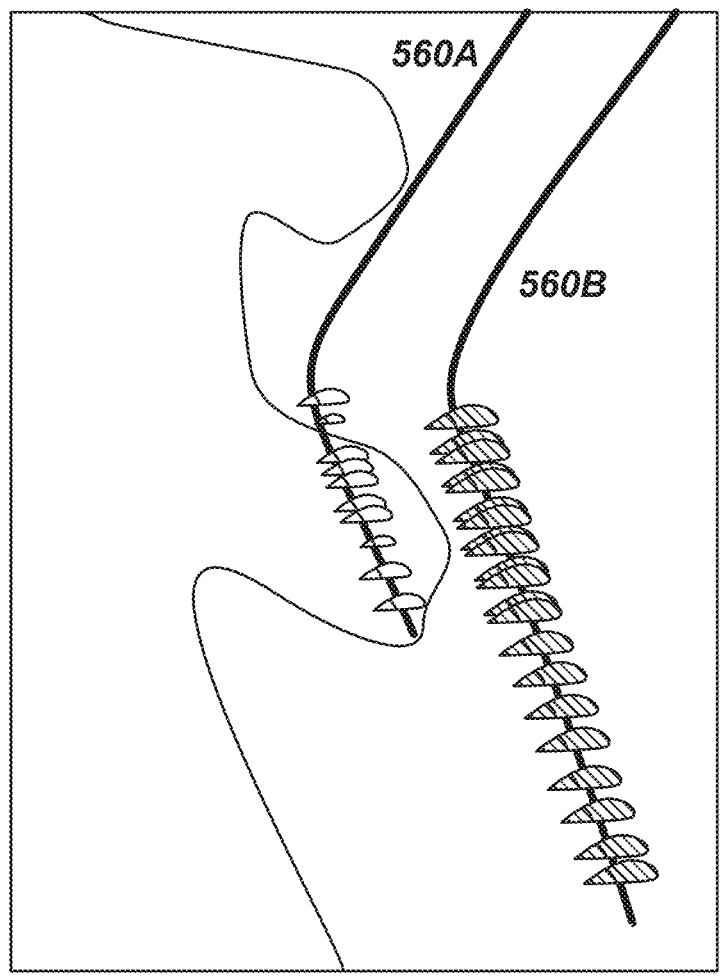
FIG. 10B illustrates how the disclosed system can be used to predict zones of higher productivity.

As shown in FIG. 10B, the results of passive monitoring and mapping using microseismic events can assist in predicting zones of higher productivity and help optimize completion strategies. Two sections of wells 560A and 560B are shown with information about the rock properties determined by monitoring the microseismic events occurring during a fracture treatment. Different stages can be graphed relative to treating pressure to indicate those stages having rock with more or less ability to crack under treatment. Again, such information can predict zones of higher productivity and optimize completion strategies.

As can be seen in FIG. 11A, a comparison of surface data to buried array data indicates that the buried sensors are best able to detect microseismic events, such as that indicated at 580.

As indicated by FIG. 11B, when a buried sensor (152) is used below 20-m, the system 100 can show improved S/N ratios because there can be significant attenuation of the surface noise with respect to depth. Therefore, the depth of the buried sensors 152 is preferably at least below about 20 m. For example, in one implementation, four buried sensors 152 on an array 150 can be installed at depths of 100 m, 80 m, 60 m, and 40 m from the surface. As will be appreciated, FIG. 10B is only indicative of the resultant decrease in surface noise with depth for a specific place on the earth surface. In general, the level of noise improvement with depth will vary with shallow surface conditions so that the level of noise improvement is generated within each buried location to optimize the depth placement of the sensors 152 within the buried arrays 150.

Figure 11C:
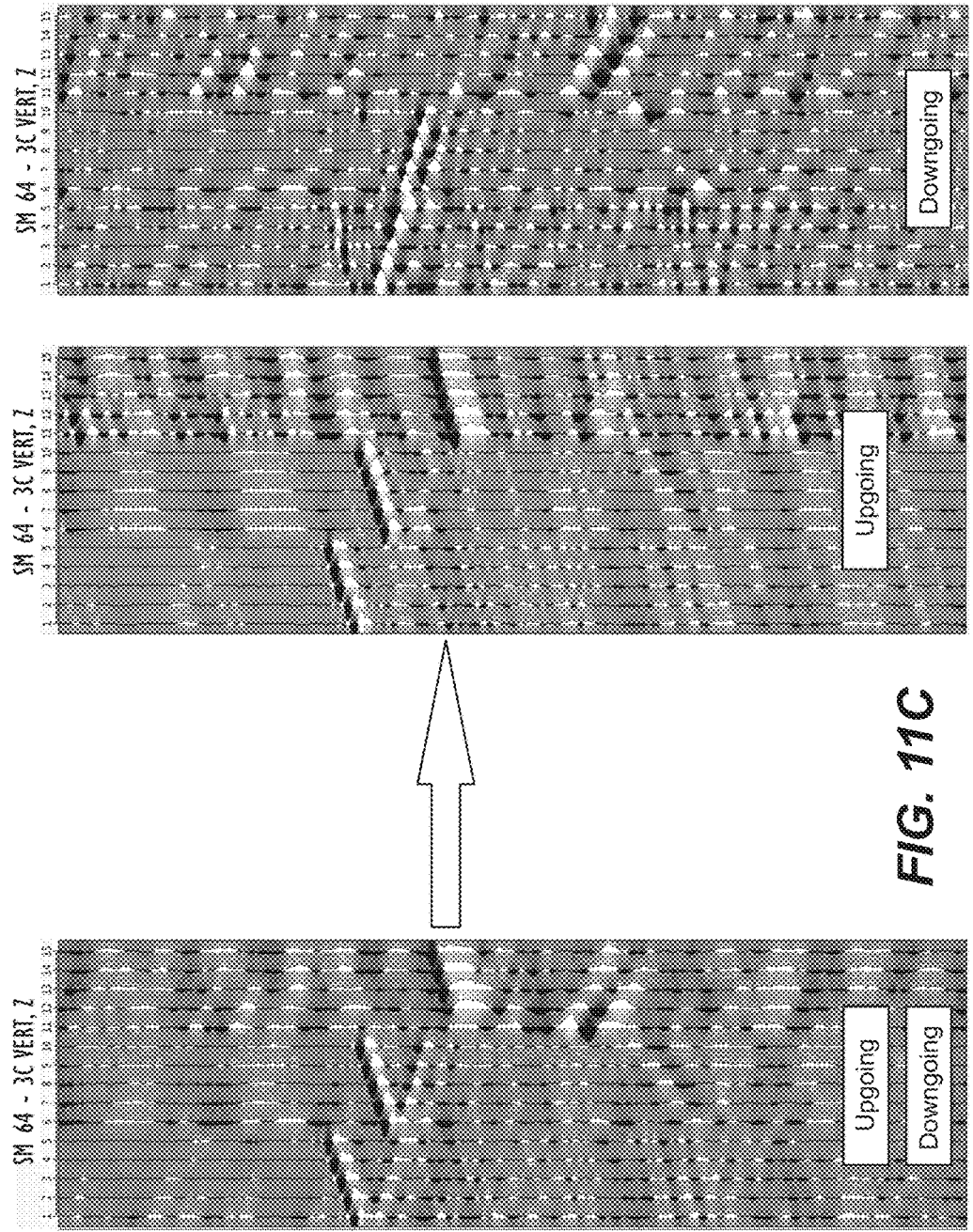
FIG. 11C shows the use of a median filter to separate upgoing and downgoing energy.

Once the arrays 150 are installed in the boreholes 154, orientation shots can be used to determine the horizontal orientation of the receivers' sensor orientations. These shots can be the same seismic sources that are fired into the surface seismic arrays (120; FIG. 4A) and the buried arrays 150 as previously described, or they can be dedicated sources used purely for that purpose. Also, as can be seen in FIG. 11C, a median filter can be used to separate upgoing and downgoing energy in the seismic signals detected with the sensors 152 so that proper energy can be analyzed. Other filtering techniques can also be used to achieve wave mode separation. These filtering techniques are designed to remove artifacts from the seismic traces so that the moment magnitude and the moment tensors can be determined from these traces generated by the microseismic events.

Figure 11D:
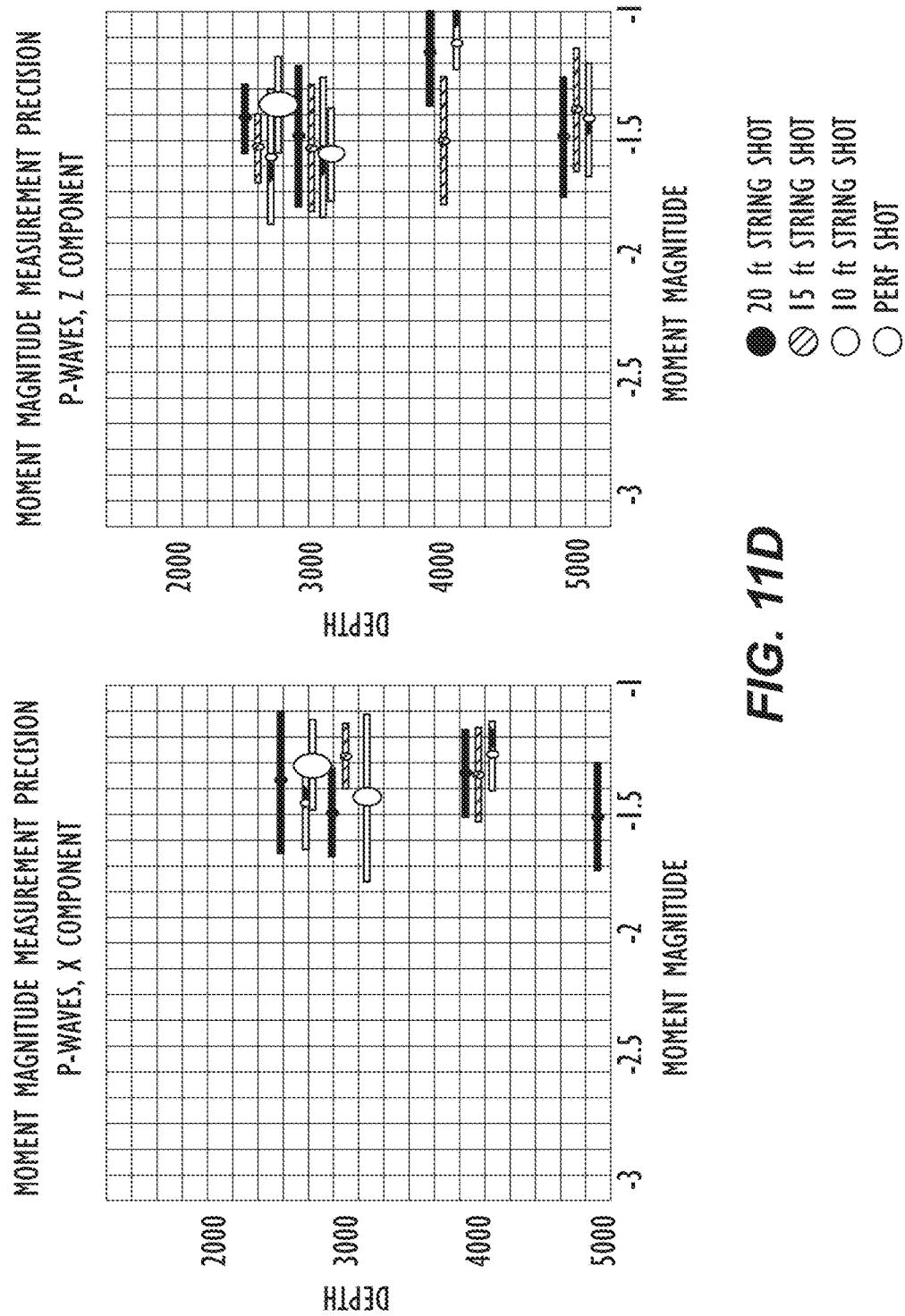
FIG. 11D shows the moment magnitude determined from P-Wave data with associated error bars from an example buried array installation.
Figure 11E:
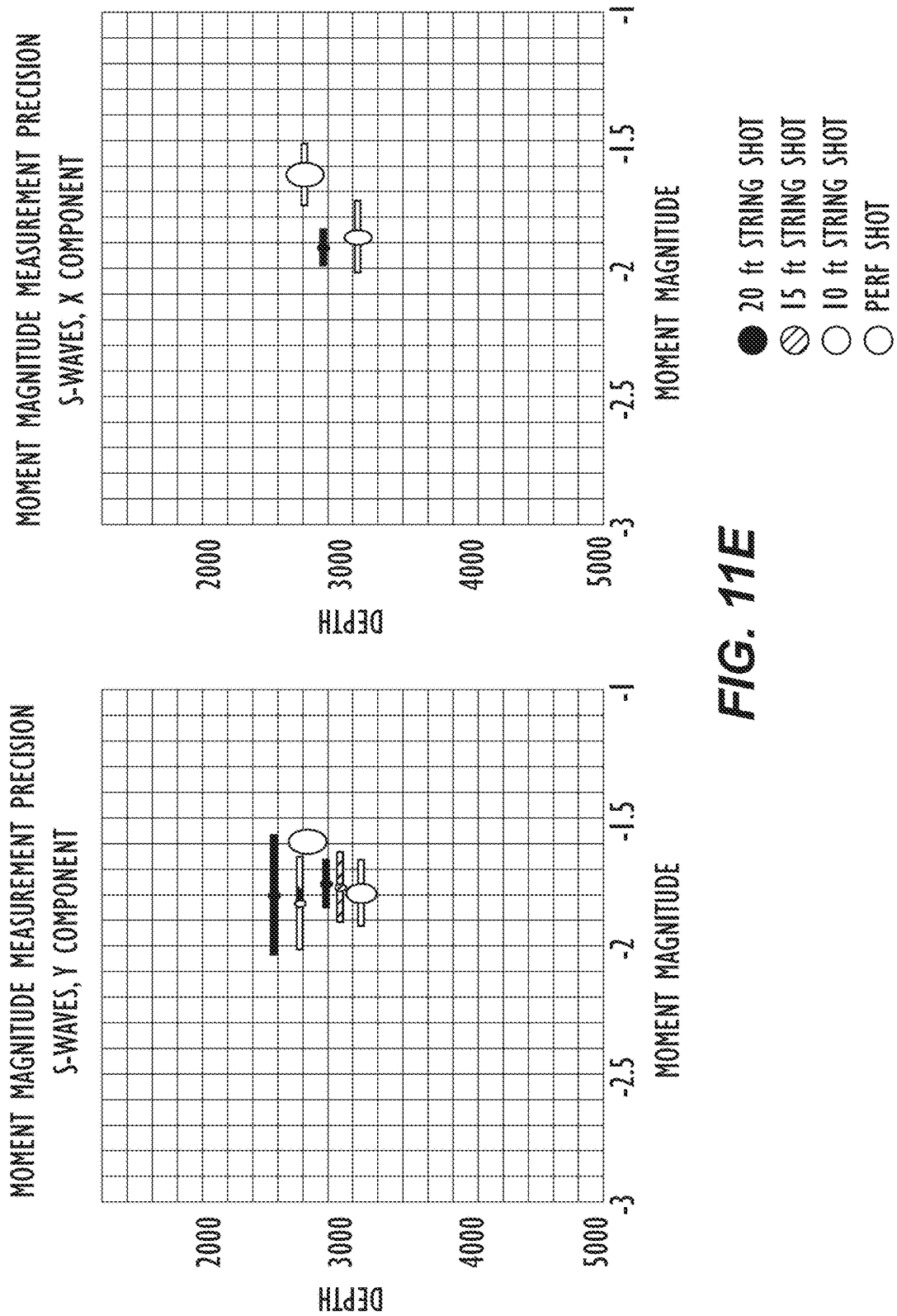
FIG. 11E shows the moment magnitude determination from S-Wave data with associated error bars from an example buried array installation.

FIGS. 11D and 11E show examples of the moment magnitudes determined from P-wave microseismic events and shear-wave microseismic events respectively. The P-wave and shear-wave events are also illustrated in FIG. 14 described later. In FIG. 11D, for example, the moment magnitudes determined from P-Wave data are shown with associated error bars from an example buried array installation in which various string and perforation shots have simulated microseismic events. In FIG. 11E, the moment magnitudes determined from S-wave data are shown with associated error bars from the example buried array installation in which various string and perforation shots have simulated microseismic events.

C. Sensor Technology for Receivers in Buried Arrays

As noted previously, surface noise is another challenge to detecting microseismic events with the buried arrays. As analysis has also determined, the ability of the buried receivers to properly record weak signals from the microseismic events depends on the sensor technology and associated noise floor, the gain settings and associated noise floor of the recording unit, and the system's susceptibility to contamination from environmental electromagnetic noise. Therefore, consideration of the sensor technology of the buried receivers 152 and the pairing between the receivers 152 and the recording unit can be necessary for proper recording of weak (small) microseismic signals.

In fact, observations directly indicate that the combination of various sensors and recording systems can provide surprising results. A number of sensors (e.g., geophones) are available in the art for use as buried receivers 152. For example, some available sensors for the buried receivers 152 include the SM-64, the SM-6 Normal Sensitivity, the SM-6 High Sensitivity, and the VectorSeis (also referred to as SVSM)—each of which is available from INOVA Geophysical Equipment Limited. However, the SM-64 sensor has been identified as a preferred sensor type for use as the buried receivers 52. Other sensors are prone to undesirable noise, while the SM-64 sensor reduces the effects of the above-described issues. The SM-64 sensor is a high-sensitivity 3C analog geophone that has an amplifier with a low-noise chip integrated with the geophone element. The amplified signal from the SM-64 sensor is sent to a recording system, overcoming gain settings and associated noise floor shortcomings. Particular details of such a sensor are disclosed in U.S. Pat. No. 7,518,954 to Hagedoorn, which is incorporated herein by reference in its entirety. As detailed herein, a preferred sensor for the buried receivers is the SM-64 sensor or comparable sensor having an amplifier with a low-noise chip integrated into the geophone element of the sensor.

Figure 12A:
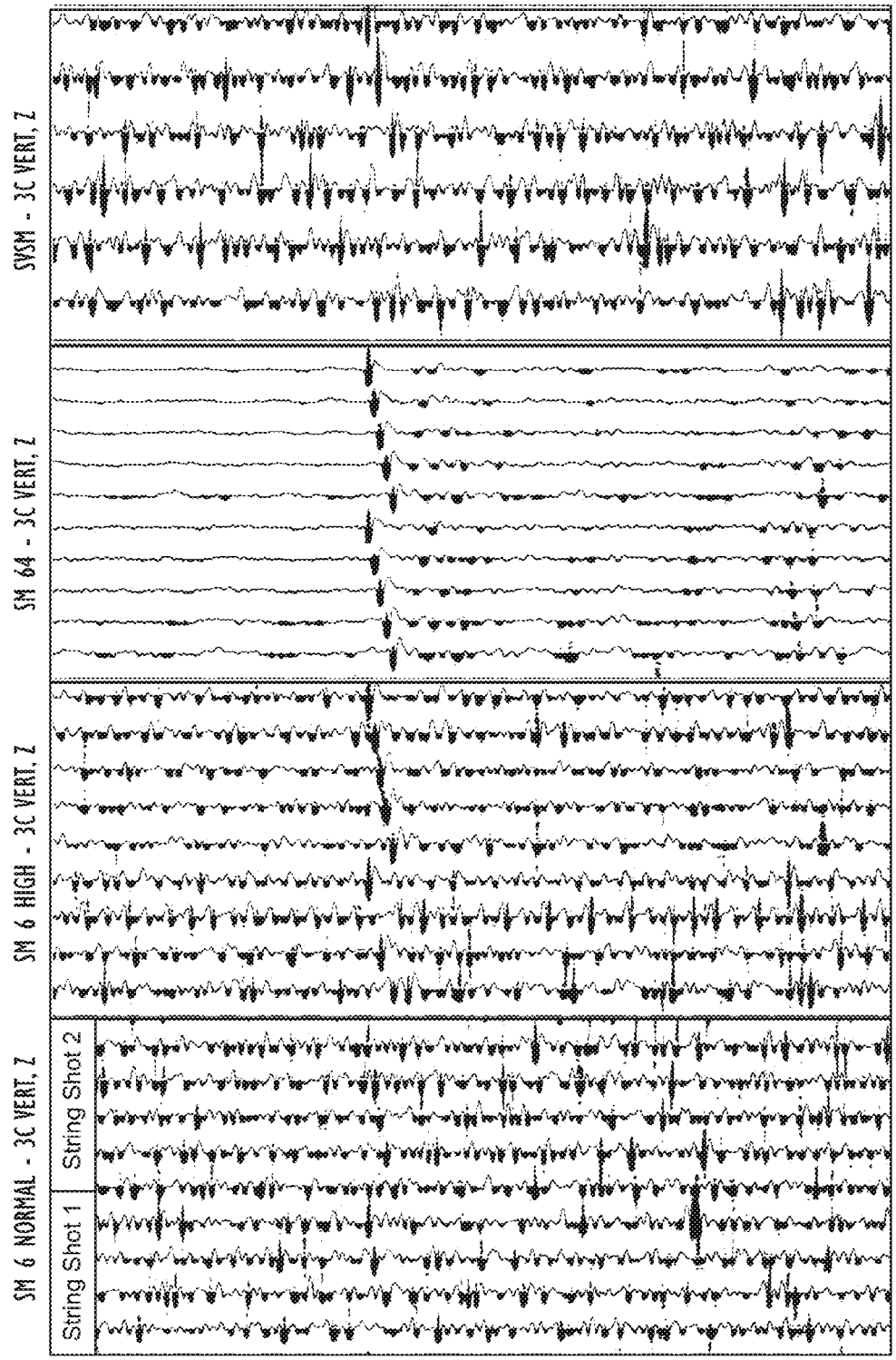
FIGS. 12A-12C show comparisons between a preferred sensor for the buried receivers relative to other sensors.

FIG. 12A compares seismic data of sensors and recording systems responding to two string shots in a target well. Seismic data of an SM-64 sensor in a buried array 150 coupled a recording system is shown in the third column. This data is shown relative to the seismic data of other sensors in the buried array 150 showing in the first, second, and fourth columns. These other sensors include the SM-6 Normal, SM-6 High Sensitivity, and SVSM. As can be seen, the seismic data of the SM-64 sensor coupled to the recording system has less noise, making it best suited for monitoring microseismic events. It is noted that the only elastic events present (i.e., events generated in the subsurface by the microseismic source as well as any elastic noise events generated in the subsurface) are the ones recorded by the SM-64 sensor. All other noises appearing on the other geophones as well as on the SM-64 sensor are therefore events associated with the electronic noise generated by the combination of the sensor and the associated surface recording equipment. Therefore, although a surface set of equipment can be chosen to optimize another sensor such as the SM-6 sensor, care is preferably exercised that in so doing one does not enhance natural elastic noises, as can be appreciated.

Figure 12B:
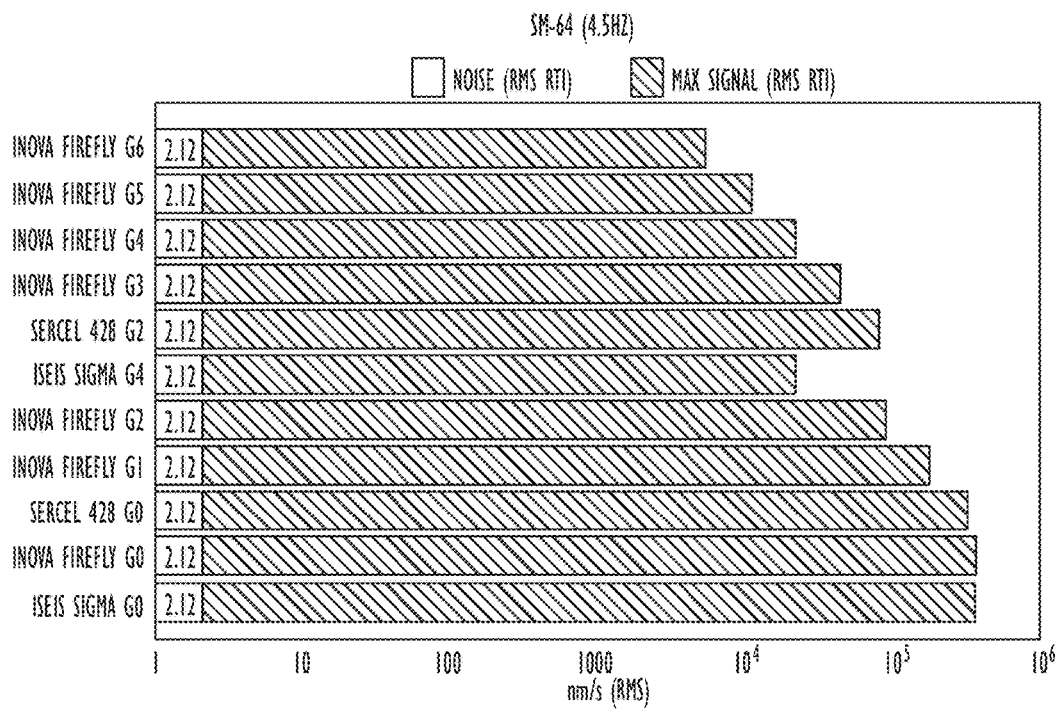
Figure 12C:
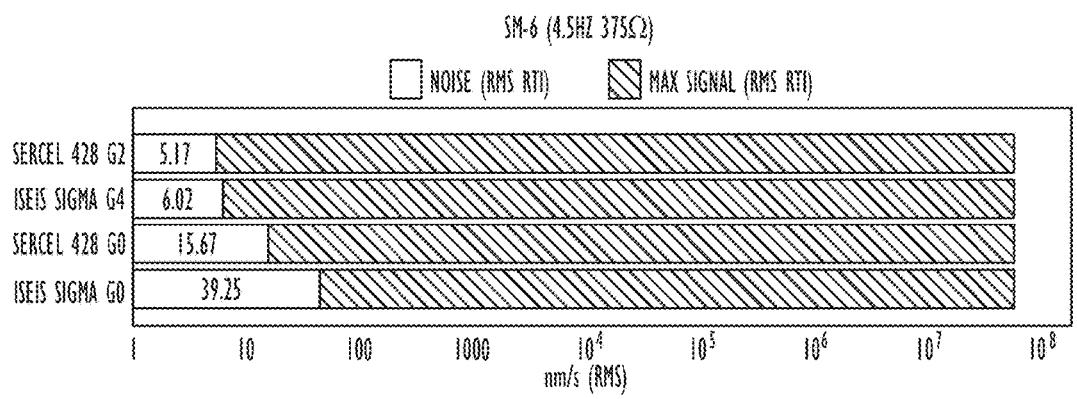

Further to the above point, FIG. 12B compares the effective noise floor for several combinations of the SM-64 sensor and recording systems. By contrast, FIG. 12C compares the effective noise floor for several combinations of the SM-6 sensor and recording system. As can be seen, the ability of a receiver sensor to properly record weak signals is highly dependent on gain settings of the recording system it is coupled to. Yet, using the SM-64 sensor for the buried receivers 52 can reduce the effects of this issue.

Figure 13:
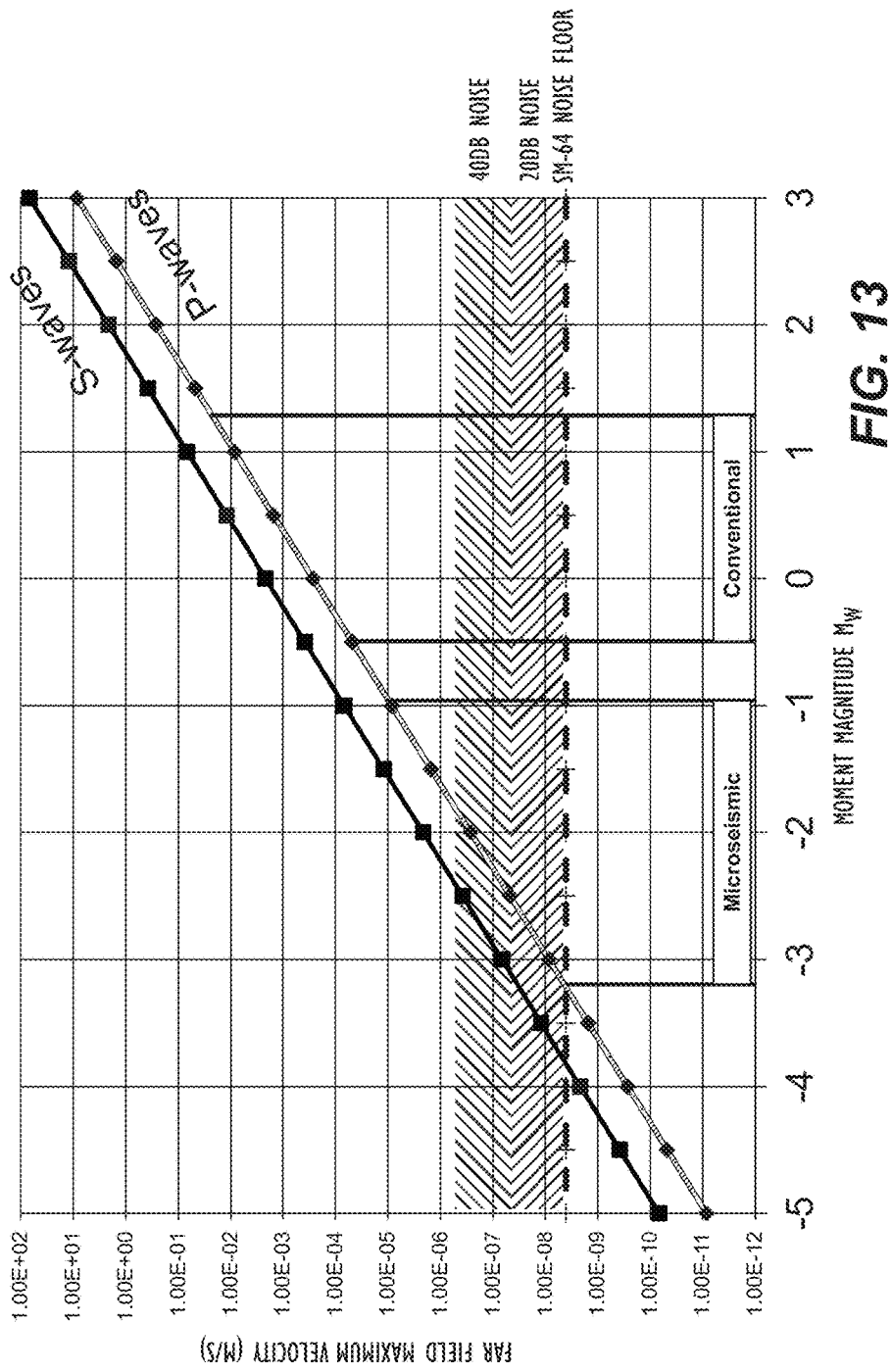
FIG. 13 illustrates analytic modeling with the preferred sensor.

FIG. 13 shows analytic modeling of far-field maximum velocity (m/s) relative to calculated moment magnitude $M_w$. The SM-64 sensor has good response from −4 dB to −1 dB, and the noise floor of the SM-64 sensor is depicted. The moment magnitude $M_w$ range for conventional seismic events is depicted next to the moment magnitude $M_w$ range for microseismic events. The low noise floor of the SM-64 sensor makes it well suited for detecting P-wave and S-wave energy without undesirable noise.

FIG. 14 shows seismic data using SM-64 sensor technology in the buried receivers 152 to detect a microseismic event—imitated here as a perforation shot. By overcoming inherent noise floor limitations found in conventional sensors and systems, the SM-64 sensor technology in the buried receivers 152 can detect P-wave and Shear-wave events. FIG. 14 also shows how the Z component of the receivers (right panel) can detect the event linearly as the event's P-wave travels through the subsurface along the buried array 150. These P-wave detections can be found in the detection process discussed previously with respect to FIGS. 8A and 9A-9C as S-wave detection in the horizontal components (i.e., horizontal east in first panel and horizontal north in second panel).

7. Calculations and Deliverables

As noted above, the system's processing can provide a number of calculations and deliverables. Some of these are discussed below in more detail.

a. Moment Magnitude and Moment Tensor

For the purposes of calculating microseismic events or any other seismic event, displacement for a P or S wave is given by the known equation:

$$u(x,t) \approx \frac{M_0 * A_F}{4\pi \rho c^3 r} * \dot{g}(t - r/c)$$

where c=P or S:
u(x,t) is the displacement in m;
$A_F$ is an angular factor;
$M_0$ is the Moment in Nm;
ρ is the density in kg/m³ (2500 for example following);
c is the P or S wave velocity in m/s (P=2500, S=1250);
r is distance from event to surface in m (r=3000 m);
g(t) is the source function (dimensionless).

In a microseismic event as in an earthquake, strain is released generating Frictional Energy $E_f$ and breaks the rock, which will slip with energy $E_G$ and will radiate energy in the form of seismic waves $E_R$. At the sensors then, the system 100 measures the radiated energy $E_R$ which is given by:

$$E_R = Fac * 4\pi \rho c r^2 \int_{-\infty}^{\infty} \dot{u}(t)^2 dt$$

where Fac is a number depending on the wave type—i.e., ⅘ for shear waves and 2/15 for P-waves due to the angular factor.

The released strain can be related to an equivalent charge of dynamite or other seismic source. For example, the equivalency between energy of a dynamite charge to moment magnitude $M_w$ is given by:

$$\log E_{TNT} = 1.5 M_W + 6.66$$

Quality control tools of the data processing system (400) can assess whether an entire fracture network has been recorded. Event detection is often biased by distance as weak events can only be detected by sensors close to the source. Therefore, analysis by the system 400 needs to compensate for this bias, or results could be misleading. Modeling can be performed to determine optimum placement of sensors.

The seismic moment is defined as:

$$U_n = M_{pq} * G_{np,q}$$

where $U_n$ is the component of the total displacement in the Cartesian direction n; $M_{pq}$ is the moment tensor; and $G_{np,q}$ is the derivative of the Green's function. The * denotes a convolution in the time domain. The Einstein convention summation over repeated indices is assumed. The Green's function can be easily calculated knowing the Earth model, and the displacement is measured, from which the full moment tensor can be calculated by an inversion process.

The magnitude of the moment tensor is the Moment $M_O$. The moment $M_O$ is calculated as follows in a constant earth medium:

$$M_O = \frac{4\pi \rho c^3 r U}{F} = \mu dA$$

where $M_O$=seismic moment (Nm);

$$c = \text{velocity}\left(\frac{m}{s}\right);$$

r=distance from source to receiver (m); U=displacement (m); F=source mechanism angular factors; μ=shear modulus; d=average fault displacement; and A=area of fault.

The Kanamori Moment Magnitude $M_W$ is calculated as:

$$M_w = \frac{2}{3}(\log_{10} M_O - 9.1)$$

Moment magnitudes can be calculated for P-waves or S-waves and can be calculated on every component (vertical, east, and north). Moment magnitude estimation is very dependent on data conditioning. If conditioning is not carefully done, the system 400 can calculate moment magnitude of noise. If a filter is applied to remove the noise, the amplitude of the very weak signals of the microseismic event is decreased, which in turn causes moment magnitude to be negatively affected. This results in lower moment magnitudes than reality, but shows better separation between events of different source strength.

b. Attenuation Estimation

The system's processing can provide an estimate of the attenuation. As is known, inelasticity and inhomogeneities dampen a signal as it travels through a medium. To estimate the size of a seismic event with the system 100, the amount of energy that has been absorbed needs to be determined. Accordingly, an objective of the system's processing is to determine a quality factor, Q, as a measure of the attenuation. This calculation also includes multiple layers if necessary.

In general, the energy lost can be written as:

$$\frac{2\pi}{Q} = \frac{\Delta E}{E}$$

where $\Delta E$ is the energy lost in one cycle, and Q is the quality factor.

From this definition of Q, the amplitude of a measured signal is related to the true (original signal) by:

$$A_i(f)=\exp(-\pi f t_i/Q)A_t(f)S_i/R_i$$

where $A_i$ (f)=measured spectral amplitude at location i (known);
$A_t$ (f)=true spectral amplitude at source (unknown);
$S_i$=the angular correction factor at location i (known), which accounts for the radiation pattern;
$t_i$=travel time to location i from the source (known);
f=frequency (known), after Fourier transform of signal;
Q=quality factor (unknown); and
$R_i$=distance to sensor i from the source (known), which accounts for the geometrical spreading.

To determine the quality factor Q, the observed spectrum is taken at two or more sites, and the signals are compared:

$$A_i(f)=\exp(-\pi f t_i/Q)A_t(f)S_i/R_i$$

$$A_j(f)=\exp(-\pi f t_j/Q)A_t(f)S_j/R_j$$

Division yields:

$$\frac{A_i(f)}{A_j(f)} = \exp\left(-\frac{\pi f(t_i - t_j)}{Q}\right)\left(\frac{R_j}{R_i}\right)\left(\frac{S_i}{S_j}\right)$$

Taking the Log, yields:

$$\mathrm{Log}\left(\frac{A_i(f)}{A_j(f)}\right) = \left(-\frac{\pi f(t_1 - t_2)}{Q}\right) + \mathrm{Log}\left(\frac{R_j S_i}{R_i S_j}\right)$$

The right hand side can be fit to get the slope as a function of frequency to get the attenuation Q.

The value of attenuation Q is very sensitive to the range of frequencies used. Plotting attenuation Q as a function of frequency helps in the selection of the best range of frequencies. Uncertainties arise from the inhomogeneity of the medium as values for the attenuation Q can vary drastically in different layers of the subsurface. An effective attenuation value is readily calculated from the attenuation Q of each layer.

The data processing system (400) can use software code (e.g., programmed in C++, Java, MATLAB, etc.) to determine the attenuation values for perforation and string shots. The software code can calculate the surface layer attenuation Q given its thickness, velocity model, and the value of the base attenuation Q.

c. Moment Magnitude Estimation

The system's processing can provide an estimate of the moment magnitude as a measure of a size of an event. Knowing the moment magnitude can help describe the events being viewed. The moment magnitude of an event is determined from the received signal, and the value of the moment magnitude is intended to be consistent with the values determined from other receivers.

The spectral amplitude at a given receiver $P_R$, is related to the spectral amplitude at the source by the equation:

$$P_R(f) = \frac{A_{SR}}{r}\exp\left(\frac{-\pi f t}{Q_{e\!f\!f}}\right)T(f)P_S(f)$$

There are four corrections involved, including distance, angle, receiver response function, and attenuation. T(f) refers to the receiver response function and includes sensitivity. The variable r refers to the source receiver distance, and $A_{SR}$ is the angular correction for the source-receiver orientation. Additionally, t is the travel time from the source to the receiver. In the above equation, $t/Q_{e\!f\!f}=t_1/Q_1+t_2/Q_2$, where the subscript 1 refers to the surface layer and 2 refers to the remaining material.

$P_S$ is the "true" spectral amplitude at the source. The function $P_S(f)$ can be inverse Fourier transformed to give a velocity record at the source ($u_S'(t)$) as a function of time. This is the time derivative of the displacement, i.e.:

$$u_S'(t)=\mathrm{Inv}(P_S(f))$$

The time derivative of the moment rate $M_o''(t)$ can be determined through the velocity record by:

$$M_o''(t)=4\pi\rho_{e\!f\!f}\alpha_{e\!f\!f}^3 u_S'(t)$$

where $\rho_{e\!f\!f}$ is the effective density, and $\alpha_{e\!f\!f}$=the effective P-wave velocity.

Through integration, the moment rate can be determined, which can then be used to calculate the moment magnitude using:

$$M_m=(2/3)\log_{10}(M_o*1\times10^7)-10.7$$

where the $1\times10^7$ is to convert to ergs from Joules.

The data processing system (400) can use software code to perform the calculations. When applied to the procedure of perforation and string shot data, the results of the software code can be consistent among the received signals from multiple receivers and comparable to estimated vales from known sources.

d. Window Tapering Functions

The system's processing can provide tapering functions to taper data being windowed so the data preferably goes smoothly to zero at the boundaries of the window. This helps to eliminate spurious oscillations associated with the Gibbs' phenomenon of overshooting when performing Fourier transforms and other artificial effects. Therefore, the data processing system (400) can use software code of tapering functions to adjust windowed data so that the windowed data goes to zero smoothly at the boundary. The software can have a catalog of routines that can be used to taper the data. For example, the software can include the following taper functions: Bartlett, Blackman, Cosine, Gaussian, Hamming, Hann, Kaiser, Lancos, Rectangular, Triangular, and Tukey.

The time windows used in processing the seismic data is uniformly centered on the arrival pulse and limited in the range to the signal being studied. The data within the windows is tapered to avoid spurious oscillations as a function of window size (e.g. Hamming filter). Stacking the data from nearby receivers improves signal-to-noise ratio.

e. Semblance Calculation

The system's processing can provide semblance as a measure of the similarity between signals. Similar to cross-correlation, which measures similarity by examining the sum of products of seismic amplitudes, semblance measures trace similarity by comparing the energy of the sum of trace amplitudes to the sum of trace energies.

The system's processing can determine the similarity of signals so that similar events can be grouped and so that noise can be distinguished from events in picking routines. The system's processing can also find the lag times between signals that give maximum semblance, which can refine the arrival times of the signals. Finally, the system's processing can create an interface so that the time differences found in the semblance routines can be used in locator programs.

For computational purposes, the semblance is the energy of the sum of the trace values divided by the sum of the energy of the traces. It has a maximum value of 1. The semblance for M traces can be written as:

$$S = \frac{\sum_{i=1}^{N}\left[\sum_{j=1}^{M} x_j(t_i)\right]^2}{M \sum_{i}^{N} \sum_{j}^{M} x_j^2(t_i)}$$

Interest lies in finding the semblance between pairs of traces and by maximizing the semblance determining the corrected lag time. In this case, the semblance can be rewritten as:

$$S(\tau) = \frac{\sum_{i}(f(t_i) + g(t_i + \tau))^2}{2\sum_{i}(f(t_i)^2 + g(t_i + \tau)^2)}$$

Here, $\tau$ the lag time, $t_i$ is the time samples in the windowed trace, and f & g are the two traces. By varying the lag time, the maximum semblance can be found. The maximum semblance preferably gives the best overlap and allows corrections to be made to the pick times. Note that if f and g are the same trace, $\tau=0$ for the maximum semblance and $S(0)=1$.

Therefore, the data processing system (400) can use software code that takes events picked from a seismic data file and determines the lag time for maximum semblance when compared with a reference trace. The lag times can then accurately represent the shift in receiving times.

f. Hypocenter Location Routines

The system's processing can calculate the location (hypocenter) of microseismic events using the robust network of receivers. An accurate location allows for mapping of the reservoir, determination of the attenuation, and determination of moment magnitude and moment tensors. Therefore, the data processing system (400) can have software routines that take data from multiple sensors and is able in real-time to identify the hypocenter location of the event. Two routines can be used to calculate the hypocenter locations.

i. Grid Search

A first routine uses a grid search to calculate the hypocenter locations. The routine uses time differences as inputs because absolute times are unnecessary. A grid of sites is developed with calculated travel times from each node to each sensor. Each observed time difference is compared to the grid to find potential grid sites. Those potential sites are then searched sequentially for the next receiver-primary difference.

All matches of station differences 1 & 2 are found, and then searches are made for matches 1 and 3, then 1 and 4. Each search has fewer possibilities. This process continues until only one site remains. A variable precision of acceptability can be used that increases if no sites are found that match the criterion.

Therefore, the data processing system (400) can have software code that applies this procedure to locate hypocenters of the microseismic events. Using a grid of size 100×100×100, the system 400 can locate a hypocenter in less than 2 seconds.

ii. Non-Linear Least Squares Search

A second routine uses a non-linear least squares search to calculate the hypocenters of the microseismic events. In general, the non-linear least squares (NLLSQ) search finds a hypocenter that minimizes the square of the difference between the observed arrival times and the calculated arrival times from that hypocenter to the receivers.

In the procedure, $T(S_i,R)$ is a function that gives arrival times depending on the station locations ($S_i$) and the event location (R=(x,y,z,t)). This creates a grid of times. If $t_i$ are the observed arrival times, location R is desired, which minimizes (where the sum is over all stations):

$$\sum_{i}(t_i - T(S_i, R))^2$$

Differentiating this expression with respect to the location R=(x,y,z,t) and linearizing results in:

$$tdiff_i = \sum_{x,y,z,t} \frac{\partial T(S_i, R)}{\partial R} dR \equiv \nabla_R T(S_i, R) \cdot dR$$

where $$tdiff_i = t_i - T(S_i, R)$$

The derivative is a function of the position of the event and the position of the receivers. This gives a linearized estimate of the changes in dR needed to reduce $t_{diff}$ to 0. In Matrix notation, this is given by:

$$\begin{pmatrix} \frac{\partial T_1}{\partial x} & \frac{\partial T_1}{\partial y} & \frac{\partial T_1}{\partial z} & 1 \\ \frac{\partial T_2}{\partial x} & \frac{\partial T_2}{\partial y} & \frac{\partial T_2}{\partial z} & 1 \\ \frac{\partial T_3}{\partial x} & \frac{\partial T_3}{\partial y} & \frac{\partial T_3}{\partial z} & 1 \\ \frac{\partial T_4}{\partial x} & \frac{\partial T_4}{\partial y} & \frac{\partial T_4}{\partial z} & 1 \end{pmatrix} \begin{pmatrix} \Delta x \\ \Delta y \\ \Delta z \\ \Delta t \end{pmatrix} = \begin{pmatrix} tdiff_1 \\ tdiff_2 \\ tdiff_3 \\ tdiff_4 \end{pmatrix}$$

Using matrix pseudo inversion yields:

$$\begin{pmatrix} \Delta x \\ \Delta y \\ \Delta z \\ \Delta t \end{pmatrix} = \begin{pmatrix} \frac{\partial T_1}{\partial x} & \frac{\partial T_1}{\partial y} & \frac{\partial T_1}{\partial z} & 1 \\ \frac{\partial T_2}{\partial x} & \frac{\partial T_2}{\partial y} & \frac{\partial T_2}{\partial z} & 1 \\ \frac{\partial T_3}{\partial x} & \frac{\partial T_3}{\partial y} & \frac{\partial T_3}{\partial z} & 1 \\ \frac{\partial T_4}{\partial x} & \frac{\partial T_4}{\partial y} & \frac{\partial T_4}{\partial z} & 1 \end{pmatrix}^{-1} \begin{pmatrix} tdiff_1 \\ tdiff_2 \\ tdiff_3 \\ tdiff_4 \end{pmatrix}$$

In general, it is desirable to dampen this change (multiply by a number less than 1) of position to keep it in the grid; but it is not desirable to overshoot the minimum. (The shift in the position gives a direction to move but not necessarily a magnitude.) The shift in position is added to the estimated position and a new position is determined. The process is repeated until the shift in position is less than a grid step.

To that end, the data processing system (400) can have software code that codes this formalism for the same grid as before. Typically, four to ten iterations are required, and a variable damping parameter is used to keep locations within the grid. Calculation times for this procedure can be several times faster than for grid search, and faster convergence can be obtained with more receivers.

g. Double-Difference Calculation

The system's processing can use a double difference calculation to determine error. There are several sources of error that limit the accuracy of location algorithms. For instance, arrival time measurements can create errors depending on whether the arrival times are chosen manually or numerically. There are also limitations from sampling rates, noise, and consistent identification of the arrival. In addition, there may be errors in the model of the velocity structure. Inherent in the methods described is the velocity of the phases. These can be estimated from a variety of sources, but are only approximately known. Furthermore, inhomogeneities can affect results.

Details related to the sensor network can generate errors. For instance, the placement of receivers plays a role in the location of events. Preferably, the sensor are well spaced "around" the event. Finally, identifying the phase of a wave being "picked" can be difficult, but knowing the phase can be useful because different phases have different wave speeds.

Through the use of semblance (cross-correlation) techniques and the use of a double-difference formulation, the first two sources of errors (i.e., arrival time measurements and velocity model) can be reduced. In general, arrival times are either manually or automatically picked. In either situation, errors in individual arrival time measurements contribute significantly to the errors in locating the hypocenter of an event. The measurement error can be reduced if differences in arrival times are employed (rather than absolute times) using time-domain semblance and/or cross spectra techniques. This is done by converting the arrival times into time differences between common phases of different earthquakes received at the same station. Arrival times for a set of events considered simultaneously can better constrain the relative locations between events through a double-difference routine. Because the phases of two nearby quakes traverse similar paths, their travel time difference will not be significantly affected by model error in the velocity structure. These two techniques reduce the error from arrival and from velocity structure model error.

To that end, the data processing system (400) can have software that uses cross-correlation and double-difference to locate microseisms arising in geothermal systems (e.g., in Basel, Switzerland and in Krafla, Iceland). The software can employ double-difference techniques to locate events. This code can use the locations found above as starting points and can then relocate them to improve accuracy.

The double-difference technique uses the difference of observed and calculated arrival times that are then differenced for separate events. The arrival time is written as the origin time plus the travel time:

$$t = \Sigma \int u \, ds = \tau + T$$

Here, $\tau$ is the time of origin of the event, and u ($=1/v$) is the slowness that is integrated over a path. T is defined as the travel time. Since the travel time T has a nonlinear dependence on the event location, a truncated Taylor series is commonly used to linearize the equation:

$$\Delta m \cdot \frac{\partial T}{\partial m} + \Delta m \cdot \frac{\partial \tau}{\partial m} = \Delta m \cdot \frac{\partial t}{\partial m}$$

Here, m is a vector describing the event location (x,y,z,$\tau$) and origin time, $\neq m = (\Delta x, \Delta y, \Delta z, \Delta \tau)$. The difference between the observed and the theoretical (calculated) arrival time for an event i received at station k is given by:

$$r_k^i = (t^{obs} - t^{cal})_k^i =$$
$$r_k^i = \Delta m^i \cdot \frac{\partial \tau}{\partial m} + \Delta m^i \cdot \frac{\partial T}{\partial m}$$
$$= \Delta \tau^i \cdot \frac{\partial \tau}{\partial \tau} + \left( \Delta x^i \cdot \frac{\partial T_k^i}{\partial x} + \Delta y^i \cdot \frac{\partial T_k^i}{\partial y} + \Delta z^i \cdot \frac{\partial T_k^i}{\partial z} \right)$$
$$\equiv \left( \frac{\partial t_k^i}{\partial m} \right) \cdot (\Delta m^i)$$

Recall that $\tau$ is the origin time that does not depend on x,y,z, but only on $\tau$, and the travel time, T, is independent of the time of origin.

The double difference is defined by (Waldhauser & Ellsworth, 2000):

$$dr_k^{ij} = (t_k^i - t_k^j)^{obs} - (t_k^i - t_k^j)^{cal}$$

Therefore, the following equation is the linearized double-difference of arrival times:

$$\frac{\partial t_k^i}{\partial m} \Delta m^i - \frac{\partial t_k^j}{\partial m} \Delta m^j = dr_k^{ij}$$

where m is the x,y,z, and $\tau$ at the origin and t is the arrival time, based on a velocity model.

This can be written in matrix form, which for four events and one station k is given in brief below. (The z and $\Delta \tau$ derivatives for four events have been deleted because of space constraints). There are 4N columns (where N is the number of events) and M rows (where M is the number of event-pairs). It should be noted that seldom, if ever, do all stations record all of the events, so the size of the actual matrix may be adjusted for each circumstance.

$$\begin{pmatrix} \frac{\partial t_k^1}{\partial x} & -\frac{\partial t_k^2}{\partial x} & 0 & 0 & \frac{\partial t_k^1}{\partial y} & -\frac{\partial t_k^2}{\partial y} & 0 & 0 \\ \frac{\partial t_k^1}{\partial x} & 0 & -\frac{\partial t_k^3}{\partial x} & 0 & \frac{\partial t_k^1}{\partial y} & 0 & -\frac{\partial t_k^3}{\partial y} & 0 \\ \frac{\partial t_k^1}{\partial x} & 0 & 0 & \frac{\partial t_k^4}{\partial x} & \frac{\partial t_k^1}{\partial y} & 0 & 0 & -\frac{\partial t_k^4}{\partial y} \\ 0 & \frac{\partial t_k^2}{\partial x} & -\frac{\partial t_k^3}{\partial x} & 0 & 0 & \frac{\partial t_k^2}{\partial y} & -\frac{\partial t_k^3}{\partial y} & 0 \\ 0 & \frac{\partial t_k^2}{\partial x} & 0 & \frac{\partial t_k^4}{\partial x} & 0 & \frac{\partial t_k^2}{\partial y} & 0 & -\frac{\partial t_k^4}{\partial y} \\ 0 & 0 & \frac{\partial t_k^3}{\partial x} & -\frac{\partial t_k^4}{\partial x} & 0 & 0 & \frac{\partial t_k^3}{\partial y} & -\frac{\partial t_k^4}{\partial y} \end{pmatrix} \begin{bmatrix} \Delta x_1 \\ \Delta x_2 \\ \Delta x_3 \\ \Delta x_4 \\ \Delta x_1 \\ \Delta x_2 \\ \Delta x_3 \\ \Delta x_4 \end{bmatrix} \frac{\partial t_k^1}{\partial x}$$

type derivatives are the changes in travel times with change in x, y, z and are calculated numerically.

Labeling the matrix G, the vector $\Delta m$, and the double differences $dr(m)$, then the equation to solve form is:

$$G(\Delta m) = dr(m)$$

The solution for $\Delta m$ that minimizes the square of the residual, $(G\Delta m - dr(m))^2$ is found through standard inverse techniques. Symbolically, the solution for $\Delta m$ is given by:

$$\Delta m = (G^T G)^{-1} G^T dr(m)$$

The new values for $m_{s+1} = m_s + \Delta m$ and is iterated until the change in the residual is below a fixed tolerance (tol=1e-6 seconds). The double difference not only gives relative positions, but has been shown to yield absolute positions if noise is limited.

The inversion technique has several practical difficulties. The first of these is that the resulting matrix is sparse. In each row, only 8 of the 4N elements (where N is the number of events) are non-zero. This can lead to instabilities in the solutions. The stability of the result can be enhanced by using a routine by Page and Saunders (1982) for sparse linear equations and sparse least squares. This routine regularizes the matrix by using a damping factor, whose value is determined by a compromise between speed and accuracy. A damping factor of zero would take full steps between iterations, while a damping of nearly one takes very much smaller steps. A damping of $10^{-6}$ proves to be a reasonable compromise.

The size of the matrix also can be problematic depending on the number of events and stations. In many cases, stations do not receive all phases of the events and so rows of zeros appear. To reduce the size of the matrix and to eliminate unnecessary rows, a separate matrix can be used to track of which station receives which event. The double-difference matrix is then collapsed to include only needed rows.

The double difference technique reliably gives only relative positions of the events. This occurs since only differences of arrival times are used. Preferably, orienting the cluster once it is determined can be done through the use of known events or by using an absolute location routine to identify the most certain event locations, in terms of uncertainty ellipsoids, as anchor points.

To that end, the data processing system (400) can have software code that starts from the raw traces, picks the microseismic events, uses semblance to "cluster" similar events and to refine the pick times, uses the "single difference" locator described above to give initial locations, and finally collapses those positions onto fracture lines using a double-difference procedure.

h. Double-Difference Velocity Model Tomography

The system's processing can determine the event location and magnitude using double-difference velocity model tomography. The determination of event location and magnitude depends upon an accurate velocity model. There are a large number of techniques for determining such a velocity model, but a method based on the double-difference technique can be used as detailed herein. In general, the objective is to minimize the double-difference in travel times with respect to the event location as well as parameters describing the velocity model. The result preferably gives more precise locations with a refined velocity model.

The algorithm resembles the double-difference calculation above with additional columns including differentiation with respect to velocity model parameters. This calculation requires a number of stations greater than the number of parameters being determined. The derivatives with respect to the velocity model parameters need to be determined numerically. This calculation does not lend itself to a grid system so a technique that allows the calculation of travel times for small variations in velocity model parameters is preferred. A technique calculating differential travel times can use known event locations as "anchors" for preliminary velocity model refinement. These can be initially used in the "single difference" location routine. In this case, the only variation will be for the velocity model parameters, not the location.

D. Buried Array Sensor Details

As evidenced above in FIG. 11B, the sensors 152 in the buried array 150 of disposed in shallow boreholes are subject to surface noise. As also evidenced throughout the present disclosure, the sensors 152 seek to measure weak signals of microseismic events. This can make sensing with the buried sensors 152 difficult. Naturally, a more sensitive sensor 152 used downhole would be expected to help solve the problem of detecting the weak signals. Yet, the weak signal detected by a more sensitive sensor would be subjected to all of the detrimental effects of the noise occurring near the surface so that a more sensitive sensor would simply exacerbate the problem. Due to these difficulties, the disclosed system 100 uses a sensitive sensor that has a low noise floor as previously detailed.

Figure 15A:
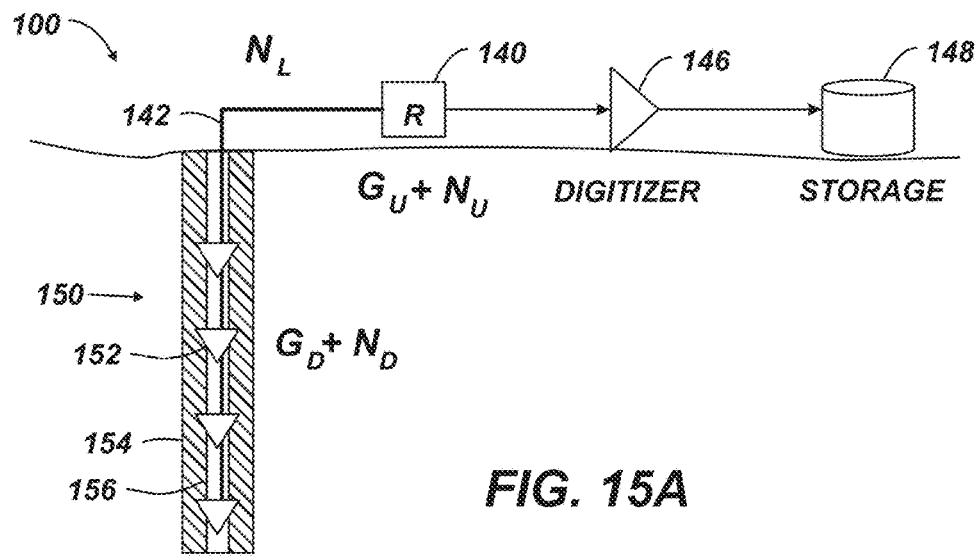
FIG. 15A reproduces components of the disclosed system previously identified throughout the present disclosure.

FIG. 15A reproduces components of the disclosed system 100 previously identified throughout the present disclosure. As shown, a buried array 150 disposed in a borehole 154 has a plurality of seismic sensors 152. These sensors 152 can be geophones or the like disposed on a tubular 156 and cemented in the borehole 154, or the sensors 152 can be hydrophones or the like suspended in fluid in the borehole 154. As detailed herein, the sensor 152 can include a single-component geophone having a geophone element and having a low-noise amplifier integrated therein. More preferably, each sensor 152 installed in the borehole 154 as in FIG. 15A preferably has at least three of the single-component geophones arranged in three orthogonal axis at a vertical location in the borehole 154.

In either case, the sensors 152 are arranged relative to a subsurface volume and are coupled to the volume. Transmission lines 142 connect the downhole sensors 152 to the recording unit 140 at the surface. Additionally, the recording unit 140 has a digitizer 146 that digitizes analog signals from the sensors 152 and has storage 148 for storing the digitized signals.

During operation, the seismic sensors 152 disposed downhole in the buried array 150 and connected to the recording unit 140 at the surface with transmission lines 142 respond to seismic energy (not shown) from the subsurface volume.

As noted previously, for example, the sensors 152 respond to the moveout of a microsiesmic event propagated from a fracture, fault, or the like occurring in the subsurface volume.

In response to the detected energy, the sensor 152 generates an input analog signal, which can be very weak as noted herein. Because the energy is weak, the sensor 152 used is preferably sensitive. For example, the sensor 152 can be sensitive to about 2 nm/s over most of the bandwidth of interest, but the sensitivity can vary and is dependent on frequency.

However, simply putting a more sensitive sensor downhole inherently creates more impedance and more internal noise. As expected, for example, the sensor 152 has some intrinsic noise $N_D$ that is added to the input analog signal. For these reasons, the sensor 152 is not only sensitive, but is also preferably has a low noise floor to better detect the weak seismic energy under the surrounding conditions. Details of the low noise floor of the sensor 152 have been described previously with respect to FIG. 14. In one particular implementation, the noise floor of the sensor 152 is preferably as low as or below the ambient earth noise in the area of interest. The ambient earth noise can be characterized by Peterson's and USGS' New Low-Noise Model (NLNM), which can summarize the lowest observed vertical seismic noise levels through a seismic frequency band.

In addition to being sensitive and having a low noise floor, the sensor 152 directly amplifies the input analog signal by a downhole gain value $G_D$. In general, the downhole gain value $G_D$ can depend on the characteristics of the implementation. In one embodiment, the sensor 152 amplifies the input signal by a factor of 64, although other values can be used. For example, a preferred high sensitivity geophone noted herein has a built-in amplifier inside the geophone by having the amplifier electronics contained in the geophone's housing. As will be shown below, the amplified signal masks (i.e., lessens) any impact of the noise gained in the transmission line on the overall amplified analog signal.

The sensor 152 then sends the amplified analog signal to the uphole recording unit 140 via the transmission line 142. As is customary and despite any efforts to mitigate the issue, the transmission line 142 is subject to electromagnetic interference, which adds noise $N_L$ to the transmitted signal. For example, as the propagated signal travels along the transmission line 142 from the sensor 152 to the recording unit 140 at the surface, the signal acquires additional noise $N_L$, such as electromagnetic interference. It is desirable though to propagate the signal without detrimentally affecting it. However, because the original input signal has been amplified directly at the sensor 152 downhole, any added noise $N_L$ from the transmission line 142 is expected to have little effect in terms of scale compared to the amplified sensor signal.

At the surface, the recording unit 140 receives the transmitted amplified signal and adds its own uphole gain $G_U$ and noise $N_U$ to the signal. The uphole gain value $G_U$ and noise $N_U$ is typically specific to the recording unit 140 used and its electronic configuration and can be about any desirable value. After receiving and amplifying the signal uphole, the recording unit 140 digitizes the amplified analog signal sent with a digitizer 144 and stores the digitized signal in storage 146.

Figure 15B:
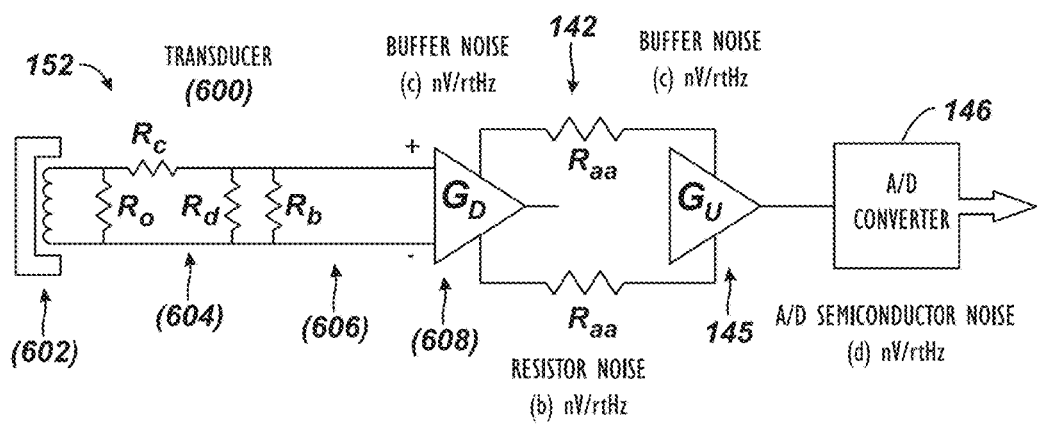
FIG. 15B shows the disclosed system in more detail to discuss gain and noise levels involved.

FIG. 15B shows the system 100 in more detail to discuss the gain and noise levels involved. The downhole sensor 152 has at least one transducer 600 with a compartmentalized design incorporating the sensor electronics in the housing to minimize noise pick-up. Details related to the preferred sensor 152 can be found in U.S. Pat. No. 7,518,954, which is incorporated herein by reference in its entirety. During sensing, earth particle velocity is imparted to the transducer's housing and magnet, and earth motion and Brownian noise are imparted to the transducer's coil (602). In the sensor 152, the sum of the earth motion and Brownian noise is multiplied by the sensor's transduction (604). Then, the transducer's output is attenuated by voltage divider action (606), and Johnson noise is added on a RMS basis.

The amplifier (608) of the sensor 152 then increases the output signal by a gain $G_D$, which in one embodiment is $\times 2^6$ (i.e., $\times\times 64$). The amplifier (608) adds buffer and geophone noise (a) in terms of nV/√Hz. From the amplifier (608), the output signal is transmitted by the transmission line 142, such as a downhole cable, to the surface recording unit 140. The line 142 has resistance that adds resistor noise (b) in terms of nV/rtHz to the output signal.

At the surface, the recording unit's amplifier (145) then increases the output signal by a gain $G_U$, which in one embodiment is $\times 2^0$. Additionally, the amplifier adds buffer noise (c) in terms of nV/√Hz. Finally, an A/D converter 146 of the recording unit 140 converts the analog signal to digital for eventual storage. The A/D converter 146 adds A/D semiconductor noise (d) in terms of nV/√Hz.

As the system 100 in FIG. 15A shows, the sources of noise in the system 100 of the sensor 152 and recording unit 140 creates an overall system noise value that can be calculated as:

$$\text{System\_Noise} = \sqrt{a^2 + \frac{b^2 + c^2 + d^2}{G_D^2}}$$

As this equation indicated, the gain $G_D$ (e.g., $\times 64$) of the sensor's buffer makes all following noises occurring in the system 100 practically negligible. (This equation assumes that the amplification factor $G_U$ of the recording unit 140 is one (e.g., $\times 2^0$). If the amplification factor $G_U$ is greater, the above equation would be more involved. Nevertheless, a higher amplification factor $G_U$ would just further mask any noise level $N_U$ added by the unit 140.) Thus, the recording unit 140 at the surface need not necessarily have a low noise floor. Accordingly, as shown previously in FIG. 12A, the noise floor associated with the sensor 152 (e.g., 2.12 nm/s) essentially dominates the system 100.

In addition to having a sensitive sensor 152 with low-noise floor and in addition to amplifying the analog signal at the sensor 152 before transmission, the disclosed system 100 preferably has further considerations made to the components of the system. As noted previously, the recording unit 140 chosen for use with the downhole sensor 152 is preferably selected with a gain value $G_U$ and noise level $N_U$ to match the gain value $G_D$ and noise level $N_D$ of the sensor 152. This balance seeks to adjust the gain of the system 100 while minimizing the effect of the noise generated from the transmission line 142 so the system 100 can still detect low signals.

Either the uphole gain value GU, the downhole gain value GD, or both can be selected to achieve the desired balance. For example, the system 100 can be configured with a selected gain GD needed downhole at the sensor 152 to properly balance the gain GU and noise NU of the recording unit 140 and noise NL of the transmission line 142. Such a situation has been shown previously in FIG. 12B, for example, which shows how a particular downhole sensor (e.g., SM64 geophone noted herein) with downhole gain and noise values can be selected to improve the sensitivity and low noise with respect to a number of recording units.

In another example, the desired balance between the downhole gain GD and the uphole gain GU can involve selecting a value of the uphole gain GU relative to the downhole gain GD that reduces the overall effect of noise in the system 100. For example, FIG. 12C discussed previously shows how particular uphole recording units with internal uphole gain and noise values can be selected to improve the sensitivity and low noise with respect to a particular downhole sensor (e.g., SM-6 geophone) by reducing the overall effect of noise in the system 100.

E. Concluding Remarks

As will be appreciated, teachings of the present disclosure can be implemented in digital electronic circuitry, computer hardware, computer firmware, computer software, or any combination thereof. Teachings of the present disclosure can be implemented in a program storage device or computer program product tangibly embodied in a machine-readable storage device for execution by a programmable processor or programmable control device so that the programmable control device executing program instructions can perform functions of the present disclosure. The teachings of the present disclosure can be implemented advantageously in one or more computer programs that are executable on a programmable system (e.g., data processing system or the like) including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A seismic surveying method of a subsurface volume, the method comprising:
    disposing at least one seismic sensor of a system downhole, the at least one seismic sensor having a downhole amplifier with a downhole gain to directly amplify an input analog signal generated at the at least one sensor;
    generating the input analog signal with the at least one sensor in response to seismic energy from the subsurface volume;
    amplifying the input analog signal directly at the at least one sensor by the downhole gain of the downhole amplifier;
    sending the amplified analog signal to an uphole recording unit of the system via a transmission line, the uphole recording unit having an uphole amplifier with an uphole gain to directly amplify the amplified analog signal received at the uphole recording unit;
    amplifying the amplified analog signal directly at the uphole recording unit by the uphole gain of the uphole amplifier; and
    reducing an overall effect of noise in the system by selecting the downhole gain of the downhole amplifier and the uphole gain of the uphole amplifier to be balanced with respect to one another.

2. The method of claim 1, wherein the transmission line has a noise level adding to the amplified analog signal, and wherein amplifying the input analog signal directly at the at least one sensor by the downhole gain comprises masking the added noise level from the transmission line.

3. The method of claim 1, wherein the uphole recording unit has a noise level adding to the amplified analog signal, and wherein amplifying the input analog signal directly at the at least one sensor by the downhole gain comprises masking the added noise level from the recording unit.

4. The method of claim 1, wherein selecting the downhole gain and the uphole gain to be balanced with respect to one another comprises selecting a value of the uphole gain relative to the downhole gain that reduces the overall effect of noise.

5. The method of claim 1, wherein selecting the downhole gain and the uphole gain to be balanced with respect to one another comprises selecting a value of the downhole gain relative to the uphole gain that reduces the overall effect of noise.

6. The method of claim 1, further comprising:
    digitizing the amplified analog signal sent to the uphole recording unit; and
    storing the digitized signal.

7. The method of claim 1, wherein the at least one sensor comprises a low intrinsic noise floor relative to the seismic energy of the subsurface volume.

8. The method of claim 7, wherein the low intrinsic noise floor is at least as low as ambient earth noise associated with the subsurface volume.

9. The method of claim 1, wherein the at least one sensor comprises an accelerometer, a geophone, a hydrophone, a fiber optic sensor, or a microphone.

10. The method of claim 1, wherein the at least one sensor comprises a single-component geophone having a geophone element and having the downhole amplifier integrated therein.

11. The method of claim 10, wherein the at least one sensor comprises at least three of the single-component geophones disposed orthogonal to one another at a same location downhole.

12. The method of claim 1, wherein disposing the at least one seismic sensor downhole comprises coupling the at least one sensor in a borehole disposed in the subsurface volume.

13. The method of claim 12, wherein coupling the at least one sensor in the borehole disposed in the subsurface volume comprises:
    drilling the borehole into the subsurface volume;
    disposing the at least one sensor on a tubular;
    disposing the tubular in the borehole; and
    coupling the at least one sensor to the subsurface volume adjacent the borehole.

14. The method of claim 13, wherein coupling the at least one sensor to the subsurface volume adjacent the borehole comprises cementing the at least one sensor in the borehole or suspending the at least one sensor in fluid in the borehole.

15. A system for seismic surveying a subsurface volume, the system comprising:
- at least one seismic sensor disposed downhole, the at least one seismic sensor having a downhole amplifier with a downhole gain to directly amplify an input analog signal generated at the at least one sensor, the at least one seismic sensor generating the input analog signal in response to seismic energy from the subsurface volume, the downhole amplifier of the at least one seismic sensor directly amplifying the input analog signal by the downhole gain and transmitting the amplified analog signal; and
- an uphole recording unit connected to the at least one seismic sensor via a transmission line and receiving the amplified analog signal, the uphole recording unit having an uphole amplifier with an uphole gain to directly amplify the amplified analog signal received at the uphole recording unit, the uphole recording unit amplifying the amplified analog signal directly at the uphole recording unit by the uphole gain,
- wherein the downhole gain of the downhole amplifier and the uphole gain of the uphole amplifier are selected to be balanced with respect to one another to reduce an overall effect of noise in the system.

16. The system of claim 15, wherein the transmission line has a noise level adding to the amplified analog signal, and wherein the downhole gain amplifying the input analog signal masks the added noise level from the transmission line.

17. The system of claim 15, wherein a value of the uphole gain is selected relative to the downhole gain to reduce the overall effect of noise in the system.

18. The system of claim 15, wherein a value of the downhole gain is selected relative to the uphole gain to reduce the overall effect of noise in the system.

19. The system of claim 15, wherein the recording unit comprises:
- a digitizer digitizing the amplified analog signal; and
- storage storing the digitized signal.

20. The system of claim 15, wherein the at least one sensor comprises a low intrinsic noise floor relative to the seismic energy of the subsurface volume.

21. The system of claim 20, wherein the low intrinsic noise floor is at least as low as ambient earth noise associated with the subsurface volume.

22. The system of claim 15, wherein the at least one sensor comprises an accelerometer, a geophone, a hydrophone, a fiber optic sensor, or a microphone.

23. The system of claim 15, wherein the at least one sensor comprises a single-component geophone having a geophone element; and wherein the downhole amplifier comprises a low-noise amplifier integrated in the single-component geophone.

24. The system of claim 23, wherein the at least one sensor comprises at least three of the single-component geophones disposed orthogonal to one another at a same location downhole.

25. The system of claim 15, wherein the at least one seismic sensor comprises a tubular on which the sensor disposed, the tubular disposed in the borehole, the at least one sensor coupled to the subsurface volume adjacent the borehole.

26. The system of claim 25, wherein cementation or fluid couples the at least one sensor in the borehole.

* * * * *